United States Patent
Fujimori et al.

(10) Patent No.: US 8,042,077 B2
(45) Date of Patent: Oct. 18, 2011

(54) TECHNIQUE FOR CREATING ANALYSIS MODEL AND TECHNIQUE FOR CREATING CIRCUIT BOARD MODEL

(75) Inventors: Shogo Fujimori, Kawasaki (JP); Toshirou Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/193,867

(22) Filed: Aug. 19, 2008

(65) Prior Publication Data

US 2009/0172618 A1 Jul. 2, 2009

(30) Foreign Application Priority Data

Dec. 28, 2007 (JP) ................ 2007-341421

(51) Int. Cl.
*G06F 17/50* (2006.01)
*G06F 9/455* (2006.01)

(52) U.S. Cl. .................... 716/106; 716/137

(58) Field of Classification Search .............. 716/106, 716/115, 137

See application file for complete search history.

(56) References Cited

U.S. PATENT DOCUMENTS

| 6,675,118 | B2 * | 1/2004 | Wanek et al. ........... 702/117 |
| 6,732,339 | B2 * | 5/2004 | Savithri et al. ........ 716/115 |
| 6,951,002 | B2 * | 9/2005 | Clabes et al. ......... 716/115 |
| 7,139,989 | B2 | 11/2006 | Shinomiya |
| 2001/0042238 | A1 * | 11/2001 | Ishikawa ............. 716/10 |
| 2004/0168142 | A1 * | 8/2004 | Ishikawa et al. ...... 716/10 |
| 2004/0216060 | A1 * | 10/2004 | Dickey et al. .......... 716/4 |
| 2006/0104000 | A1 * | 5/2006 | Yuhara et al. ........ 361/93.1 |

FOREIGN PATENT DOCUMENTS

| JP | 11-186497 | 7/1999 |
| JP | 2003-006260 | 1/2003 |
| JP | 2006-228252 | 8/2006 |

* cited by examiner

*Primary Examiner* — Stacy Whitmore
*Assistant Examiner* — Magid Dimyan
(74) *Attorney, Agent, or Firm* — Fujitsu Patent Center

(57) ABSTRACT

According to a circuit board creation program presented herein, a simulation assuming a case in which an addition of a bypass capacitor near a another bypass capacitor provided between a pin and via of an LSI part can be performed, simply by adding a bypass capacitor property model and changing the value of a coefficient parameter by which the property value of an element of a line part is to be multiplied or divided.

6 Claims, 48 Drawing Sheets

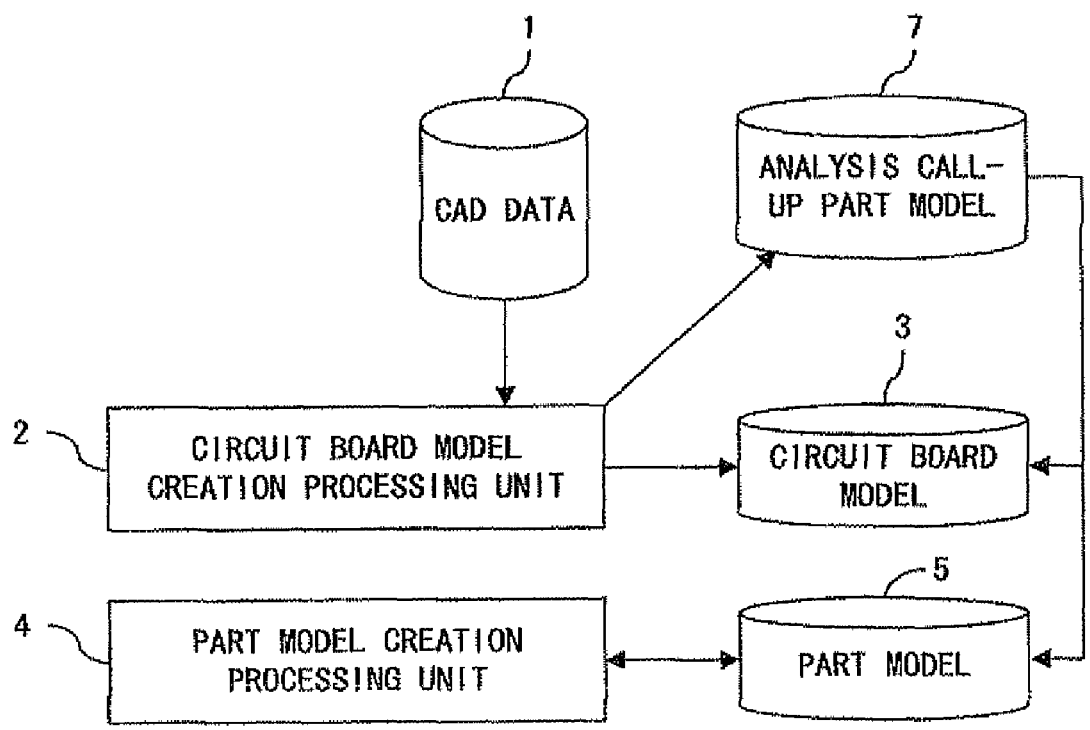
F I G. 1

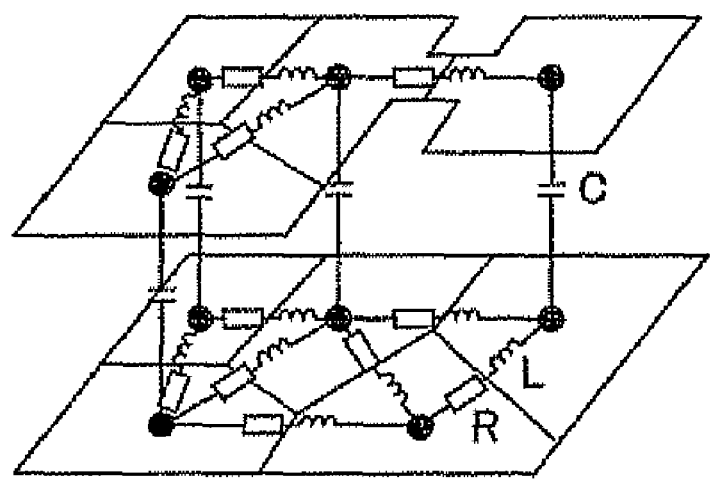
F I G. 2 C

CASE 1: EXTRACTION VIAS OF BYPASS CAPACITOR INDEPENDENT OF EXTRACTION VIAS OF LSI

FIG. 5A
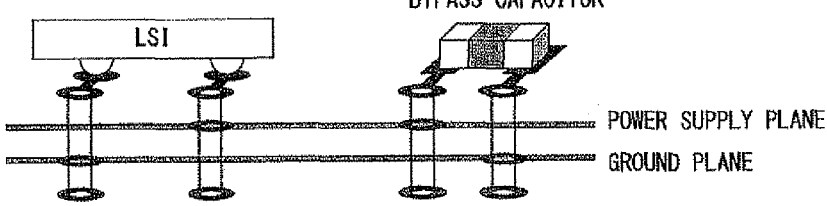

CASE 2: BYPASS CAPACITOR MOUNTING PAD DIRECTLY DISPOSED ON BACK OF LSI EXTRACTION VIAS

FIG. 5B
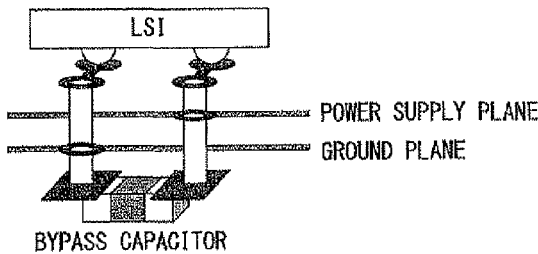

CASE 3: BYPASS CAPACITOR AND LSI SHARING SAME EXTRACTION VIAS, CONNECTED BY LINE IN ORDER OF LSI, BYPASS CAPACITOR, VIA

FIG. 5C
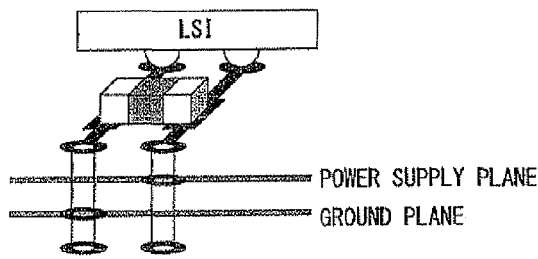

CASE 4: OTHERS (EXCLUDED FROM PRESENT EMBODIMENT)

FIG. 5D
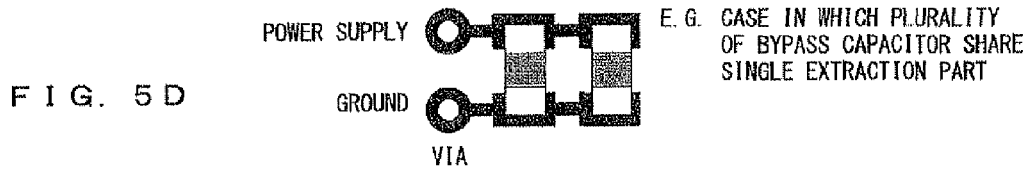

E.G. CASE IN WHICH PLURALITY OF BYPASS CAPACITOR SHARE SINGLE EXTRACTION PART

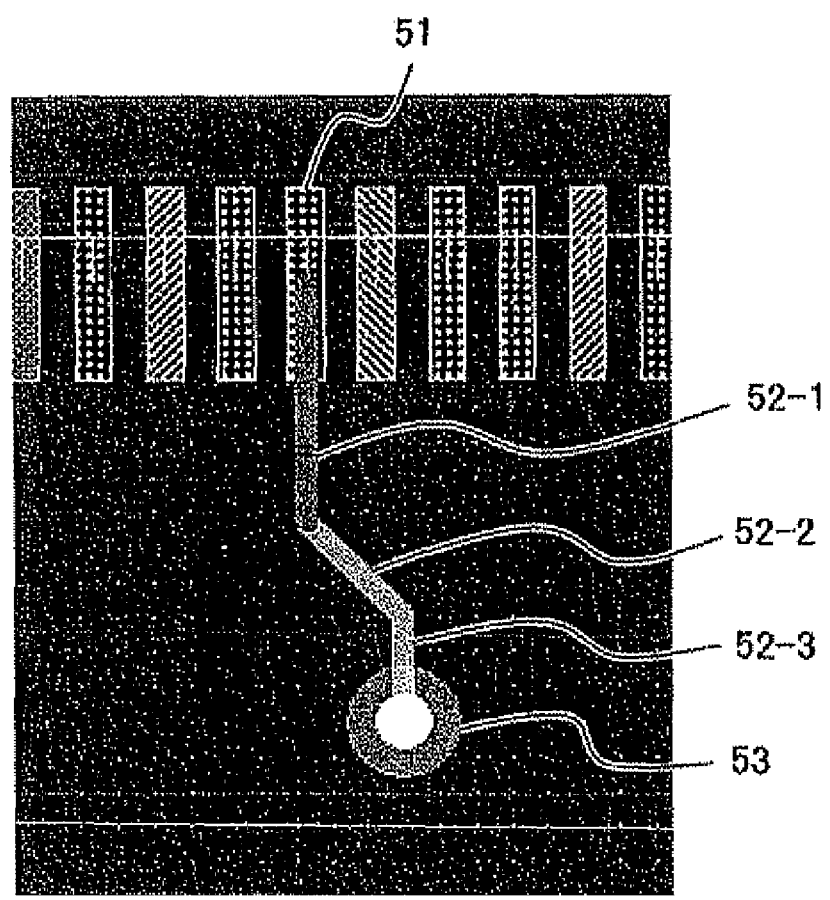
F I G. 1 2

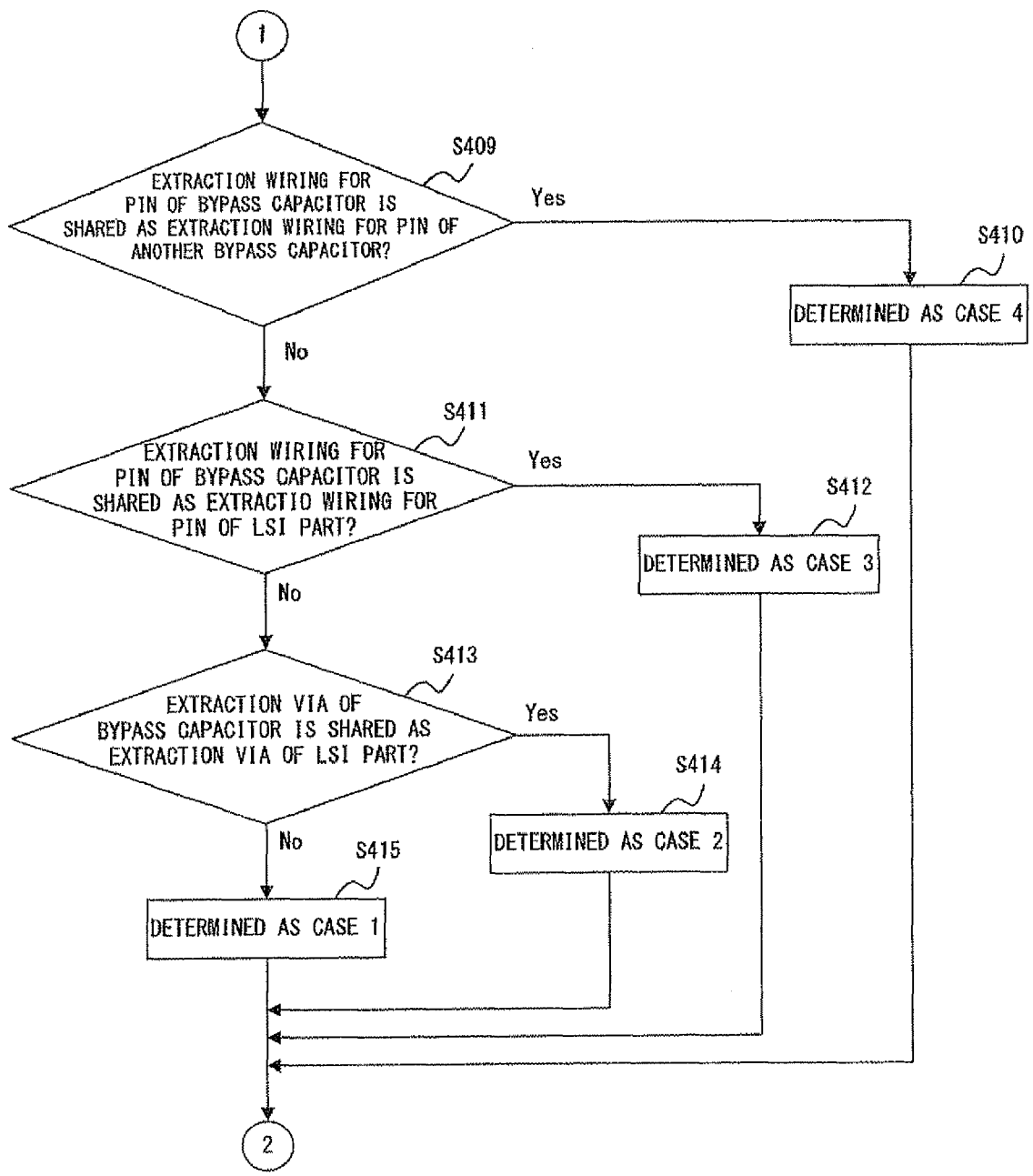
F I G. 1 4 B

BEFORE COEFFICIENT PARAMETER IS EMBEDDED
(WHEN L VALUE BETWEEN NODE 1 AND NODE 2 IS 0.123nH)

```
L1   node1   node2   0.123nH
```

AFTER COEFFICIENT PARAMETER IS EMBEDDED (KL1 IS VARIABLE)

```
L1   node1   node2   0.123nH*KL1
```

FIG. 16

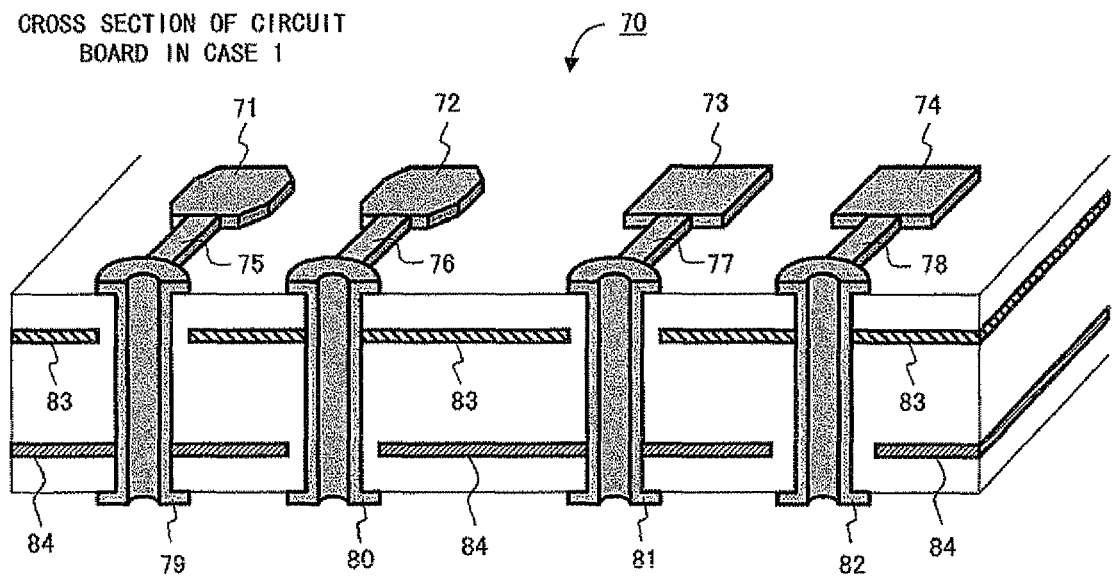
F I G. 1 8 B

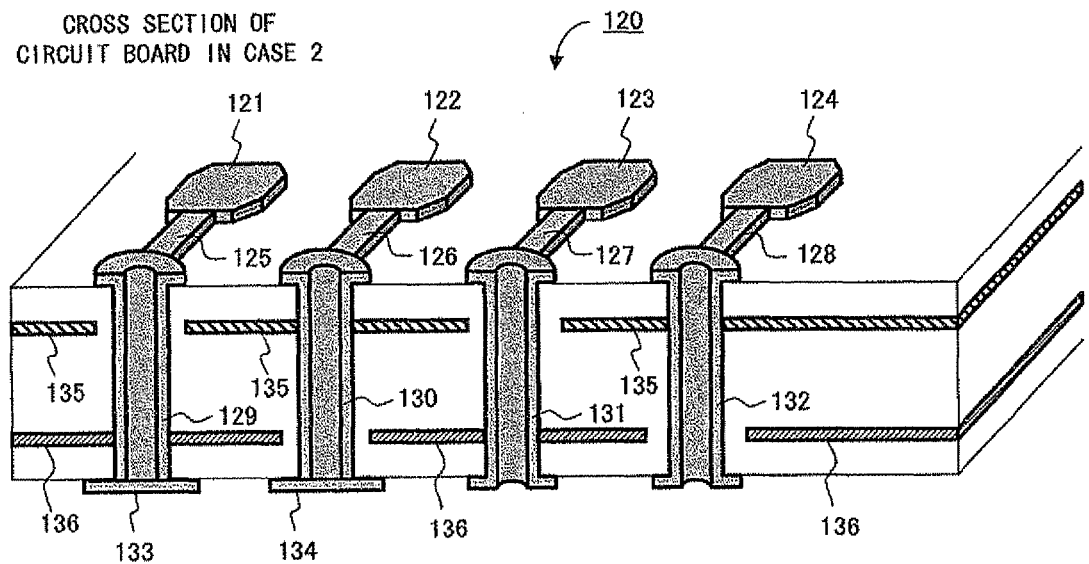
F I G. 19B

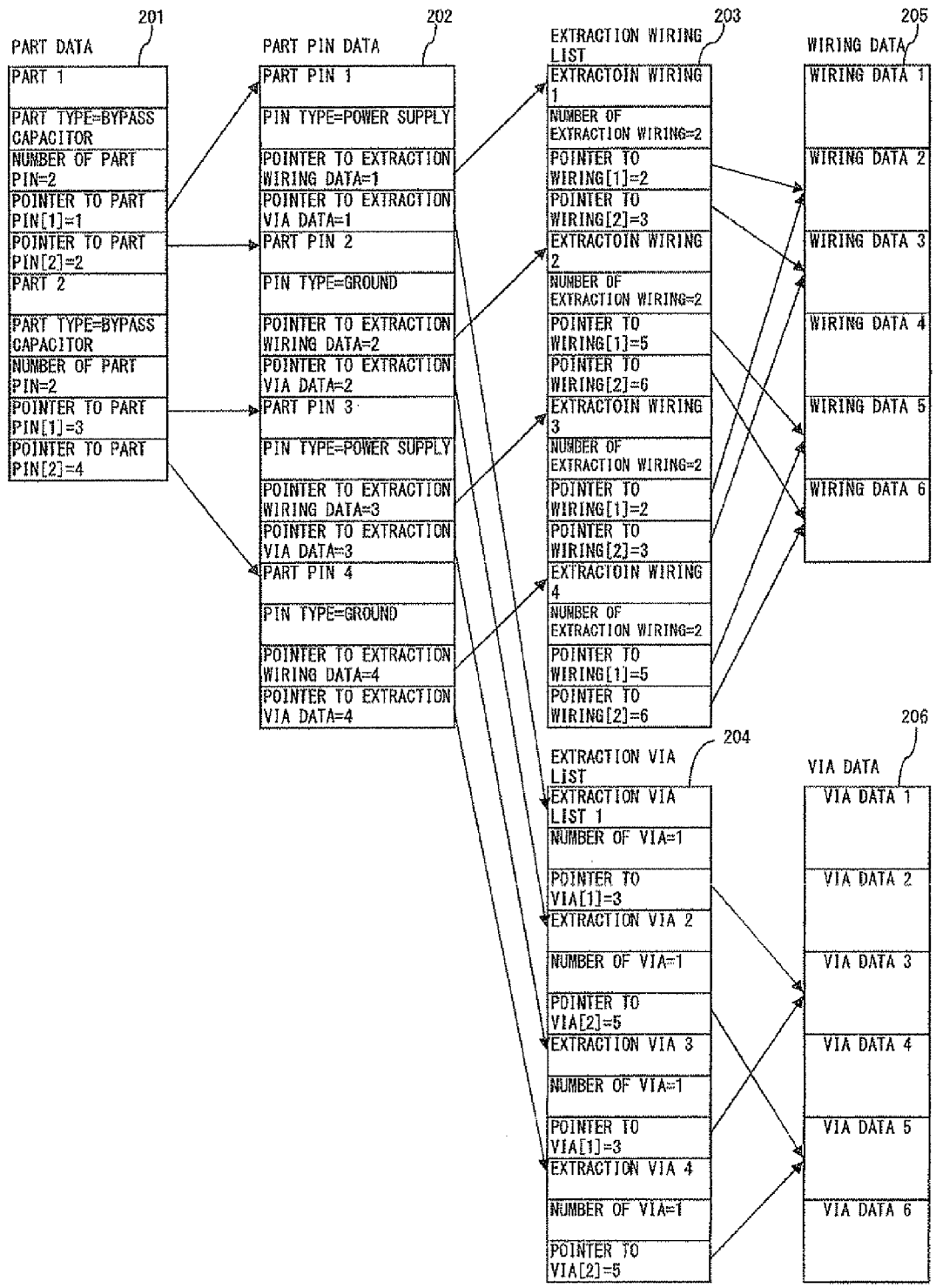
F I G. 2 1 A

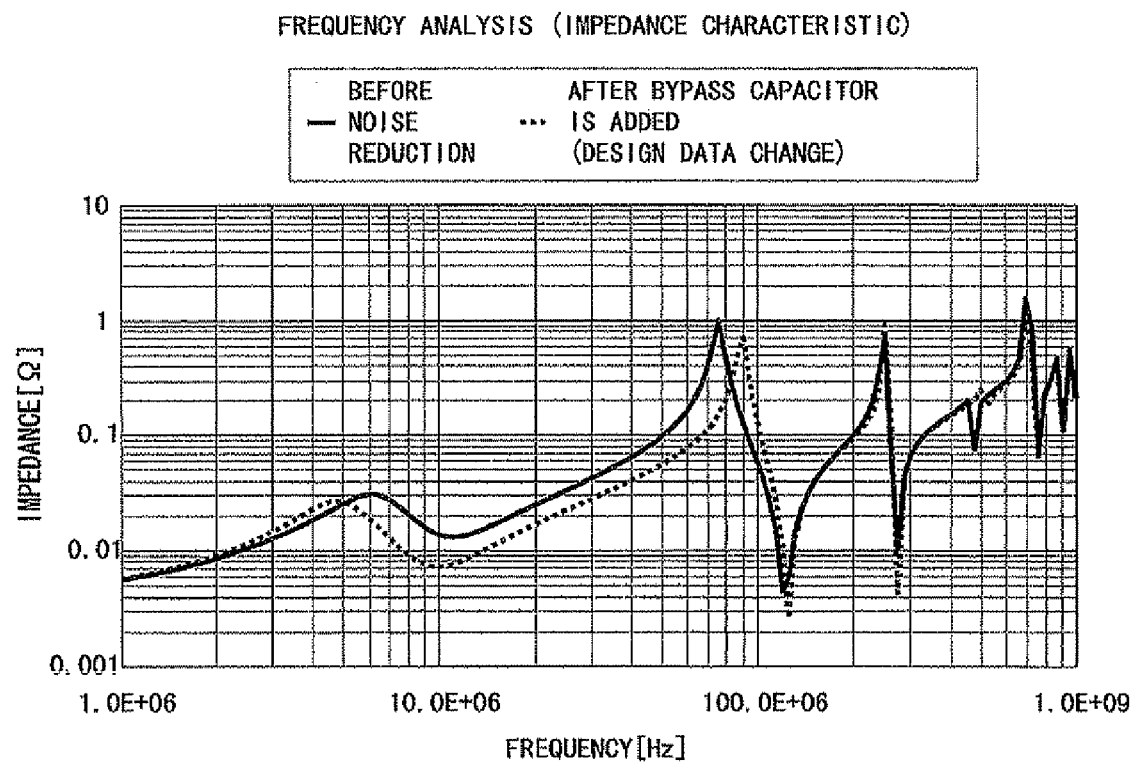
F I G. 22

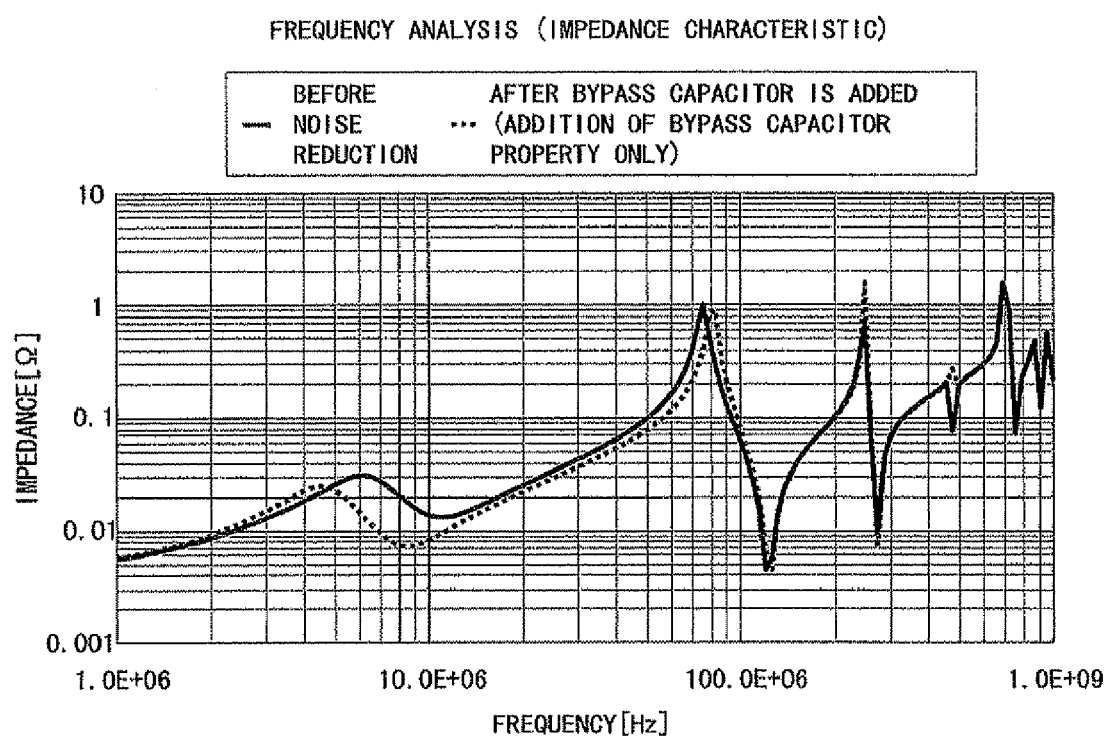
F I G. 2 4

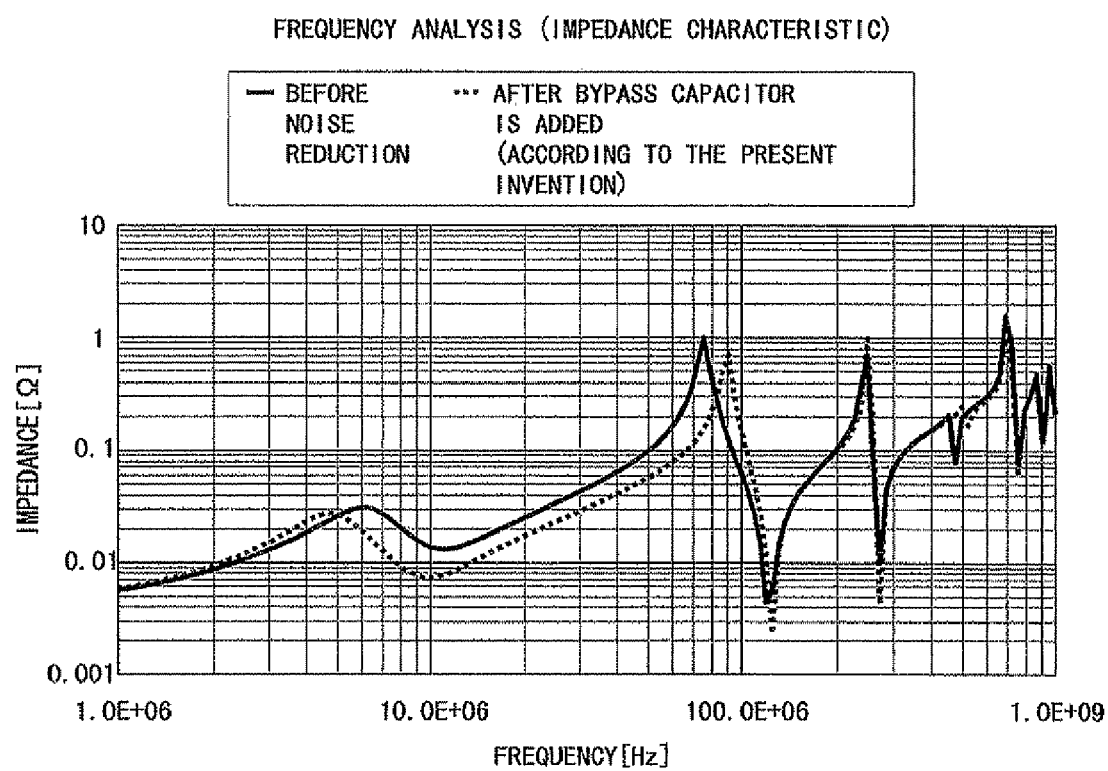
F I G. 2 5

TECHNIQUE FOR CREATING ANALYSIS MODEL AND TECHNIQUE FOR CREATING CIRCUIT BOARD MODEL

BACKGROUND OF THE INVENTION

1. Field of the Invention

The present invention relates to a technique for creating an analysis model and a technique for creating a circuit board model. The present invention particularly relates to techniques for creating an analysis model and a circuit board model for which a bypass capacitor can be added with a light workload that does not involve any change to CAD data.

2. Description of the Related Art

Development of a circuit board such as a printed circuit board (PCB), a multi-tip module (MCM) and an LSI package involves creation of CAD data by performing the circuit board packaging design utilizing circuit board design CAD, and creation of an analysis model from the CAD data and property data of parts. Then, the circuit operation is analyzed by performing a simulation with using a circuit simulator in accordance with the analysis model.

The result of the analysis includes, for example, the impedance in each band and the result of the analysis is then evaluated by the user. When it is rated as power-supply noise is large, certain means needs to be adopted to reduce the power-supply noise. The means for noise reduction is assumed herein as the use of a bypass capacitor.

The addition of a bypass capacitor, however, requires a significantly long time (from a few hours to more than a hundred and several tens of hours) for a series of processes including the change of the circuit board design and creation of the analysis model.

Japanese Patent Application Publication No. 2006-228252 "SEMICONDUCTOR INTEGRATED CIRCUIT DESIGNING APPARATUS, SEMICONDUCTOR INTEGRATED CIRCUIT DESIGNING METHOD, SEMICONDUCTOR INTEGRATED CIRCUIT MANUFACTURING METHOD, AND READABLE RECORDING MEDIA" presents a technique for adding a bypass capacitor near the noise source within a circuit block in order to reduce power-supply noise on a circuit board.

However, the technique presented in the patent document still does not solve the above-mentioned problem that the development requires a significantly long time.

SUMMARY OF THE INVENTION

An object of the present invention is to provide a program for creating a circuit board model, a method for creating a circuit board model and an apparatus for creating a circuit board model that make it possible to perform a simulation for which a bypass capacitor is added with a light workload that does not involve any change to the CAD data, and to obtain a result of the analysis with high accuracy by the simulation.

A first analysis model creation program presented herein is a program for making a computer execute processes for creating, from CAD data of a circuit board, an analysis model to be used for a circuit simulation.

The program comprises the steps of judging an lead-out part of a bypass capacitor when creating the analysis model; and adding a coefficient parameter to a model of an lead-out part of a bypass capacitor. The analysis model corresponds to an analysis call-up part model file 11, a circuit board model file 12 and a part model file 21 shown in FIG. 6.

A second analysis model creation program presented herein is a program for making a computer execute processes for creating, from CAD data of a circuit board, an analysis model to be used for a circuit simulation.

The program comprises the steps of, when calling up an analysis model in order to analyze a condition in which an additional bypass capacitor is disposed for noise reduction, changing a coefficient parameter added to an lead-out part of a bypass capacitor; and adding or changing, a related part in a part model, in accordance with properties of an additional bypass capacitor to be disposed.

A third analysis model creation program is a program according to the first or second analysis model creation program comprising the steps of classifying lead-out methods used for a bypass capacitor; and adding a different coefficient parameter, depending on a difference in the lead-out methods.

A first circuit board model creation program is a program for making a computer execute processes for creating, from CAD data of a circuit board, a circuit board model to be used for a circuit simulation.

The program comprises the steps of creating, referring to part information in the CAD data, a list of lines and a list of vias, the lines and vias leading from a power supply pin or a ground pin of an LSI part and a bypass capacitor; and referring to the created lists of lines and vias, when a line leading from a pin of a target bypass capacitor is not shared as a line leading from a pin of another bypass capacitor but is shared as a line leading from a pin of an LSI part, creating an element of a line part in the circuit board model corresponding to the line leading from a power supply pin or a ground pin of the target bypass capacitor, with a coefficient parameter embedded in a property value of the element by multiplying or dividing the property value by the coefficient parameter.

According the above configuration, a simulation assuming a case in which an addition of a bypass capacitor near a another bypass capacitor provided between a pin and via of an LSI part can be performed, without any process other than the change of the value of a coefficient parameter by which the property value of an element of a line part is to be multiplied or divided, except for the addition a bypass capacitor property model.

Therefore, a simulation can be performed with a bypass capacitor added with a light workload that does not involve any change to the CAD data. In addition, since the added bypass capacitor is in parallel connection with the existing bypass capacitor in the position in which the additional bypass capacitor is disposed, a simulation result with high accuracy can be obtained by adjusting the values of coefficient parameters for multiplication of division.

A second circuit board model creation program is a program for making a computer execute processes for creating, from CAD data of a circuit board, a circuit board model to be used for a circuit simulation.

A second circuit board model creation program comprises the steps of creating, referring to part information in the CAD data, a list of lines and a list of vias, the lines and vias being leading from a power supply pin or a ground pin of an LSI part and a bypass capacitor; and, referring to the created lists of lines and vias, when a line leading from a pin of a target bypass capacitor is not shared as a line leading from a pin of another bypass capacitor and is not shared as a line leading from a pin of an LSI part either, and a via leading from a pin of the target bypass capacitor is not shared as a via leading from a pin of an LSI part, creating an element of a line part in the circuit board model corresponding to the line leading from a power supply pin or a ground pin of the target bypass capacitor, with a coefficient parameter embedded in a property value of the element by multiplying or dividing the property value by the coefficient parameter, and creating an element of a via part in the circuit board model corresponding to the via leading from a power supply pin or a ground pin of the target bypass capacitor, with a coefficient parameter embedded in a property value of the element by multiplying or dividing the property value by the coefficient parameter.

According to the above configuration, a simulation assuming the addition of a bypass capacitor near a bypass capacitor located at a little distance from a pin of an LSI part by disposing a different via and line can be performed, without any process other than the change of the value of a coefficient parameter by which the property value of an element of a line part and the property value of an element of a via part is to be multiplied or divided, except for the addition a bypass capacitor property model.

Therefore, a simulation can be performed with a bypass capacitor added with a light workload that does not involve any change to the CAD data. In addition, since the added bypass capacitor, (lead-out) line and via are in parallel connection with the existing bypass capacitor having a different via, a simulation result with high accuracy can be obtained by adjusting the values of coefficient parameters for multiplication or division.

The present invention makes it possible to perform a simulation for which a bypass capacitor is added with a light workload that does not involve any change to the CAD data, and to obtain a result of the analysis with high accuracy by the simulation. Therefore, a circuit simulation for which a bypass capacitor is added as for voltage noise reduction can be performed in a short time with high accuracy.

BRIEF DESCRIPTION OF THE DRAWINGS

FIG. 1 is a block diagram showing the main part of a circuit board model creation system according to an embodiment of the present invention;

FIG. 2C is a diagram (part 3) showing a flow for creating a circuit board model;

FIG. 5A is a diagram showing Case 1 of lead-out for a bypass capacitor;

FIG. 5B is a diagram showing Case 2 of lead-out for a bypass capacitor;

FIG. 5C is a diagram showing Case 3 of lead-out for a bypass capacitor;

FIG. 5D is a diagram showing Case 4 of lead-out for a bypass capacitor;

FIG. 12 is a diagram showing the area in CAD data around a pin of an LSI part;

FIG. 14B is a flowchart (part 2) of case classification processes for lines leading from a power supply pin or a ground pin of a bypass capacitor, vias connected to the leading lines, and vias connected directly to the power supply pin or the ground pin of a bypass capacitor;

FIG. 16 is a diagram showing, regarding L (inductor), an example in which no coefficient parameter is embedded and an example in which a coefficient is embedded by means of multiplication;

FIG. 15B is a diagram showing a cross section of a circuit board corresponding to the data shown in FIG. 18A;

FIG. 11E is a diagram showing a circuit board model corresponding to FIG. 18D;

FIG. 19B is a diagram showing a cross section of a circuit board corresponding to the data shown in 19A;

FIG. 21A is a diagram showing, along with CAD data, a list of lead-out lines and a list of lead-out vias including lead-outs lines and lead-out vias that are classified as corresponding to case 4;

FIG. 22 is a diagram showing an analysis result obtained with a circuit simulation for which a bypass capacitor is added, involving change to design data;

FIG. 24 is a diagram showing a an analysis result obtained with a circuit simulation for which a bypass capacitor is added on the basis of the configuration shown in FIG. 23;

FIG. 25 is a diagram showing an analysis result obtained with a circuit simulation for which a bypass capacitor is added, and the values of coefficient parameters embedded in a corresponding line part are adjusted in accordance with the addition of the bypass capacitor, by using the method according to the present embodiment.

DESCRIPTION OF THE PREFERRED EMBODIMENTS

Figure 2A:
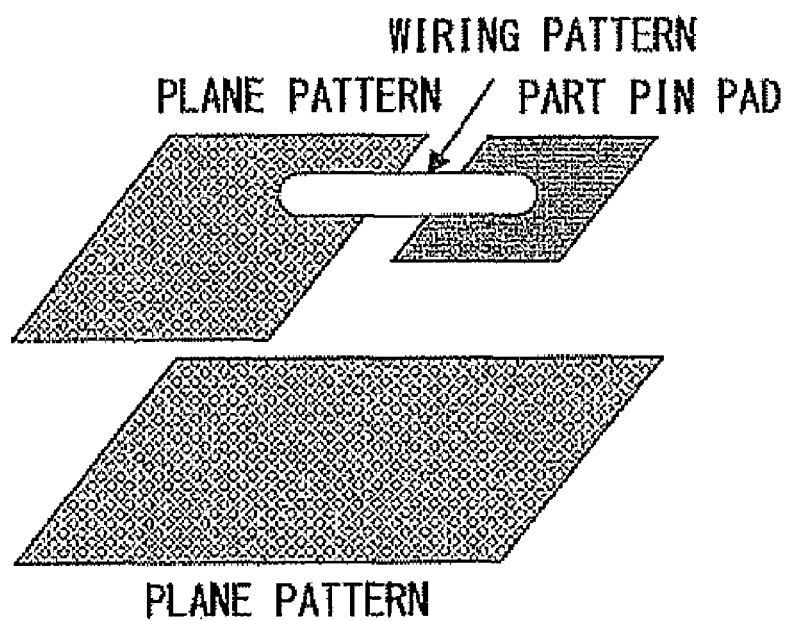
FIG. 2A is a diagram (part 1) showing a flow for creating a circuit board model.

Hereinafter, an embodiment of the present invention is described in detail, referring to the drawings.

FIG. 1 is a block diagram showing the main part of a circuit board model creating system according to a present embodiment.

In FIG. 1, a circuit board model creation processing unit 2 performs a process for creating a circuit board model 3 on the basis of CAD data 1 of a circuit board. A part model creation processing unit 4 is a user interface unit (UI unit) that is operated by the user to create a part model 5.

The circuit board model creation processing unit 2 also has function as a UI unit that is operated by the user to create an analysis call-up part model 7 that specifies how the circuit board model 3 and the part model 5 are to be combined.

The CAD data comprises, as shown in FIG. 2A, information such as shape and position information of a foot pattern (also called a "pin pad") on which a part is mounted, shape and position information of a surface pattern, and shape and position information of a line pattern that connects the surface pattern and the pin pad.

Figure 2B:
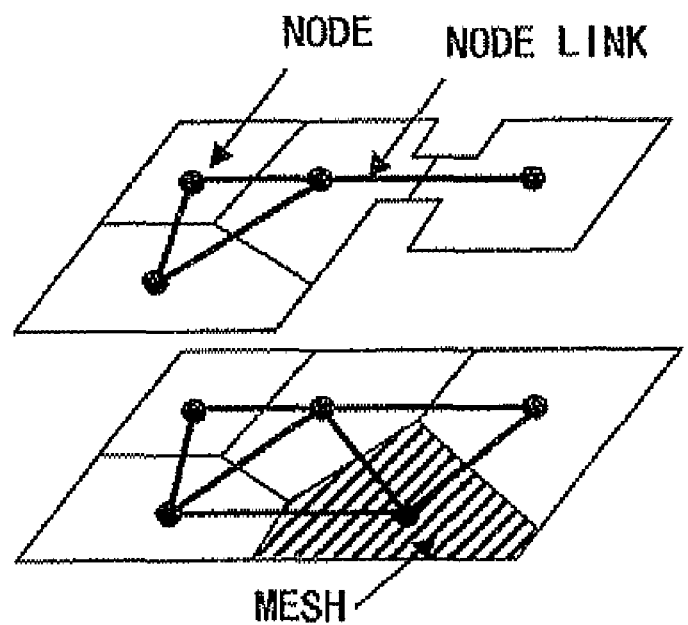
FIG. 2B is a diagram (part 2) showing a flow for creating a circuit board model.

The circuit board model creation processing unit 2 in FIG. 1 reads in the CAD data 1, and divides planes such as a power supply plane and a ground plane into meshes each having a node as shown in FIG. 2B. As shown in FIG. 2C, an equivalent inductor (L), resistor (R) and capacitor (C) are assigned to the node links that connect between the meshes/nodes.

Figure 3:
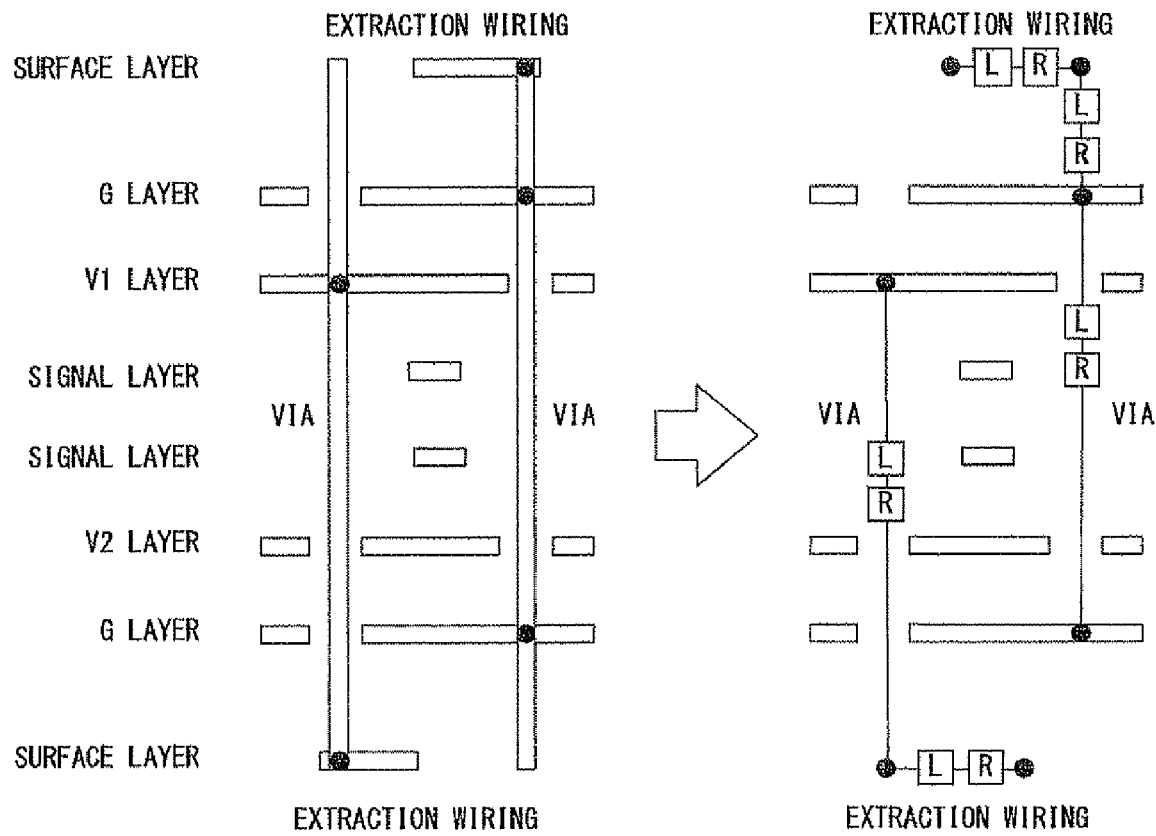
FIG. 3 is a diagram showing CAD data and a circuit board model corresponding to the CAD data.

FIG. 3 is a diagram showing CAD data and a circuit board model corresponding to the CAD data.

The example shown in FIG. 3 is an eight-layer board that has a laminated structure in which conductors and dielectrics are layered in an alternating manner. In the eight layers, the first and eighth layers are called surface layers, on which a pin pad for a part and lead-out lines in the flowcharts shown in FIG. 9 and beyond are disposed.

The second through seventh layers are called inner layers, on which a power supply plane, a ground plane, a signal line, etc. are disposed. In the inner layers, a layer which is mostly covered by the power supply plane is called a "power supply layer," and one mostly covered by the ground plane is called a "ground layer."

In FIG. 3, the CAD data shown on the left distinguishes the lines and the via (VIA)s, while the circuit board model on the right converts both the lines and the vias into equivalent series values of L, R and C. Meanwhile, C is omitted from the drawing, since the value of C remains almost unchanged because a bypass capacitor is added in this embodiment to reduce the power supply noise.

The circuit board model (CAD data) and the part model are linked through nodes. A node name is automatically generated using a circuit part number and a pin number.

Figure 4:
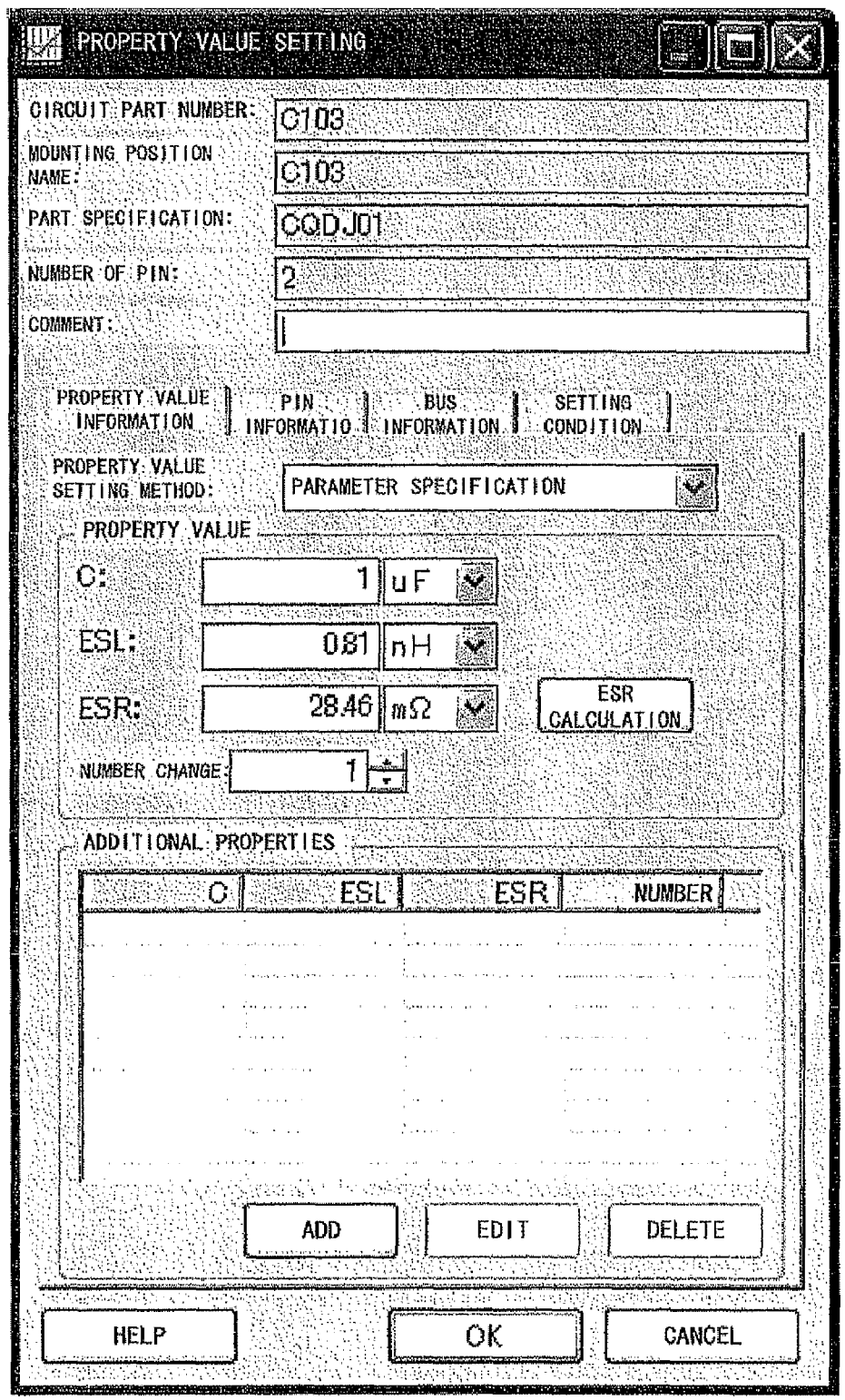
FIG. 4 is a diagram showing an example of a capacitor property value setting screen.

FIG. 4 is a diagram showing an example of a capacitor property value setting screen that is presented by the part model creation processing unit 4 in FIG. 1 to a user.

In FIG. 4, the "CIRCUIT PART NUMBER" uniquely identifies a capacitor part. The "NUMBER OF PIN" represents the number of pins provided for the circuit part. In the case of the capacitor shown in FIG. 4, the number of pin is "2".

The user puts values for the items "C (capacitance)", "ESL (equivalent series inductance)" and "ESR (equivalent series resistance)" shown in the middle of the screen in FIG. 4, to specify the property values (the values of C, ESL and ESR) of the capacitor that is to be connected to the node first.

To add a capacitor to the node, values are input for the items "C", "ESL", "ESR" and "Number" in the additional properties box shown at the bottom of the screen in FIG. 4. The item "NUMBER" represents the number of the capacitors to be added, which is usually set as "1".

In this embodiment, classification into four cases (Case 1, Case 2, Case 3 and Case 4) shown in FIGS. 5A through 5D is performed by analyzing CAD data.

FIG. 5A shows Case 1 in which a bypass capacitor and an LSI part respectively have different lead-out vias. FIG. 5B shows Case 2 in which the mounting pad for a bypass capacitor is directly attached on the back of the lead-out vias of an LSI part (the case is referred to as "chip on hole" or "pad on via").

Case 1 and Case 2 are adopted for an LSI part having a large number of pins. Since such an LSI part does not have a large space around pins, the bypass capacitor cannot be added around the pins.

In Case 1, the existing bypass capacitor having lead-out vias that are different from the lead-out vias of the LSI part is identified as corresponding to Case 1, and the property values of the elements of a corresponding line part and via part in the circuit board model are generated in advance, with coefficient parameters embedded in the values. Then, the simulation assuming the addition of another bypass capacitor by disposing vias, lead-out lines and a pin pad for mounting a part (bypass capacitor) near the bypass capacitor is performed, by adding a model comprising the bypass capacitor properties corresponding to the additional bypass capacitor, and by adjusting the value of the coefficient parameters embedded in the property values of the elements of the corresponding line part and via part.

In Case 2, the bypass capacitor is mounted on the surface layer opposite to the surface layer on which the LSI part is mounted. On the surface layer, the bypass capacitor is mounted on a pin pad for mounting a part disposed on the via land of the lead-out vias for the pins of the LSI part, and the bypass capacitor is identified as corresponding to Case 2. Then, a known searching process is performed to find a space, near the bypass capacitor disposed on the surface layer opposite to the LSI, in which another bypass capacitor can be disposed by providing a pin pad for mounting a part on the via land of the lead-out vias for the pins of the LSI part. The simulation assuming the addition of another bypass capacitor in the space is performed by adding a model comprising the bypass capacitor properties corresponding to the additional bypass capacitor. Case 2 has a greater noise-reduction effect than that of Case 1, since a bypass capacitor can be added closer to a LSI part being the noise source. However, since Case 2 requires more costs, the addition method in Case 1 is adopted more frequently.

FIG. 5C shows Case 3 in which a bypass capacitor and a LSI part share the same lead-out vias, and the LSI, bypass capacitor and vias are connected by lines in that order.

Case 3 is adopted for an LSI part having a large space around pins or having a small number of pins. In Case 3, the bypass capacitor disposed between the pins of the LSI part and the vias is identified as Case 3, and the property values of the elements of a corresponding line part in the circuit board model are generated in advance, with coefficient parameters embedded in the values. Then, the simulation assuming the addition of another bypass capacitor in parallel is performed, by adding a model comprising the bypass capacitor properties corresponding to the additional bypass capacitor, and by adjusting the value of the coefficient parameters embedded in the property values of the elements of the corresponding line part. Case 3 has a high noise-reduction effect, as the additional bypass capacitor is added to a position close to a pin of an LSI component.

FIG. 5D shows Case 4 in which a plurality to bypass capacitors share one lead-out part. In case 4, the position to add another bypass capacitor (between the existing plurality of bypass capacitors, or, opposite to the side on which the existing plurality of bypass capacitors are mounted, etc.) affect the properties. This Case 4 is excluded from the cases in this embodiment for which the simulation assuming the addition of the bypass capacitor with a light workload that does not involve any change to CAD data, since the positioning shown in the case is often a result of a condition that the components are packed too closely to each other without leaving any room for disposing a via. In addition, even if a bypass capacitor is added in Case 4, there would be little improvement in the simulation result (impedance).

Figure 6:
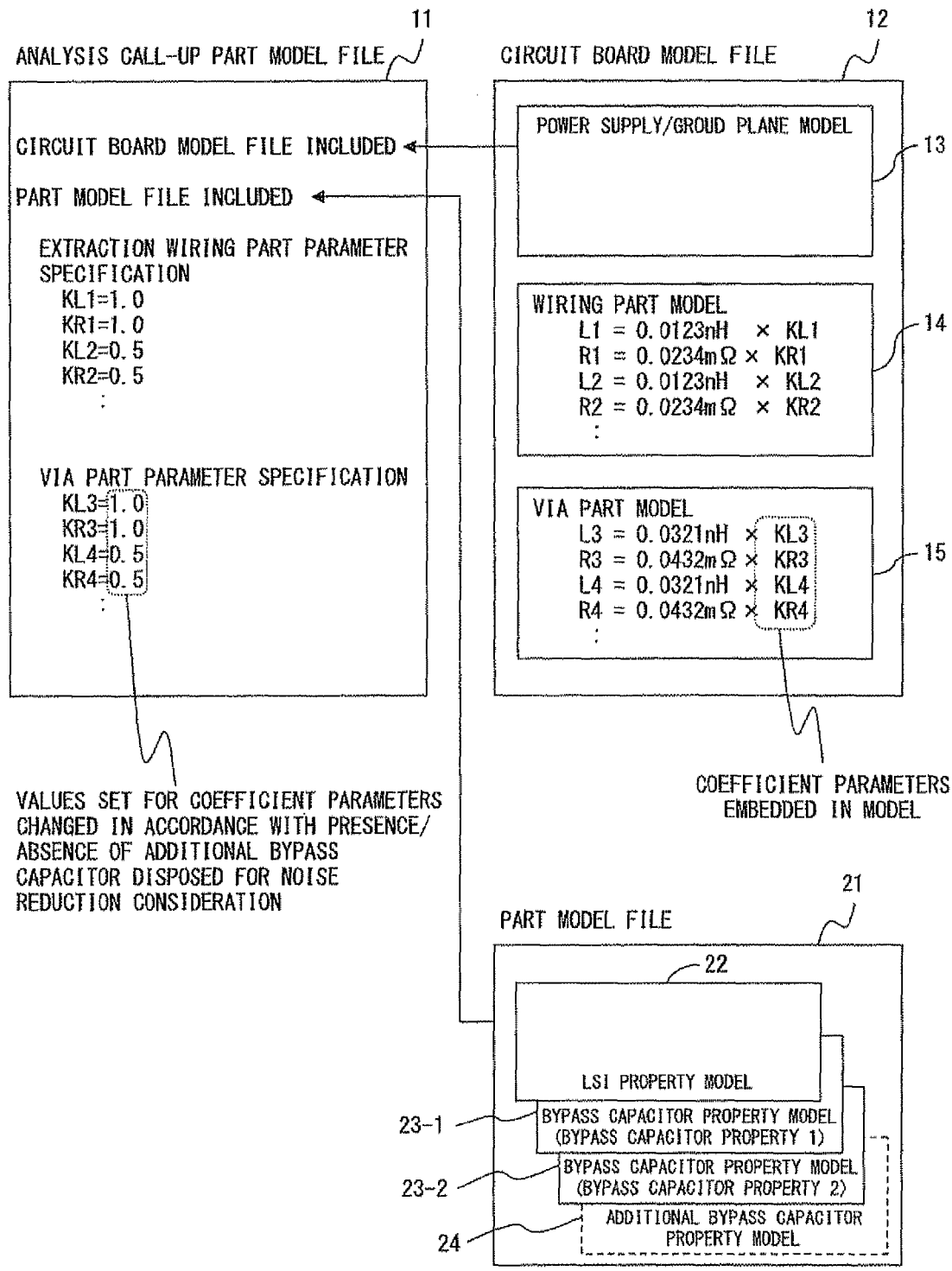
FIG. 6 is a diagram showing output files from a circuit board model creation processing unit and a part model creation processing unit shown in FIG. 1.

FIG. 6 is a diagram showing output files from the circuit board model creation processing unit 2 and the component model creation processing unit 4 in FIG. 1.

The circuit board model creation processing unit 2 reads in CAD data and outputs a circuit board model file 12 shown in FIG. 6. The circuit board model file 12 comprises a power supply/ground plane model 13, a line part model 14, a via part model 15.

In the line part model 14, the values of the elements (i.e., L, R and C, but C is omitted here to simplify the description, as the addition of a bypass capacitor has little influence on the value of C) of the line part corresponding to Case 1 or Case 3 according to the above-described classification are multiplied by coefficient parameters KL1, KR1, KL2 and KR2. Meanwhile, for a line part corresponding to the cases other than Case 1 and Case 3 or a line part that does not correspond to either of the cases, the values of the elements are determined without embedding coefficient parameters (not shown in the drawing).

In the via part model 15, the values of the elements (i.e., L, R and C, but C is omitted here to simplify the description, as the addition of a bypass capacitor has little influence on the value of C) of the via part corresponding to Case 1 according to the above-described classification are multiplied by coefficient parameters KL3, KR3, KL4 and KR4. Meanwhile, for a via part corresponding to the cases other than Case 1 or a via part that does not correspond to either of the cases, the values of the elements are determined without embedding coefficient parameters (not shown in the drawing).

A part model file 21 is created by the user using a UI (the part model creation processing unit 4) and comprises, for example, an LSI property model 22, a bypass capacitor property model 23-1 for a bypass capacitor 1, and a bypass capacitor property model 23-2 for a bypass capacitor 2 and a bypass capacitor property model 24 for a bypass capacitor added for noise reduction.

An analysis call-up part model file 11 is created by the user using the circuit board model creation processing unit 2 as a UI, specifying which circuit board model file and which part model file are to be included.

The values of the coefficient parameters embedded in the included circuit board model file are also specified. In this example, the coefficient parameters are specified as: KL1=KR1=1.0, KL2=KR2=0.5, KL3=KR3=1.0, KL4=KR4=0.5, indicating that a bypass capacitor has been added to a pin connected to the line part for which the coefficient parameters KL2 and KR2 are multiplied, and to the via part for which the coefficient parameters KL4 and KR4 are multiplied.

Figure 7A:
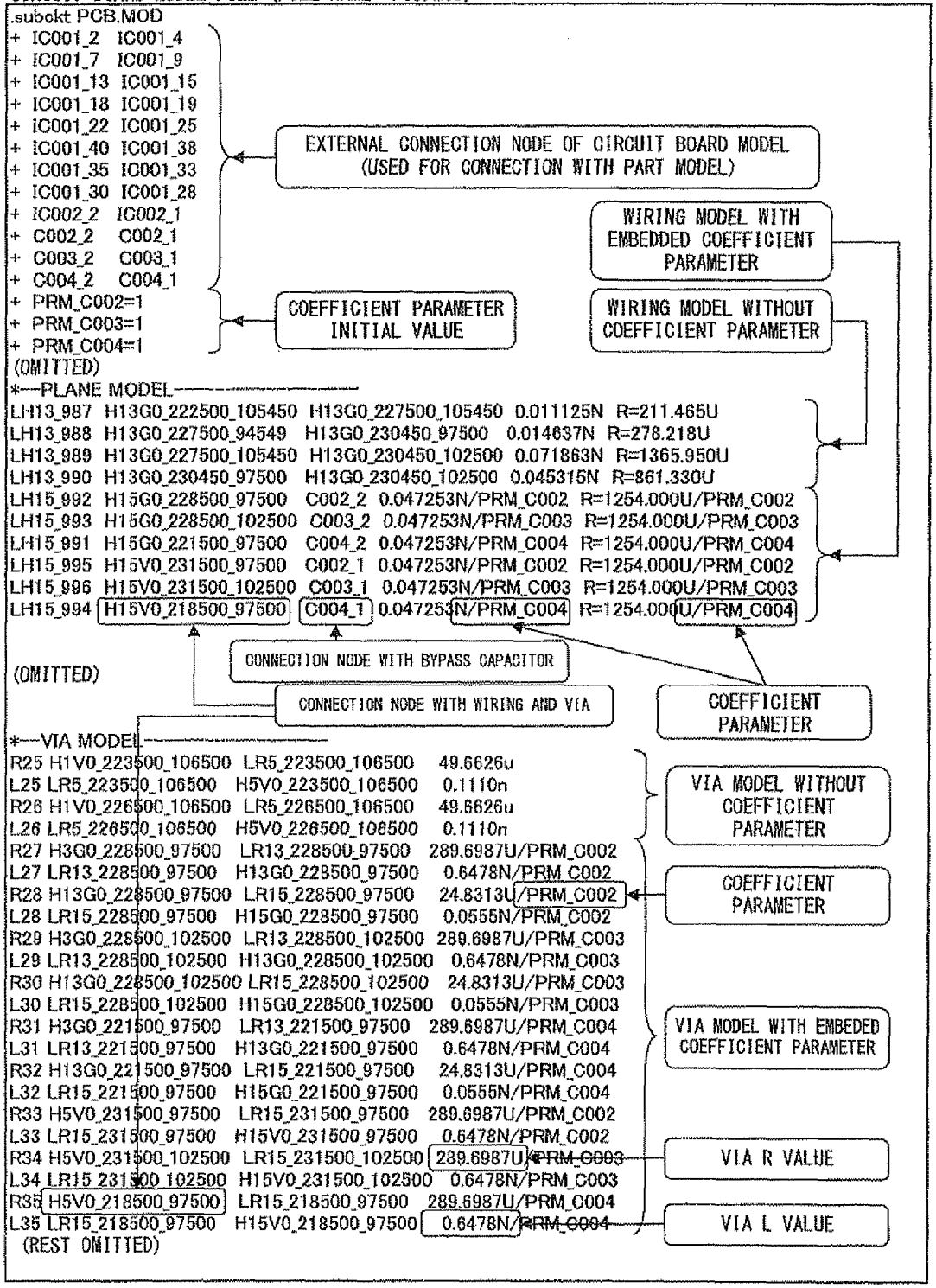
FIG. 7A is a diagram showing a more concrete example of a circuit board model file.

FIG. 7A is a diagram showing a more concrete example of a circuit board model file.

The file name of a circuit board model file shown in FIG. 7A is "PCB.MOD".

A predetermined number of rows from the top of the file specify nodes to be used by the circuit board model for its connection to a part model. In this case, "IC001," "IC002" are the names of LSI parts, and "C002", "C003", "C004" are the names of bypass capacitors. Meanwhile, "PRM_C002", "PRM_C003", "PRM_C004" represent coefficient parameters by which the values of the inductor (L) and resistor (R) are to be divided.

The number that follows the component name and the under score "_" is a pin number of the component. For example, "IC001_15" represents the number-15 pin of the LSI part "IC001", and "C002_2" represents the number-2 pin of the bypass capacitor "C002".

A predetermined number of rows after the row starting with "-PLANE MODEL-" in FIG. 7A describe line part models. The head of each row (for example, "LH15_994") represents the inductance corresponding to a line part. The value of the inductance is specified in the same row as "0.04253N/PRM_C004 (N representing nano)". Meanwhile, "R=1254.000U/PRM_C004 (U representing μ (micro))" in the same row represents the resistance value of the inductor, "PRM_C004" representing the coefficient parameter by which the value of the inductor (L) and resistor (R) are to be divided.

In FIG. 7A, the four rows starting with "LH13_987" through "LH13_990" represent the line model for which coefficient parameters are not to be embedded, and the six rows starting with "LH15_992" through "LH15_994" represent the line models for which coefficient parameters are to be embedded.

A predetermined number of rows after the row starting with "-VIA MODEL-" in FIG. 7A describe the via part models. For example, the pair of "R34" and "L34" corresponds to the elements on one side of a power supply plane or a ground plane to which the via is connected, and the pair "R35" and "L35" corresponds to the elements on the other side of the power supply plane of the ground plane to which the via is connected.

In FIG. 7A, the four rows starting with "R25" through "L26" represent the line models to which coefficient parameters are not to be embedded, and the eighteen rows starting with "R27" through "R35" represent the line models to which coefficient parameters are to be embedded.

In FIG. 7A, for example, "H15V0_218500_97500" and "C004_1" in the row starting with "LH15_994" represent node names. In addition, "LR15_218500_97500" and "H15V0_218500_97500" in the row starting with "L35" also represent node names.

In the example shown in FIG. 7A, the node name "H15V0_218500_97500" appears in the rows starting with "LH15_994" and "L35", indicating that the line part "LH15_994" is connected to the via part having the element "L35". Meanwhile, the line part "LH15_994" also have the node "C004_1", indicating that the line part "LH15_994" is connected to the number-1 pin of the bypass capacitor "C004."

Figure 7B:
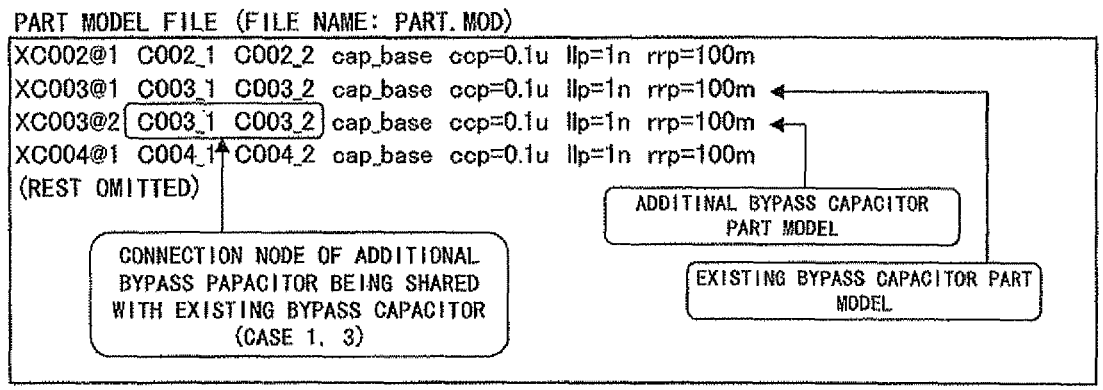
FIG. 7B is a diagram showing a more concrete example of a part model file.

FIG. 7B is a diagram showing a more concrete example of a part model file.

The file name of a part model file shown in FIG. 7B is "PART.MOD".

The head of each row has a description of a part call-up command in the form of "XC???@*". When the part is a capacitor, the description "C???" corresponds to the value that is set for the item "CIRCUIT PART NUMBER" in the capacitor property value setting screen shown in FIG. 4 for example. The description "*" represent the number of the capacitor set on the capacitor property value setting screen.

For example, "XC003@1" indicates that the target of the call-up is the first capacitor for which property values have been set on the capacitor property value setting screen, with the "CIRCUIT PART NUMBER" being set as "C003". In the row of "XC003@1", the second and third columns have "C003_1" and "C003_2" respectively, representing the connection nodes of the part. The description "XC003@2" indicates that the target of the call-up is the second capacitor for which property values have been set on the capacitor property value setting screen, with the "CIRCUIT PART NUMBER" being set as "C003". In the row of "XC003@2", the second and third columns have "C003_1" and "C003_2" respectively, corresponding to the connection nodes of the part "XC003@1."

Figure 7C:
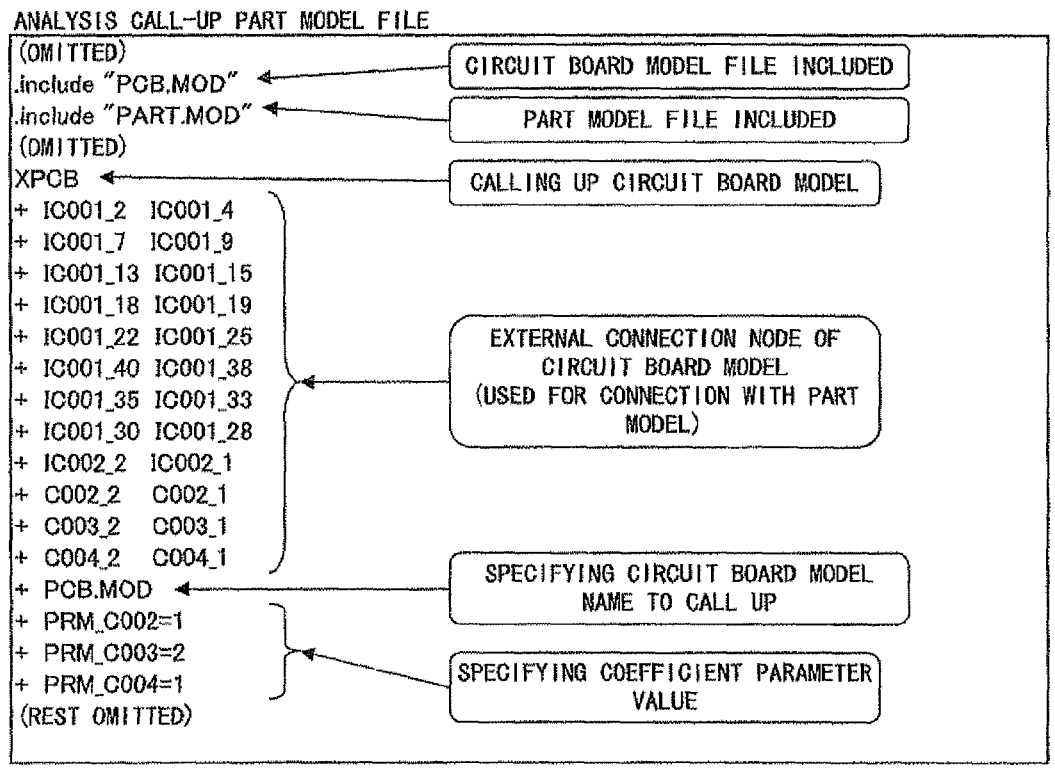
FIG. 7C is a diagram showing a more concrete example of an analysis call-up model file.

FIG. 7C is a diagram showing a more concrete example of an analysis call-up part model file.

The first two rows starting with ".include" in the file in FIG. 7C specify that the circuit board model file "PCB.MOD" shown in FIG. 7A and the part model file "PART.MOD" shown in FIG. 7B are to be included, that is, to be combined for use.

Meanwhile, the row starting with "XPCB" is for calling up a circuit board model. The twelve rows following the row "XPCB" specify the nodes of the circuit board model for external connection. The row "PCB.MOD" following the twelve rows specifies the name of the circuit board model to be called up. The three rows following the row "PCB.MOD" specify the values of the coefficient parameters embedded in the circuit board model. The default value of the coefficient parameter is "1" and the value increases (since the coefficient parameter is for dividing the property values in this case) with each addition of a bypass capacitor.

Figure 8A:
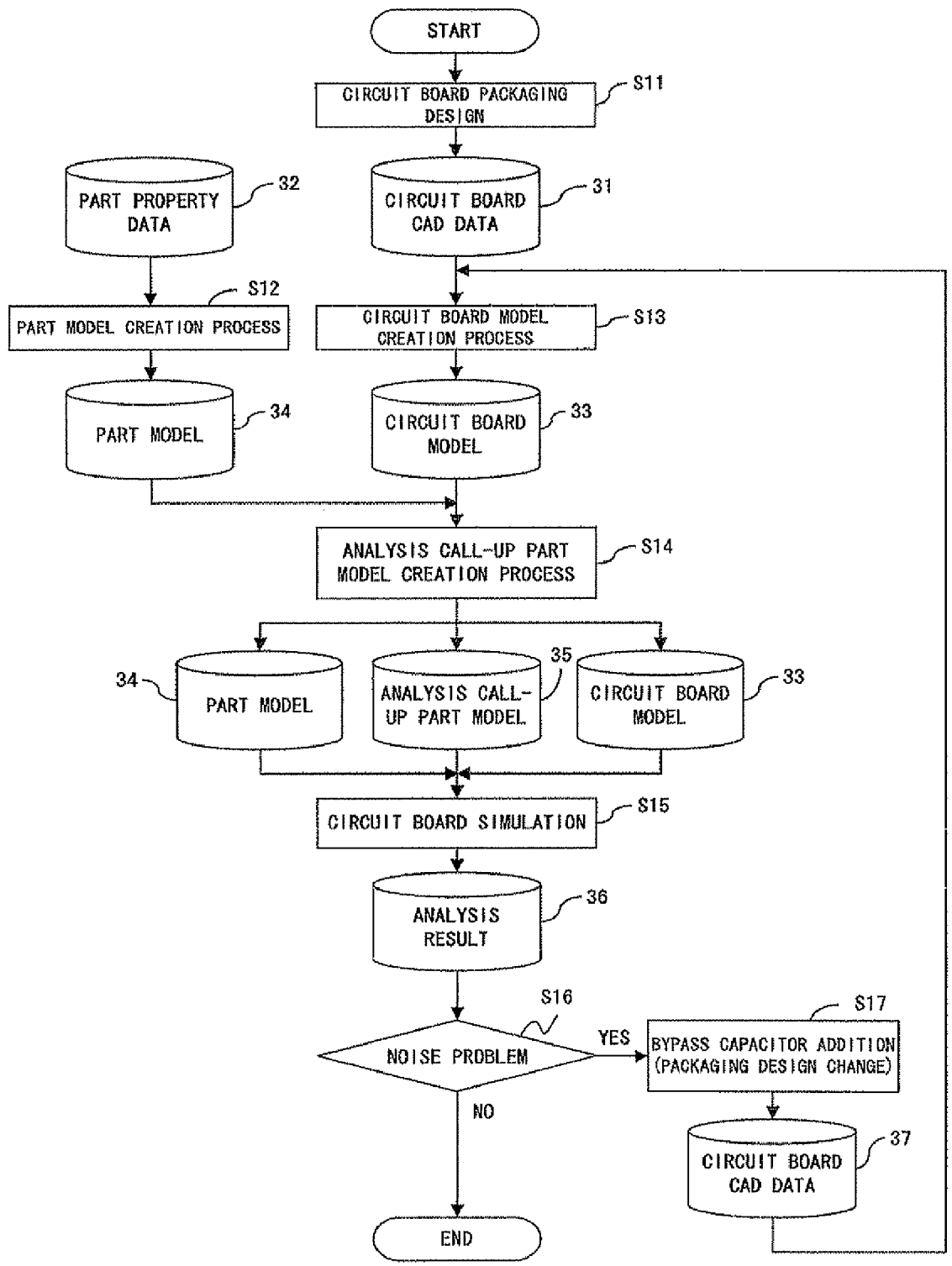
FIG. 8A is an overall flowchart showing conventional processes including processes from the circuit board packaging design to the design change performed on the basis of the feedback of a simulation result.

FIG. 8A is an overall flowchart showing conventional processes including processes from the circuit board packaging design to the design change on the basis of the feedback of the simulation result.

The circuit board packaging design using CAD software (not showing in the drawing) is performed in step S11 in FIG. 8A, generating CAD data 31 of a circuit board as a result of the designing work.

Meanwhile, in step S12, a part model 43 is created from part property data 32 using a UI (part model creation processing unit).

In step S13, a circuit board model creation processing is performed by being given an activation instruction to the circuit board model creation processing unit by the user, to create a circuit board model 33 from the CAD data 31 obtained as the result of the work in the Step S11. In the following step S14, an analysis call-up part model 35 is created using the circuit board model creation processing unit as a UI. The model 35 contains specifications such as that the circuit board model 33 and the part model 34 are to be combined for use. Then in step S15, a circuit simulation is performed using a known circuit simulator such as SPICE (Simulation Program with Integrated Circuit Emphasis).

The user judges, regarding an analysis result 36 of the circuit simulation, for example, whether or not the impedance is kept low enough in a desired band, to determine presence/absence of a noise problem in step S16. When there is no noise problem, the series of development processes are completed. When there is a noise problem, conventionally, the user conducts a package design changing work by executing the CAD software again. The package design changing work requires a considerable amount of time, because, the addition of a bypass capacitor to a desired position requires relocation of parts around the position and so on. CAD data 37 is obtained as a result of the work, and the processes in the steps after S11 are performed (or, the process in the step S12, as needed), using the CAD data 37.

Figure 8B:
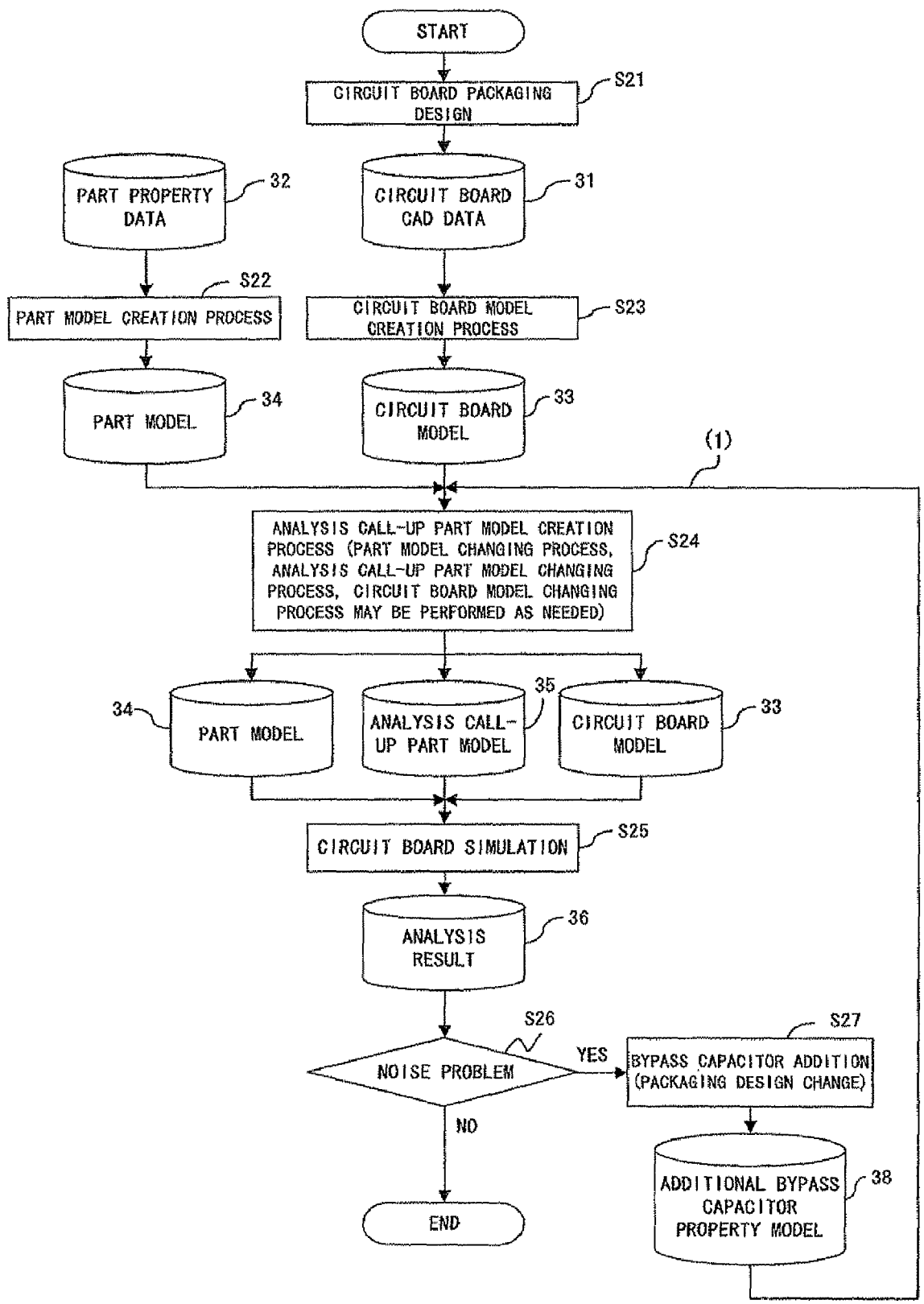
FIG. 8B is an overall flowchart showing processes of the present embodiment including processes from the circuit board packaging design to the addition of a part model on the basis of the feedback of a simulation result.

FIG. 8B is an overall flowchart showing processes of the present embodiment, including processes from the circuit board packaging design to the addition of a part model on the basis of the feedback of a simulation result.

The processes in steps S21-S26 in FIG. 8B are the same as the steps S11-S16 in FIG. 8A respectively. The explanation is omitted accordingly.

If there is a noise problem according to the judgment in step S26 in FIG. 8B, and if the part corresponds to Case 1 or Case 3 according to the case classification in the present embodiment, then a bypass capacitor property model 38 corresponding to the bypass capacitor to be added is created according to the input of the user, using a UI (part model creation processing unit) in step S27, and the values of the coefficient parameters in a correspondent part in the analysis call-up part model 35 are changed to the values corresponding to conditions such as the number of the bypass capacitor(s) to be added.

Meanwhile, if there is a noise problem according to the judgment in the step S26 in FIG. 8B, and if the part corresponds to Case 2 according to the case classification in the present embodiment, then the bypass capacitor property model 38 corresponding to the bypass capacitor to be added is created according to the input of the use, using a UI (part model creation processing unit) in the step 327.

After the addition of the bypass capacitor property model 38 by the work in the step S27, an existing bypass capacitor located near the desired position for the addition of the bypass capacitor is specified by the user in (1), and then performed a creation process of the analysis call-up part model in the step S24 (changing processes for the part model, analysis call-up part model and circuit board model may also be performed as needed). Hereinafter, the process performed in step 23 is described, for each of Case 1 through Case 3.

In Case 1, a call-up command for the additional bypass capacitor having the same pair of nodes as that of the existing bypass capacitor is added in the part model 34, and the values of the coefficient parameters in a correspondent part in the analysis call-up part model 35 are automatically changed to the values corresponding to conditions such as the number of the bypass capacitor(s) to be added. Thus, the step 24 involves a changing process of the part model and a changing process of the analysis call-up part model in this case.

In Case 2, a known search process is activated in the circuit board model creation process, to find vias leading from the pins of the LSI part as the space in which the additional bypass capacitor can be disposed, the space being near the existing bypass capacitor on the surface layer that is opposite to the surface layer on which the pins of the LSI part is provided. Then, a call-up command for the additional bypass capacitor is added in the part model 34, and a circuit board model 33 is created with the node name of the position for disposing the additional bypass capacitor having been changed to the one generated from the name of the additional bypass capacitor. Thus, the step S24 involves a changing process of the part model and a changing process of the circuit board model in this case.

In Case 3, there is no need to perform the search process, as the additional bypass capacitor is to be disposed between the existing bypass capacitor and the vias or between the existing bypass capacitor and the pins of the LSI part. In this case, a call-up command for the additional bypass capacitor having the same pair of nodes as that of the existing bypass capacitor is added in the part model 34, and the values of the coefficient parameters in a correspondent part in the analysis call-up part model 35 are automatically changed to the values corresponding to conditions such as the number of the bypass capacitor(s) to be added. Thus, the step S24 involves a changing process of the part model and a changing process of the analysis call-up part model in this case.

As described above, none of Case 1 through Case 3 involves change of CAD data. Therefore, the processing times for the works to be performed in steps S26 etc. in FIG. 8B is much shorter than the time required for the package design changing work performed in steps S16 etc. in FIG. 8A, significantly reducing the workload put on the operator during the development processes.

Figure 9:
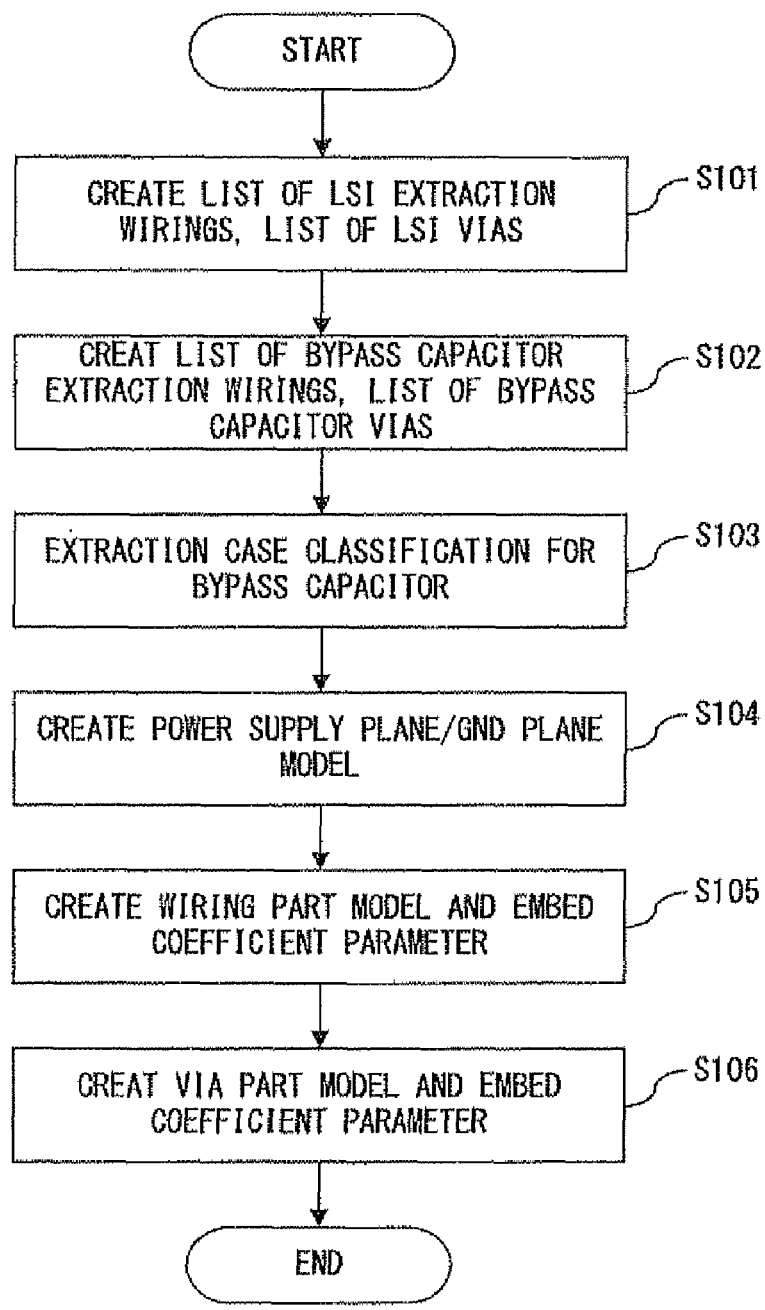
FIG. 9 is a flowchart of a circuit board model creation process.

FIG. 9 is a flowchart of a circuit board model creation process. The processes according to the flowchart are performed by the circuit board model creation processing unit 2 shown in FIG. 1.

In step S101 in FIG. 9, a list of lines leading from power supply pins or ground pins of the LSI part (hereinafter, the list may be referred to as an "lead-out line list") and a list of vias connected to the leading lines (hereinafter, the list may be referred to as an "lead-out via list") are generated.

Next, in step S102, a list of lines leading from power supply pins or ground pins of the bypass capacitor and a list of vias connected to the leading lines, and a list of vias connected directly to the power supply pins and or ground pins of the bypass capacitor are generated.

In step S103 following the step S102, case classification is performed, referring to the lead-outline list and the lead-out via list generated in the steps S101 and S102, for the lines leading from the power supply pins or the ground pins of the bypass capacitor, the vias connected to the lines or the vias connected directly to the power supply pins or ground pins of the bypass capacitor. As a result of the classification, the data of existing lines and vias in CAD data is classified as either of Case 1, Case 2, Case 3 or Case 4, or, as corresponding to none of the cases.

In step S104, a power supply plane/ground plane model is created.

Next, a line part model is generated in step S105. When the line data is classified as Case 1 or Case 3 as a result of the process in the S103 above, coefficient parameters are embedded at the time the model is created for the corresponding line part.

Following the step S105, a via part model is generated in step S106. When the via data is classified as Case 1 as a result of the process in the S103 above, coefficient parameters are embedded at the time the model is created for the corresponding via part.

Figure 10:
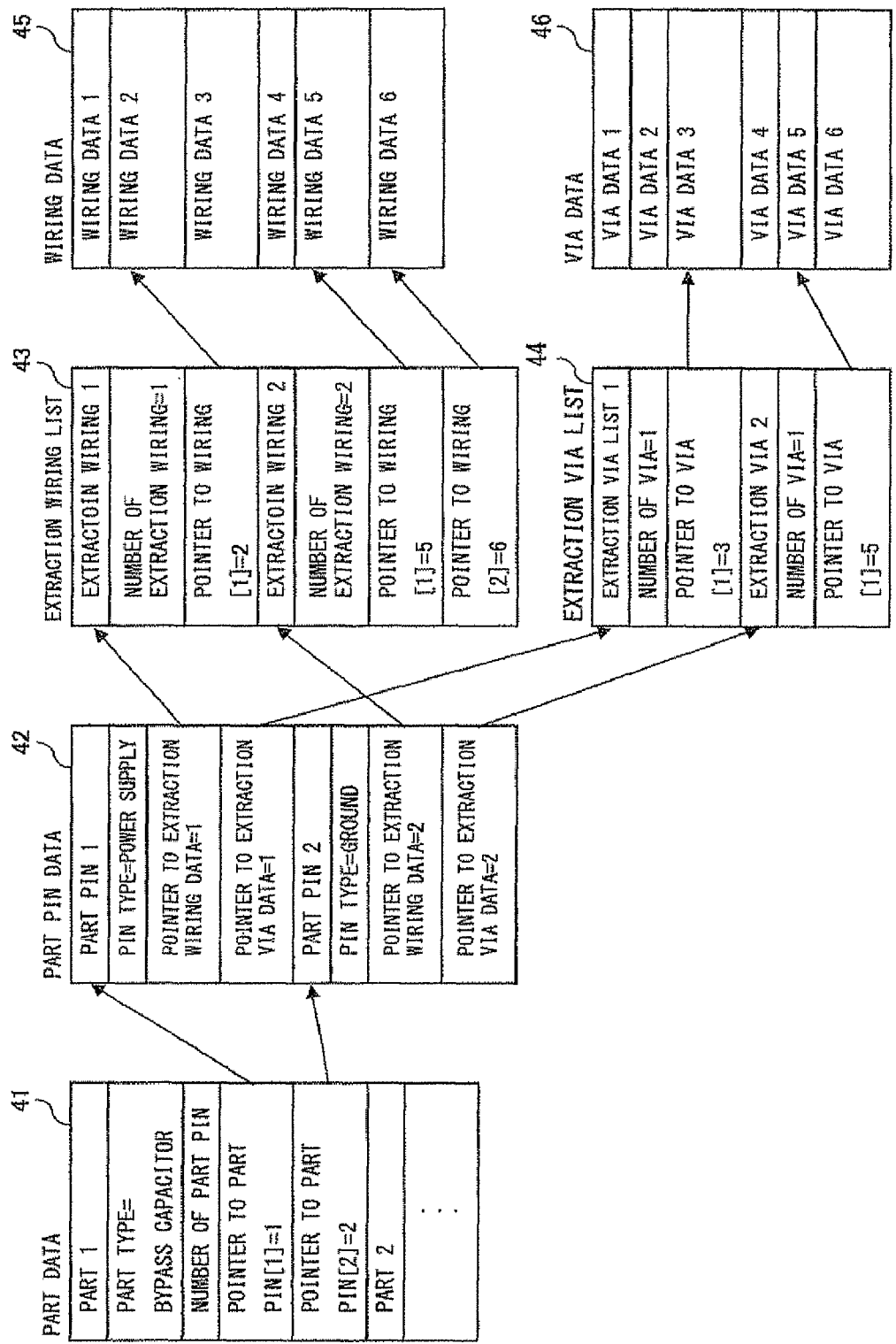
FIG. 10 is a diagram showing, along with existing data in CAD data, a list of lead-out lines and a list of lead-out vias obtained as a result of processes performed in steps S101 and S102 shown in FIG. 9.

FIG. 10 is a diagram showing, along with the existing data in CAD the data, the lead-out line list and the lead-out via list obtained as results of the processes in the steps S101 and S102 shown in FIG. 9.

In FIG. 10, part data 41, part pin data 42, line data 45 and via data 46 are the data originally included in the CAD data.

Pointers to its part pins of each part in the part data 41 respectively points each part pin in the part pin data 42. For a power supply pin and a ground pin (these pins may be referred to as VG pins as needed) of an LSI part and the VG pins of a bypass capacitor in the part pin data 42, items "POINTER TO LEAD-OUT LINE DATA" and "POINTER TO EXTRACTION VIA DATA" are added, by the processes according to the present embodiment (to be described later).

An Lead-out line list 43 is a list of the lines leading from the VG pins of the LSI part or from the VG pins of the bypass capacitor. The item "POINTER TO LEAD-OUT LINE DATA" added to the VG pins of the LSI part or to the VG pins of the bypass capacitor points to one of the lead-out lines listed in the lead-out line list 43.

Each lead-out line in the lead-out line list 43 comprises the item "NUMBER OF LEAD-OUT LINE", followed by the items "POINTER TO LINE", the number of items corresponding to the number of the lead-out lines. The number of the lead-out lines being more than two represents a bent lead-out line.

An lead-out via list 44 is a list of the vias connected to the lines leading from the VG pins of the LSI part, the vias connected to the lines leading from the VG pins of the bypass capacitor, and the vias connected directly to the VG pins of the bypass capacitor. The item "POINTER TO LEAD-OUT VIA DATA" added to the VG pins of the LSI part or to the VG pins of the bypass capacitor points to one of the lead-out vias listed in the lead-out via list 44.

Each lead-out via in the lead-out via list 44 comprises the item "NUMBER OF LEAD-OUT VIA", followed by the item "POINTER TO VIA", the number of the items corresponding to the number of the lead-out vias. The present embodiment describes the case in which the "NUMBER OF VIA" is assumed is "1".

Figure 11A:
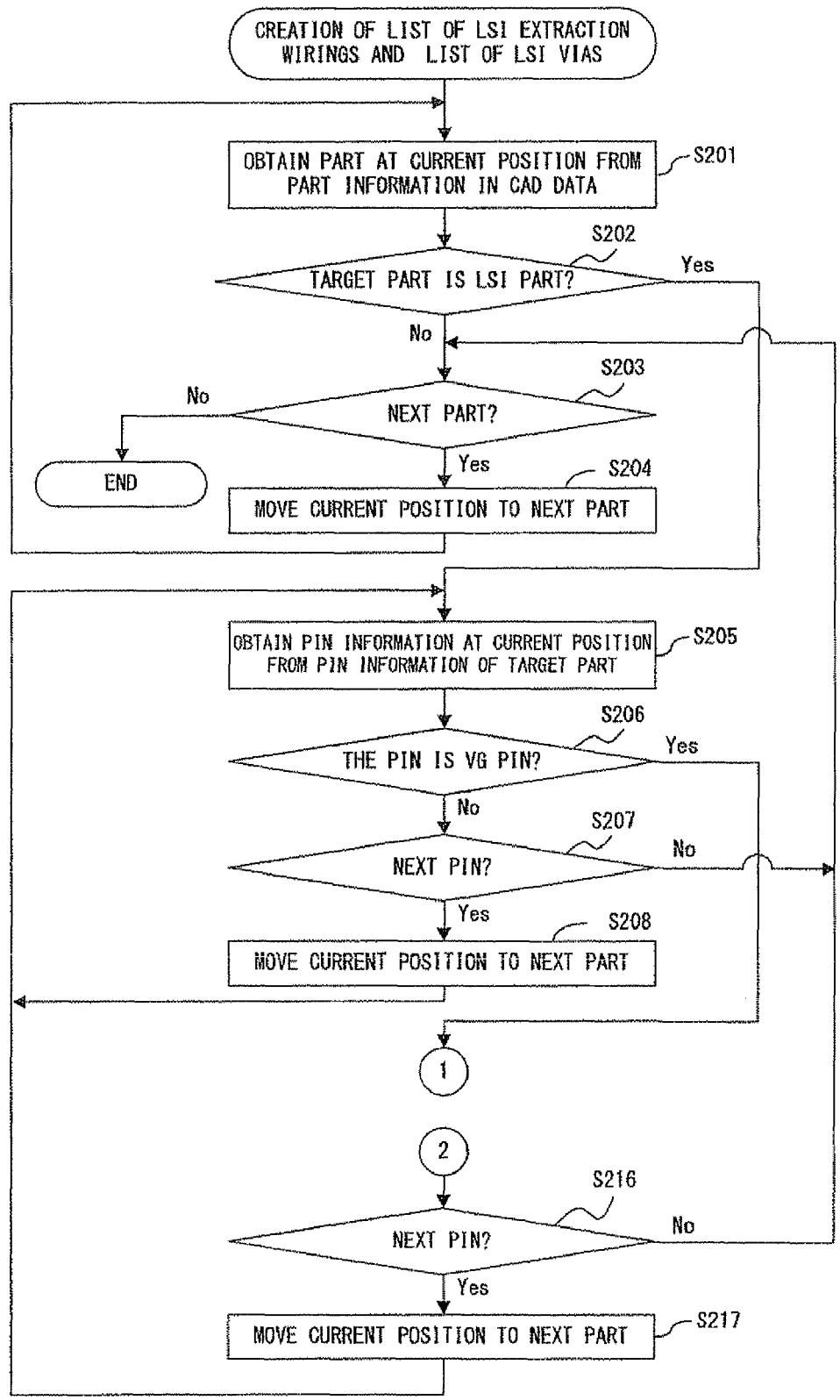
FIG. 11A is a flowchart (part 1) of creation processes for a list of lines leading from a power supply pin or a ground pin of an LSI part and a list of vias connected to the leading lines.
Figure 11B:
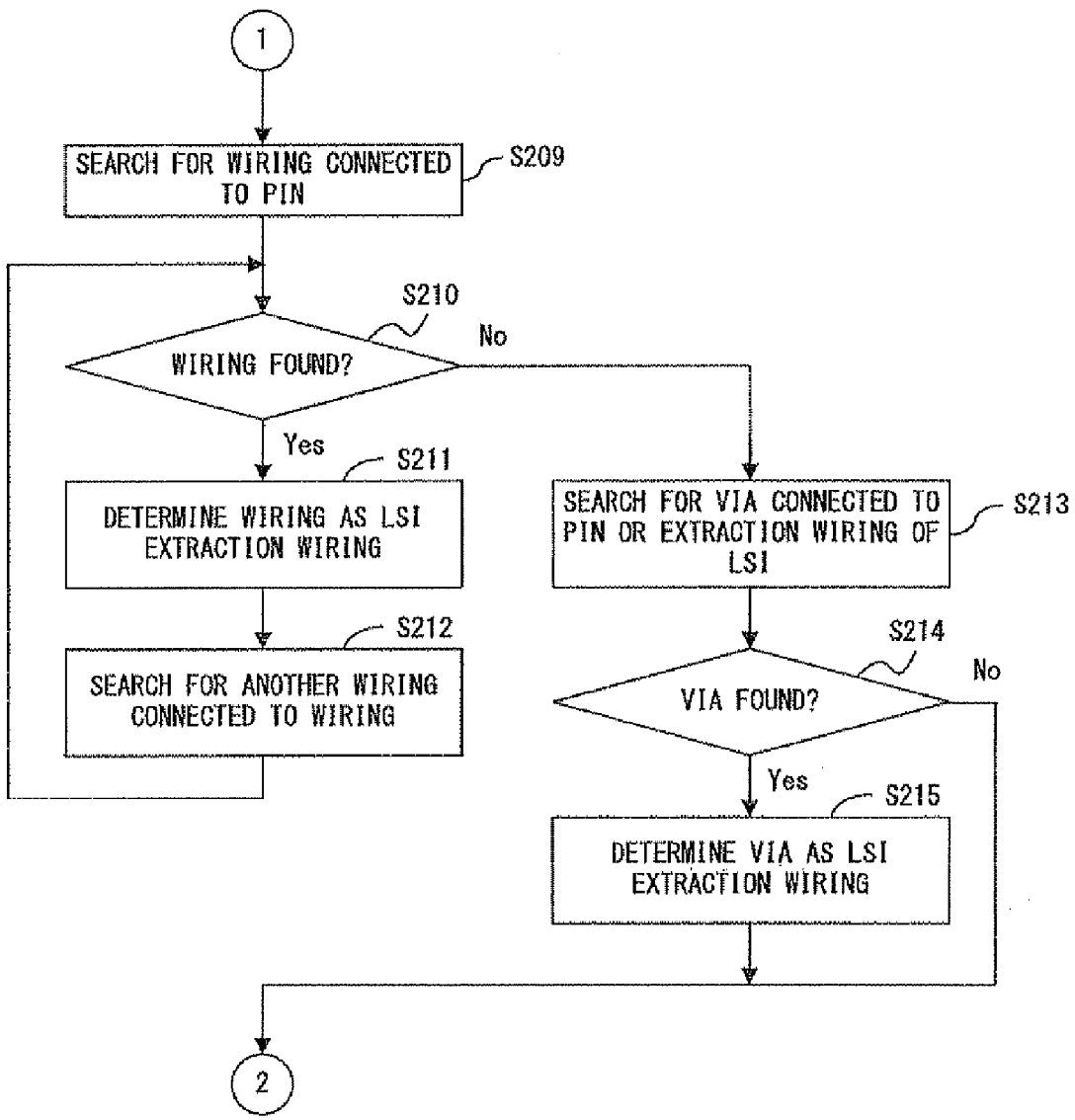
FIG. 11B is a flowchart (part 2) of creation processes for a list of lines leading from a power supply pin or a ground pin of an LSI part and a list of vias connected to the leading lines.

FIGS. 11A and 11B are flowcharts of creation processes of a list of lines leading from the power supply pin or the ground pin of the LSI part and a list of vias connected to the leading lines. The flowcharts illustrate the process performed in step S101 in FIG. 9 in detail.

In step S201 in FIG. 11A, the part at the current position is identified from the part data 41 in the CAD data. Next, in step S202, a judgment is made as to whether or not the identified part (target part) is an LSI part, by referring to the item "PART TYPE" in the part data 41.

When the target part is not an LSI part according to the judgment in the step S202 (when the judgment result in S202 is No), a judgment is made as to whether or not a next part is contained in the part data 41 in step S203.

When a next part does not exist according to the judgment in the step S203 (when the judgment result in S203 is No), the series of processes are completed. When there is a next part according to the judgment in the step S203 (when the judgment result in S203 is Yes), the current position is moved to the next part in step S204, and the process returns to the step S201.

When the target part is an LSI part according to the judgment in the step S202 (when the judgment result in S202 is Yes), "POINTER TO PART PIN" information at the current position is obtained in step S205 from the pieces of "POINTER TO PART PIN" information of the target part, the number of the pieces corresponding to the specified number part pins of the target part.

In step S206 following the step S205, a judgment is made, by referring to the item "PIN TYPE" of the part pin that is contained in the part pin data 42 and is pointed to by the "POINTER TO PART PIN" at the current position, as to whether or not the pin that is pointed to by the "POINTER TO PART PIN" at the current position (hereinafter, the pointed pin is simply referred to as a "pin for the current position") is either a power supply pin or a ground pin (either one of VG pins).

When the pin for the current position is neither a power supply pin nor a ground pin according to the judgment in step S206 (when the judgment result in S206 is No), a judgment is made in step S207 as to whether or not a next "POINTER TO PART PIN" is contained in the pieces of "POINTER TO PART PIN" information of a target part, the number of pieces corresponding to the specified number of the part pins of the target part.

When there is a next "POINTER TO PART PIN" according to the judgment in the step S207, (when the judgment result is Yes in S207), the current position is moved to the next "POINTER TO PART PIN" in step S208, and the process returns to the step S205.

When the pin for the current position is either a power supply pin or a ground pin according to the judgment in the step S206 (when the judgment result is Yes in S206), items "POINTER TO LEAD-OUT LINE DATA" and "POINTER TO LEAD-OUT VIA DATA" with their values set to invalid values are added to the pin for the current position in the part pin data 42, and the process proceeds to step S209 (in FIG. 11B). In the step S209, a search is performed to find a line connected to the pin for the current position, which is described below referring to FIG. 12.

The CAD data only contain the position coordinates of pins, lines, vias and the like, and do not specify the connection relationship of each other. Therefore, the search process is performed in the step S209 to find a line having an edge (start point or end point) coordinates closer to the position coordinates of the pin.

For example, in FIG. 12, a pin 51 is an LSI part pin, to which a line 52-1 is connected directly.

When the process proceeds from the step S209 to step S210, a judgment is made as to whether there is a line connected directly to an LSI part pin (a line such as the line 52-1 connected directly to the pin 51 in FIG. 12).

In CAD data, a piece of line data comprises a straight line having an edge (start point or end point). For example, in FIG. 12, the pin 51 and via 53 of the LSI part are connected by the bent line formed by the line 52-1, 52-2 and 52-3. In addition, when a pad is to be provided on the line, the pad divides the line, and the position coordinates of the pad is used as the coordinates of the edge point of the lines connected to the both sides of the pad.

When the line is bent, the line is divided at the bending point.

When the process proceeds from step S212 (to be described later) to the step S210, the presence/absence of a line further connected to the line being connected to the LSI part pin (for example, the line 52-2 for the line 52-1, and the line 52-3 for the line 52-2) is determined in the step S210.

The description returns here to the flowchart in FIG. 11B.

When there is a line connected directly to the power supply pin or the ground pin of the LSI part according to the judgment in the step S210 succeeding the control from the step S209, it is determined that a line leading from the power supply pin or the ground pin of the LSI exists (hereinafter, the line is referred to as an "lead-out line for the LSI part") in step S211. Therefore, with respect to the part pin in the part pin data 42 corresponding to the pin for the current part, an address for a new lead-out line in the lead-out line list 43 is set for the item "POINTER TO LEAD-OUT LINE DATA" added in step S206; the value "1" is set for the item "NUMBER OF LEAD-OUT LINE" for the lead-out line; and, a pointer to the line connected directly to the pin for the current position in the LSI part in the line data 45 is set for the item "POINTER TO LINE [1]".

In step S212 following the step 211, a search is performed to find a (different) line connected to the edge of the line being connected directly to the power supply pin or the ground pin, the edge being on the opposite side of the pin of the LSI part.

In the step S210 succeeding the control from step S212, a judgment is made as to whether there is a line connected to the edge of the line being connected directly to the power supply pin or the ground pin, the edge being on the opposite side of the pin of the LSI part.

When there is a line further connected to the edge of the line being connected directly to the power supply pin or the ground pin, the edge being on the opposite side of the pin of the LSI part according to the judgment in the step S210, the line further connected to the line connected directly to the pin is determined as an lead-out line for the LSI part in step S211. Therefore, with respect to the new lead-out line set in the lead-out line list 43 by the process previously performed in the S211, the value "for the item "NUMBER OF LEAD-OUT LINE" is incremented from "1" to "2", a pointer to the line further connected to the line being connected directly to the pin is set for the item "POINTER TO LINE [2]".

Then, for the edge of the line further connected to the line being connected to the pin, the edge being on the opposite side of the connection position of the lines, the processes (such as a search for a (different) line further connected to the edge) after step S212 following the step S211 are performed.

A case in which the power supply pin or the ground pin of the LSI part is connected directly to a via is excluded from consideration. Therefore, the judgment result of the step S210 is always "Yes", when the step S210 succeeds the control from the step S209. Since there are some circuit parts of which power supply pin or ground pin is connected directly to a via, the judgment in the step S210 is provided to give versatility to the processing logic. Therefore, in the flowchart described currently for the LSI part, the judgment result may be "No", when the step S210 succeeds the control from the step S212.

When there is no line connected to the edge of the line being connected directly to the power supply pin or the ground pin, the edge being on the opposite side of to the pin of the LSI part according to the judgment in the step S210 (when the judgment result in S210 is No), a search process in the via data 46 is performed in step S213, to find a via connected to the LSI part pin for the current position or to the lead-out line for the pin.

When there is a via connected to the LSI part pin for the current position or to the lead-out line for the pin according to a judgment in step S214 following the step S213, the via is determined as a via connected to the lead-out line for the LSI part pin (Hereinafter, the via referred to as "lead-out via for the LSI part. While the judgment is performed to ensure versatility, an LSI part pin is not connected directly to the via as described above). Therefore, with respect to the part pin in the part pin data 42 corresponding to the pin for the current part, an address for a new lead-out via in the lead-out via list 44 is set for the item "POINTER TO LEAD-OUT VIA DATA" added in step S206; the value "1" is set for the item "NUMBER OF LEAD-OUT VIA" for the lead-out via; and, a pointer to the via connected to the lead-out line for the LSI part pin for the current position in the via data 46 is set for the item "POINTER TO VIA [1]". The control is passed on to step S216.

The judgment in the step S214 determining that there is no via connected to the LSI part pin for the current position and there is no via connected to the lead-out line for the pin (the judgment result in the step S214 resulting in No) represents a data error in the CAD data, which is not assumed to occur in the present embodiment. When such a judgment is made, however, the process proceeds to the step S216.

In the step S216 succeeding the control from the step S214 or S215, a judgment is made as to whether or not a next "POINTER TO PART PIN" is contained in the pieces of "POINTER TO PART PIN" information of the part at the current position (target part) in the part data 41, the number of the pieces corresponding to the number specified by the "NUMBER OF PIN" of the part.

When there is a next "POINTER TO PART PIN" according to the judgment in the step S216, the current position is moved to the next position in step S217, and the process returns to the step S205.

Meanwhile, when a next "POINTER TO PART PIN" does not exist according to the judgment in step S216, the process returns to the step S203 to change the target part to the next part.

The description of the flowcharts in FIGS. 11A and 11B are completed.

Figure 13A:
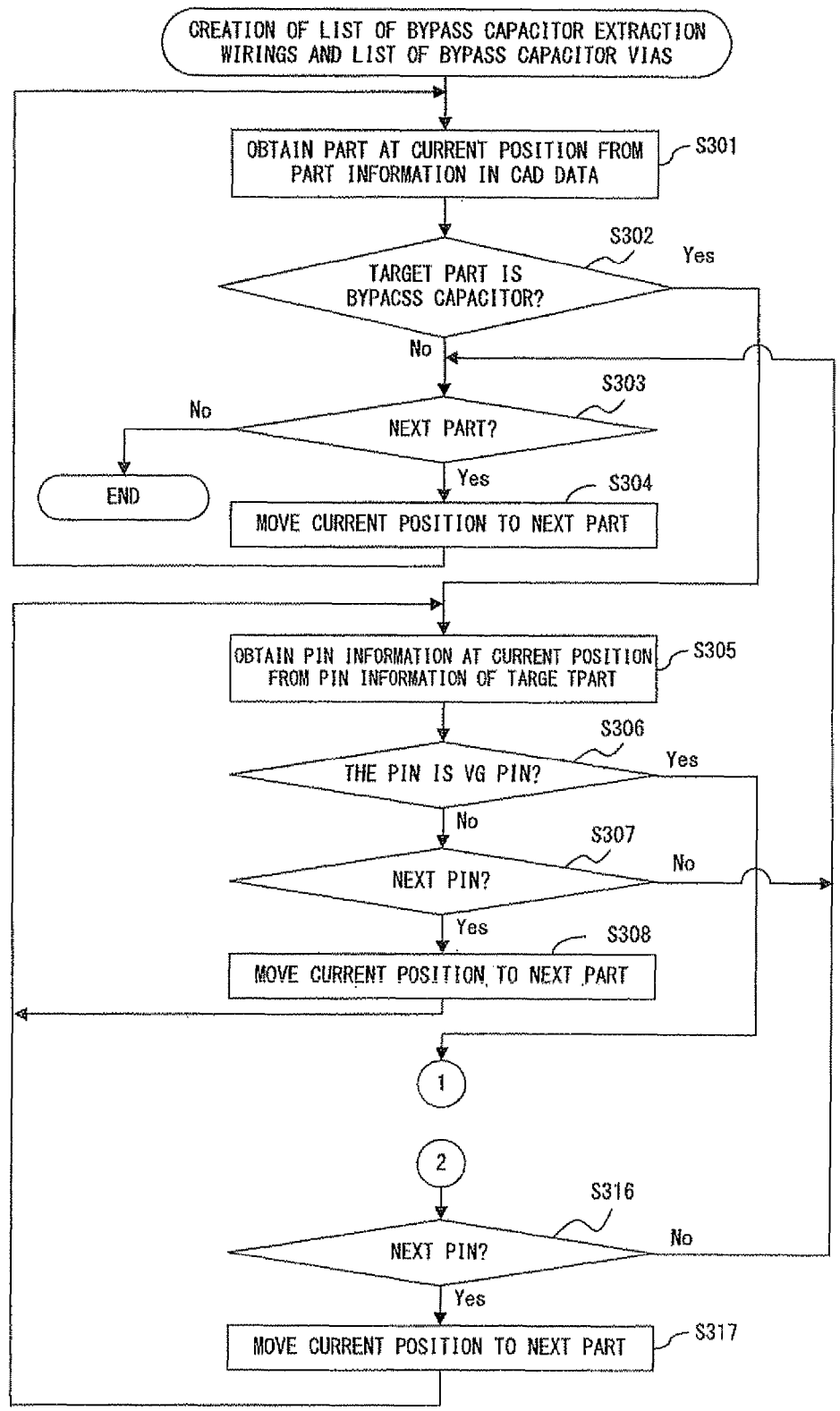
FIG. 13A is a flowchart (part 1) of creation processes for a list of lines leading from a power supply pin or a ground pin of a bypass capacitor, a list of vias connected to the leading lines, and a list of vias connected directly to the power supply pin or the ground pin of the bypass capacitor.
Figure 13B:
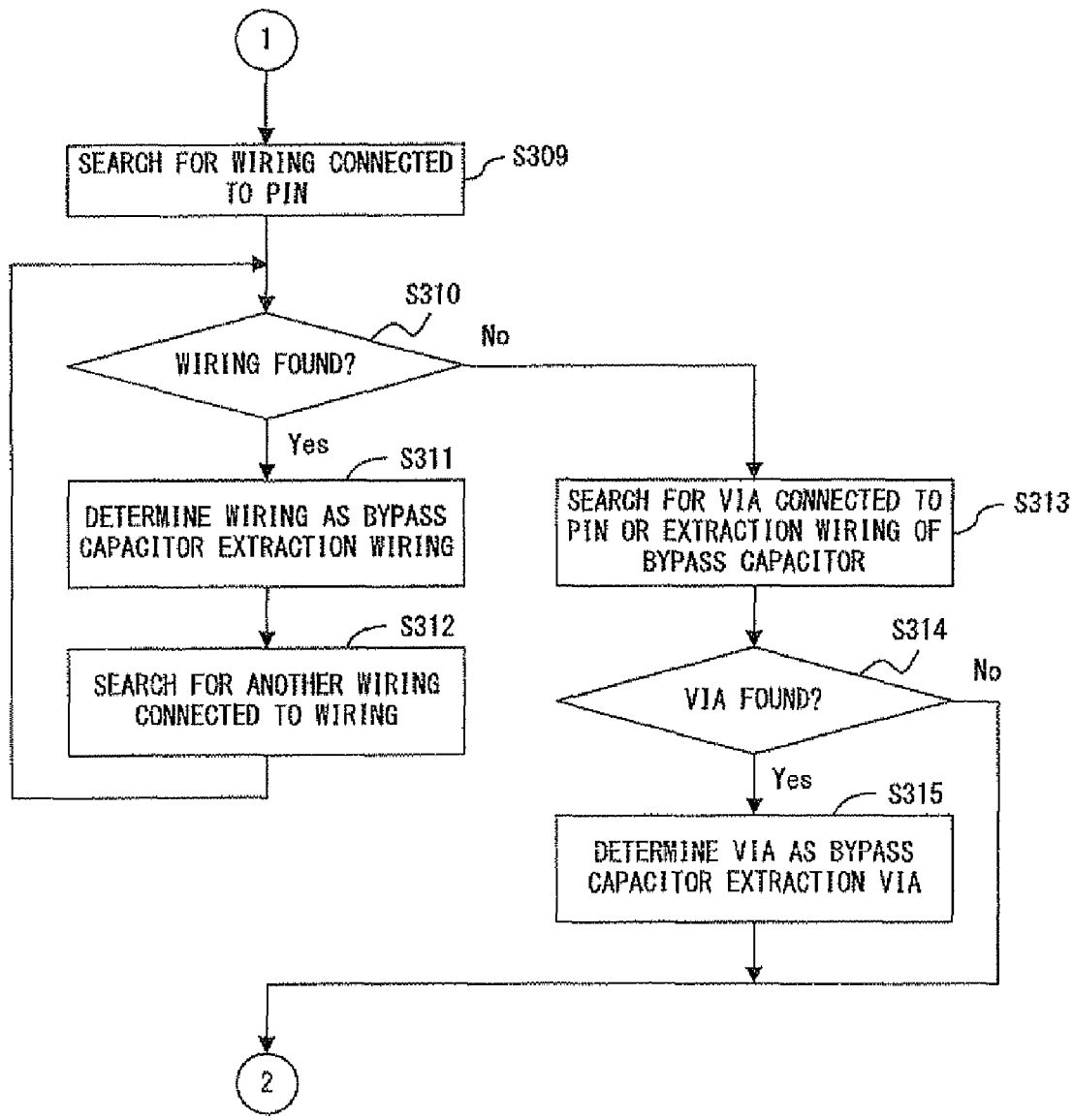
FIG. 13B is a flowchart (part 2) of creation processes of a list of lines leading from a power supply pin or a ground pin of a bypass capacitor, a list of via vias connected to the leading lines, and a list of vias connected directly to the power supply pin or the ground pin of the bypass capacitor.

FIGS. 13A and 13B are flowcharts of creation processes of a list of lines leading from a power supply pin or a ground pin of a bypass capacitor, a list of vias connected to the leading lines, and a list of vias connected directly to a power supply pin or a ground pin of the bypass capacitor. The flowchart illustrates the process performed in the step S102 in FIG. 9 in detail.

Steps S301 through S317 in FIG. 13A and FIG. 13B correspond to the steps S201 through S217 in FIGS. 11A and 11B. Therefore, the explanation is omitted here except for some differences.

The first difference is that in the flowcharts in FIGS. 13A and 13B, not the LSI part but the bypass capacitor is leading as the target part from the part data 41.

The second difference is that, unlike the case of an LSI part described above, pins of a bypass capacitor may be connected directly to vias. Therefore, while the judgment result in the step S210 in FIG. 11B is always "Yes" when the step S210 succeeds the control from the step S209, the judgment result in step S310 may be either "Yes" or "No", when the step S310 succeeds the control from the step S309. The judgment resulting in "No" in the step S310 succeeding the control from the step S309 corresponds to a case in which the mounting pad for the bypass capacitor is disposed on a via (called "chip on hole" or "pad on via").

Figure 14A:
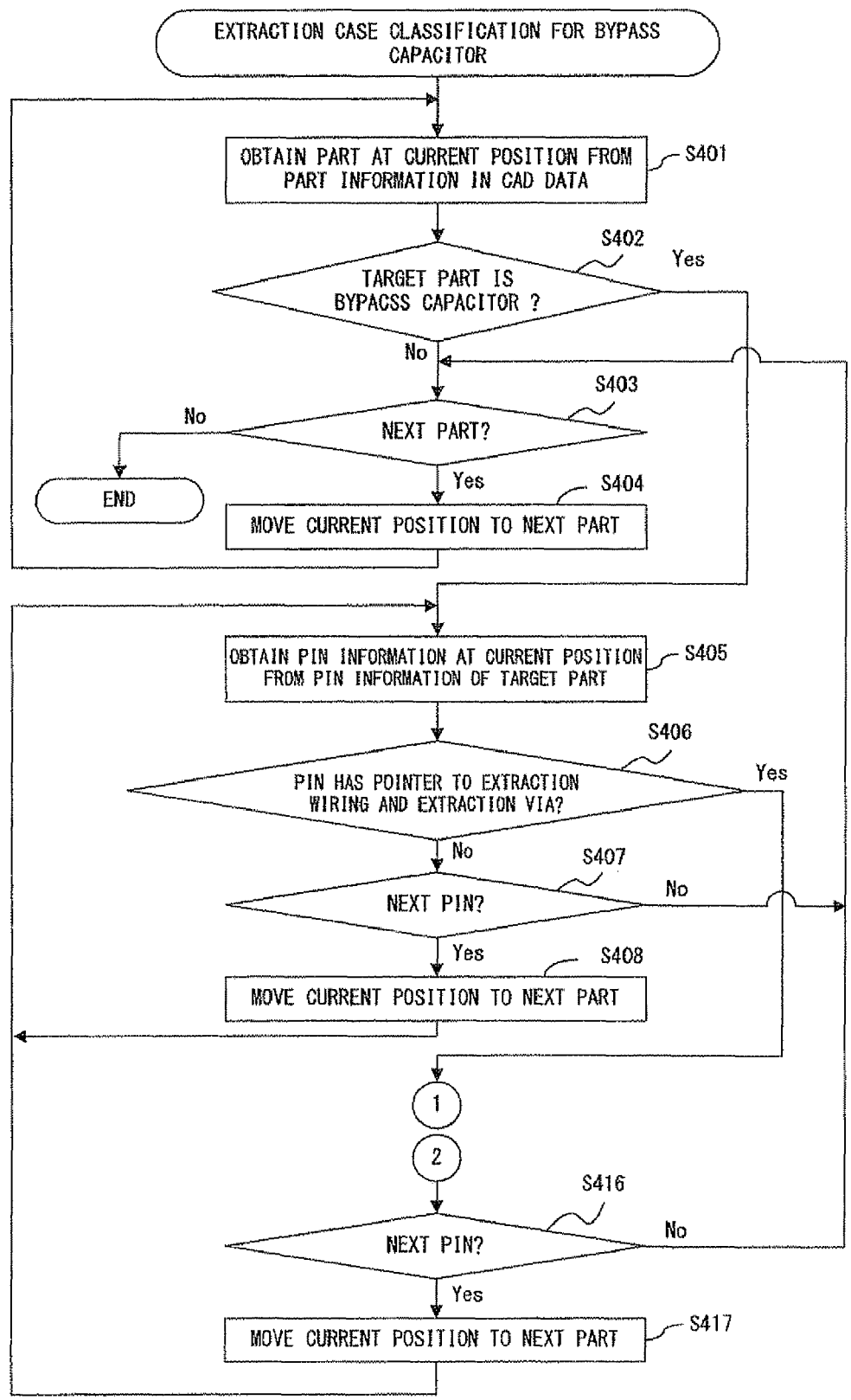
FIG. 14A is a flowchart (part 1) of case classification processes for lines leading from a power supply pin or a ground pin of a bypass capacitor, vias connected to the leading lines, and vias connected directly to the power supply pin or the ground pin of a bypass capacitor.

FIGS. 14A and 14B are flowcharts of case classification for lines leading from a power supply pin or a ground pin of a bypass capacitor, vias connected to the leading lines, and vias connected directly to a power supply pin or a ground pin of the bypass capacitor. The flowcharts illustrate the process performed in the step S103 in FIG. 9 in detail.

In step S401 in FIG. 14A, the part at the current position is obtained from the part data 41 in the CAD data. Next, in step S402, a judgment is made as to whether or not the obtained part (target part) is a bypass capacitor, by referring to the item "PART TYPE" in the part data 41.

When the target part is not a bypass capacitor according to the judgment in the step S402 (when the judgment result in S402 is No), a judgment is made as to whether or not a next part is contained in the part data 41 in step S403.

When a next part does not exist according to the judgment in the step S403 (when the judgment result in S203 is No), the series of processes are completed. When there is a next part according to the judgment in the step S403 (when the judgment result in S403 is Yes), the current position is moved to the next part in step S404, and the process returns to the step S401.

When the target part is a bypass capacitor according to the judgment in step S402 (when the judgment result in S402 is Yes), "POINTER TO PART PIN" information at the current position is obtained in step S405 from the pieces of "POINTER TO PART PIN" information of the target part, the number of the pieces corresponding to the specified number part pins of the target part.

In step S406 following the step S405, a judgment is made, by referring to the item "PIN TYPE" of the part pin that is contained in the part pin data 42 and is pointed to by the "POINTER TO PART PIN" at the current position, as to whether or not the pin pointed to by the "POINTER TO PART PIN" at the current position (hereinafter, the pointed pin is simply referred to as a "pin for the current position") is either a power supply pin or a ground pin (either one of VG pins).

When the pin for the current position is neither a power supply pin nor a ground pin according to the judgment in the step S406 (when the judgment result in S406 is No), a judgment is made in step S407 as to whether or not a next "POINTER TO PART PIN" is contained in the pieces of "POINTER TO PART PIN" information of the target part, the number of the pieces corresponding to the specified number part pins of the target part.

When there is a next "POINTER TO PART PIN" according to the judgment in the step S407 (when the judgment result is Yes in S407), the current position is moved to the next "POINTER TO PART PIN" in step S408, and the process returns to the step S405.

When the pin for the current position is either a power supply pin or a ground pin according to the judgment in step S406 (when the judgment result is Yes in S406), the process proceeds to step S409 (in FIG. 14B).

In the step S409, a judgment is made as to whether or not the lead-out line for the pin of the bypass capacitor (current position) is an lead-out line for a pin of another bypass capacitor. Within the step S409, there is a loop for a second part in which a pin for the LSI part or a pin for a bypass capacitor is obtained as a pin for a second current position. Then, a judgment is made in the step S409 as to whether or not the lead-out line for the pin for the current position corresponds, at least partly, to the lead-out line for the pin for the second current position.

When the lead-out line for the pin of the bypass capacitor (current position) is an lead-out line for a pin another bypass capacitor according to the judgment in step S409 (when the judgment result in S409 is Yes), the lead-out line and the lead-out via for bypass capacitors at the current position and the second current positions are determined as corresponding to "Case 4" in step S410. Then, with respect to the corresponding lead-out line in the lead-out line list 43 shown in FIG. 10, the value of the item "case information (not shown in FIG. 10) is changed from an "initial value (indicating none of the cases)" to "Case 4", and with respect to the corresponding lead-out via in the lead-out via list 44, the item "case information (not shown in FIG. 10) is changed from an "initial value (indicating none of the cases)" to "Case 4". Then the process proceeds to step S416 (in FIG. 14A).

When the lead-out line for the pin of the bypass capacitor (current position) is not an lead-out line for another bypass capacitor according to the judgment in the step S409 (when the judgment result in S409 is No), a judgment is made as to whether or not the lead-out line for the pin of the bypass capacitor (current position) is an lead-out line for a pin of the LSI part. Within the step S411, there is a loop for a second part in which a pin for the LSI part or a pin for a bypass capacitor is obtained as a pin for a second current position. Then, a judgment is made in the step S411 as to whether or not the lead-out line for the pin for the current position corresponds, at least partly, to the lead-out line for the pin for the second current position.

When the lead-out line for the pin of the bypass capacitor (current position) is an lead-out line for a pin of the LSI part according to the judgment in the step S411 (when the judgment result in S411 is Yes), the lead-out line and the lead-out via for bypass capacitor at the current position are determined as corresponding to "Case 3" in step S412. Then, with respect to the corresponding lead-out line in the lead-out line list 43 shown in FIG. 10, the value of the item "case information (not shown in FIG. 10) is changed from an "initial value (indicating none of the cases)" to "Case 3", and with respect to the corresponding lead-out via in the lead-out via list 44, the item "case information (not shown in FIG. 10) is changed from an "initial value (indicating none of the cases)" to "Case 3". Then the process proceeds to step S416 (in FIG. 14A).

When the lead-out line for the pin of the bypass capacitor (current position) is not an lead-out line for a pin of the LSI part according to the judgment in the step S411 (when the judgment result in S411 is No), a judgment is made as to whether or not the lead-out via for the pin of the bypass capacitor (current position) is an lead-out via for a pin of the LSI part. Within the step S413, there is loop for a second part in which a pin for the LSI part or a pin for a bypass capacitor is obtained as a pin for a second current position. Then, a judgment is made in the step S413 as to whether or not the lead-out via for the pin for the current position corresponds, at least partly, to the lead-out via for the pin for the second current position.

When the lead-out via for the pin of the bypass capacitor (current position) is an lead-out via for a pin of the LSI part according to the judgment in the step S413 (when the judgment result in S413 is Yes), the lead-out line and the lead-out via for bypass capacitor at the current position are determined as corresponding to "Case 2" in step S414. Then, with respect to the corresponding lead-out line in the lead-out line list 43 shown in FIG. 10, the value of the item "case information (not shown in FIG. 10) is changed from an "initial value (indicating none of the cases)" to "Case 2", and with respect to the corresponding lead-out via in the lead-out via list 44, the item "case information (not shown in FIG. 10) is changed from an "initial value (indicating none of the cases)" to "Case 2". Then the process proceeds to step S416 (in FIG. 14A).

When the lead-out via for the pin of the bypass capacitor (current position) is not an lead-out via for a pin of the LSI part according to the judgment in the step S413 (when the judgment result in S413 is No), the value of the item "case information (not shown in FIG. 10) is changed from an "initial value (indicating none of the cases)" to "Case 1", with regard to the remaining lead-out line and the lead-out via for the bypass capacitor in step S415. Then the process proceeds to step S416 (in FIG. 14A).

In step S416 succeeding the control from the step S410, S412, S414 or S415, it is judged whether or not a next "POINTER TO PART PIN" is contained in the pieces of "POINTER TO PART PIN" information of the part at the current position (target part) in the part data 41, the number of the pieces corresponding to the number specified by the "NUMBER OF PIN" of the part.

When there is a next "POINTER TO PART PIN" according to the judgment in the step S416, the current position is moved to the next position in step S417, and the process returns to the step S405.

When a next "POINTER TO PART PIN" does not exist according to the judgment in the step S416, the process returns to the step S403 to change the target part to the next part.

The description of the flowcharts in FIGS. 14A and 14B are completed.

Figure 15:
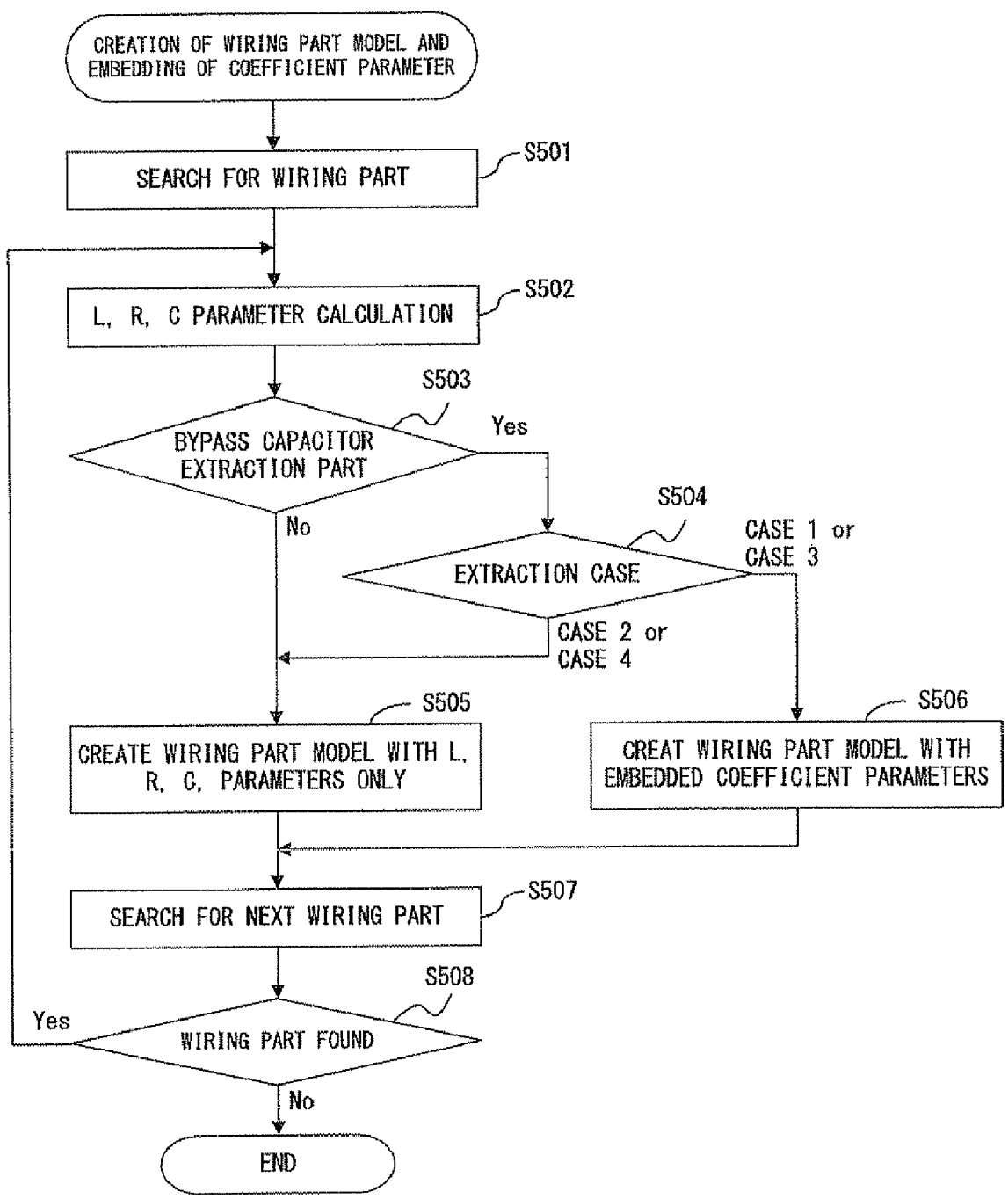
FIG. 15 is a flowchart of processes for creating a line part model and for embedding a coefficient parameter.

FIG. 15 is a flowchart of processes for creating a line part model and for embedding a coefficient parameter. A piece of line data in CAD data forms a group of LCR properties (line part) in a circuit board model. When a line is bent as shown in FIG. 12, its line data is divided into three pieces, forming three divided groups of LCR properties for its line model accordingly.

In step S501 in FIG. 15, a search is performed to find a line part corresponding to one or more pieces of line data in the line data 45 shown in FIG. 10 (the part forming a group for which the property value of each element in the circuit board model is to be calculated). Then the line part for the current position is obtained, and the values of L (inductor), R (resistor) and C (capacitor) are calculated for the line part for the current position, in step S502.

In step S503 following the step S502, a judgment is made as to whether or not the line part for the current position is an lead-out part for the bypass capacitor, that is, whether or not the line part corresponds to the one or more pieces of line data included in the lead-out line list 43 shown in FIG. 10.

When the line part for the current position is not an lead-out part for the bypass capacitor according to the judgment is the step S503 (when the judgment result in S503 is No), a line model is created for the line part in step S505 including L, R and C only, without embedding any coefficient parameter, and the process proceeds to step S507.

When the line part for the current position is an lead-out part for the bypass capacitor according to the judgment is the step S503 (when the judgment result in S503 is Yes), a judgment is made as to which lead-out case the line part correspond to, referring to "case information" of the corresponding lead-out line listed in the lead-out line list 43, in step S504.

When the line part for the current position is determined as corresponding to "Case 2" or "Case 4" in the step S504, a line model is created for the line part including L, R and C only, without embedding any coefficient parameter, and the process proceeds to the step S507.

When the line part for the current position is determined as corresponding to "Case 1" or "Case 3" in the step S504, a line model is created for the line part in step S506, with coefficient parameters embedded in the values of L and R by multiplication or division, and the process proceeds to the step S507. FIG. 16 shows an example in which no coefficient parameter is embedded in L (inductor), and an example in which a coefficient parameter is embedded in L by multiplication (in the format of SPICE net list).

In step S507 succeeding the control from the step S505 or the step S506, a search is performed to find a next line part.

In step S508 following the step S507, a judgment is made as to whether there is a next line part or not. When a next line part does not exist according to the judgment in the step S508 (when the judgment result in S508 is No), the series of processes are completed.

When there is a next line part according to the judgment in the step S508 (when the judgment result in S508 is Yes), the process returns to the step S502.

Figure 17:
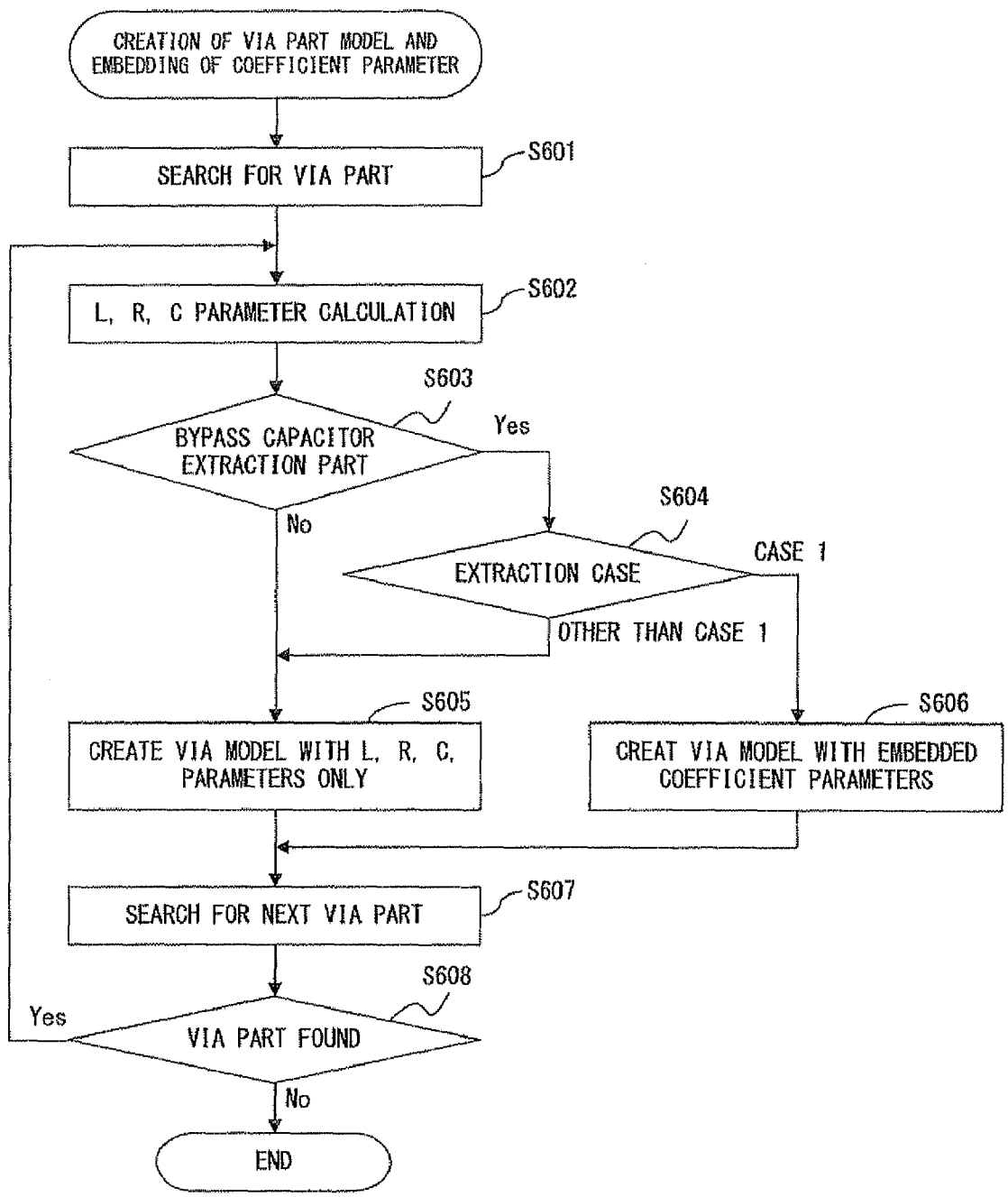
FIG. 17 is a flowchart processes for creating a via part model and for embedding a coefficient parameter.

FIG. 17 is a flowchart of processes for creating a via part model and for embedding a coefficient parameter. In via data contained in CAD data, the part including the start of the penetration by the via (on the surface layer on one side) through the end of the penetration (on the surface layer on the opposite side) is expressed as a single piece of data. However, even the CAD data show the single piece of data as a single via, the piece is divided into two groups (two via parts) at the position connected to the power supply or GND plane.

In step S601 in FIG. 17, a search is performed to find a via part corresponding to the via data in the via data 46 shown in FIG. 10 (the part forming a group for which the property value of each element in the circuit board model is to be calculated). Then the via part for the current position is obtained, and the values of L (inductor), R (resistor) and C (capacitor) are calculated for the line part for the current position, in step S602.

In step S603 following the step S602, a judgment is made as to whether or not the via part for the current position is an lead-out part for the bypass capacitor, that is, whether or not the via part corresponds to the via data included in the lead-out via list 44 shown in FIG. 10.

When the via part for the current position is not an lead-out part for the bypass capacitor according to the judgment is the step S603 (when the judgment result in S603 is No), a line part model is created for the via part in step S605 including L, R and C only, without embedding any coefficient parameter, and the process proceeds to step S607.

When the line part for the current position is an lead-out part for the bypass capacitor according to the judgment is the step S603 (when the judgment result in S603 is Yes), a judgment is made as to which lead-out case the via part correspond to, referring to "case information" of the corresponding lead-out via listed in the lead-out line list 44, in step 604.

When the via part for the current position is determined as corresponding to the cases except for "Case 1" in the step S604, a via model is created for the via part in step S605 including L, R and C only, without embedding any coefficient parameter, and the process proceeds to step S607.

When the via part for the current position is determined as corresponding to "Case 1" in the step S604, a via model with L, R and C is created for the via part in step S606, with coefficient parameters embedded in the values of L and R by multiplication or division, and the process proceeds to the step S607. The model is divided at the position connected to the power supply or GND plane, as descried above. In the step S606, the coefficient parameter is embedded in the portion in the via part on the side for which the LSI mounting pad is disposed.

In step S607 succeeding the control from the step S605 or the step S606, a search is performed to find a next via part.

In step S608 following the step S607, a judgment is made as to whether there is a next via part or not. When a next via part does not exist according to the judgment in the step S608 (when the judgment result in S608 is No), the series of processes are completed.

When there is a next via part according to the judgment in the step S608 (when the judgment result in S608 is Yes), the process returns to the step S602.

The description of the flowchart is completed. Hereinafter, the four case classifications (Case 1, Case 2, Case 3 and Case 4) for a power supply pin and a ground pin of the bypass capacitor are described in detail, referring to each of FIGS. 18A-21C.

Figure 18A:
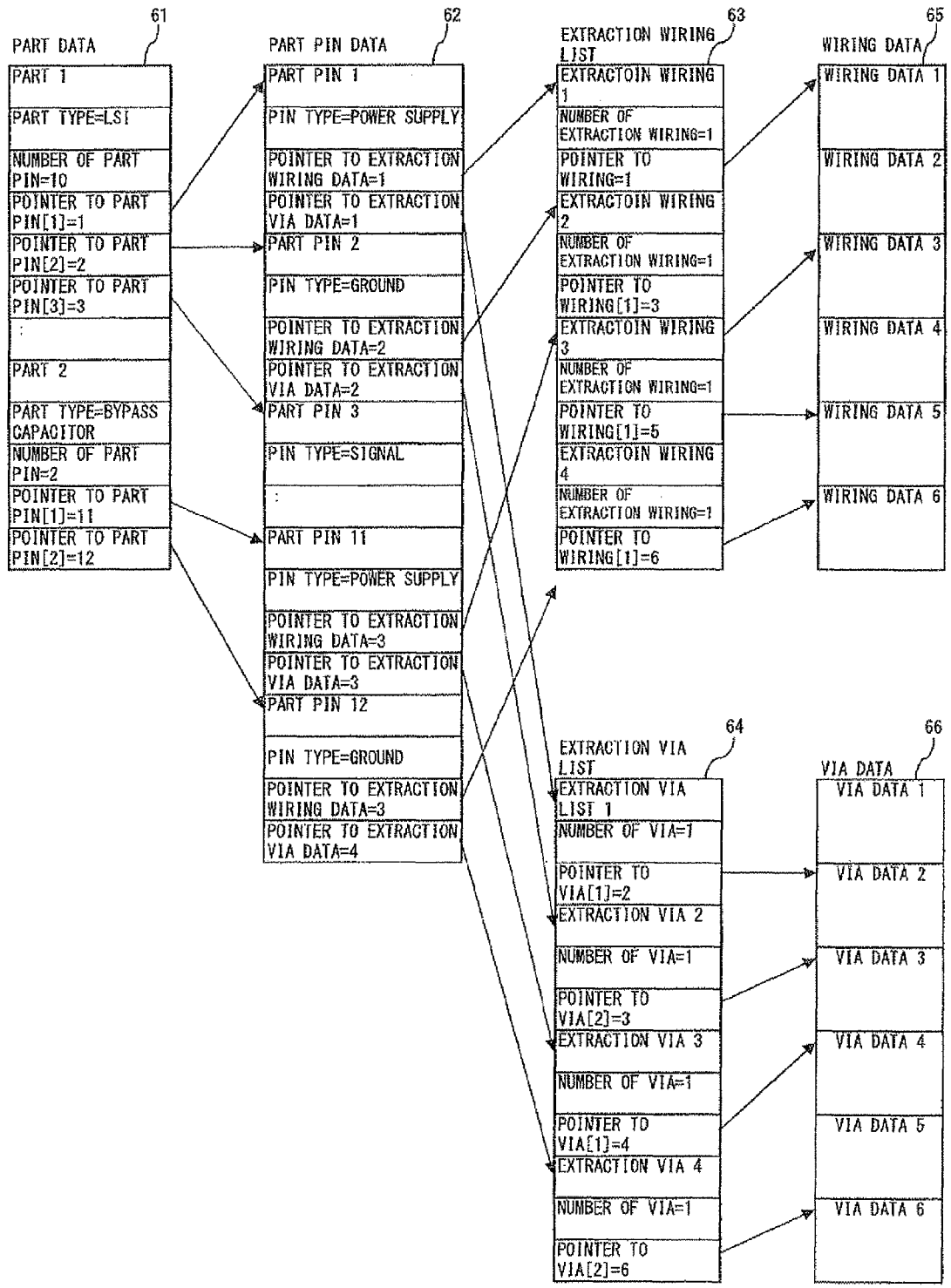
FIG. 18A is a diagram showing, along with CAD data, a list of lead-out lines and a list of lead-out vias including lead-out lines and lead-out vias that are classified as corresponding to case 1.

FIG. 18A is a diagram showing, along with CAD data, an lead-out line list and an lead-out via list including lead-outs lines and lead-out vias that are classified as case 1.

FIG. 18A shows that "PART 1" in part data 61 is an LSI part that has "PART PIN 1" in part pin data 62 as a power supply pin and "PART PIN 2" as a ground pin.

It is also shown that "LEAD-OUT LINE 1" in lead-out line data 63 is a line leading from the "PART PIN 1", and that the "LEAD-OUT LINE 1" comprises "LINE DATA 1" in line data 65.

It is also shown that "LEAD-OUT VIA 1" in lead-out via list 64 is a via connected to the line leading from the "PART PIN 1" and that the "LEAD-OUT VIA 1" comprises "VIA DATA 2" in via data 66.

It is also shown that the "LEAD-OUT LINE 2" in the lead-out line data 63 is a line leading from the "PART PIN 2", and that the "LEAD-OUT LINE 2" comprises "LINE DATA 3" in the line data 65.

It is also shown that "LEAD-OUT VIA 2" in the lead-out via list 64 is a via connected to the line leading from the "PART PIN 2" and that the "LEAD-OUT VIA 2" comprises "VIA DATA 3" in the via data 66.

In addition, FIG. 18A shows that "PART 2" in part data 61 is a bypass capacitor that has "PART PIN 11" in the part pin data 62 as a power supply pin and "PART PIN 12" as a ground pin.

It is also shown that "LEAD-OUT LINE 3" in the lead-out line data 63 is a line leading from the "PART PIN 11", and that the "LEAD-OUT LINE 3" comprises "LINE DATA 5" in the line data 65.

It is also shown that "LEAD-OUT VIA 3" in the lead-out via list 64 is a via connected to the line leading from the "PART PIN 11" and that the "LEAD-OUT VIA 3" comprises "VIA DATA 4" in the via data 66.

It is also shown that the "LEAD-OUT LINE 4" in the lead-out line data 63 is a line leading from the "PART PIN 12", and that the "LEAD-OUT LINE 4" comprises "LINE DATA 6" in the line data 65.

It is also shown that "LEAD-OUT VIA 4" in the lead-out via list 64 is a via connected to the line leading from the "PART PIN 12" and that the "LEAD-OUT VIA 4" comprises "VIA DATA 6", in the via data 66.

FIG. 18 is a diagram showing a cross section of a circuit board corresponding to the configuration described above. The LSI part and bypass capacitor mounted on pin pads are omitted in FIG. 18B.

In FIG. 18B, LSI part pin pads 71 and 72 on a printed circuit board 70 correspond to the "PART PIN 2" and "PART PIN 1" in the part pin data 62 shown in FIG. 18A; lines 75 and 76 correspond to the "LINE DATA 3" and "LINE DATA 1" in the line data 65 in FIG. 18A; and vias 79 and 80 correspond to the "VIA DATA 3" and "VIA DATA 2" in the via data 66 in FIG. 18A.

And, in FIG. 18B, bypass capacitor pin pads 73 and 74 on the printed circuit board 70 correspond to the "PART PIN 12" and "PART PIN 11" in the part pin data 62 in FIG. 18A; lines 77 and 78 correspond to the "LINE DATA 6" and "LINE DATA 5" in the line data 65 in FIG. 18A; and vias 81 and 82 correspond to the "VIA DATA 6" and "VIA DATA 4" in the via data 66 in FIG. 18A.

In FIG. 18B, for example the LSI part pin pad 71 can be found as a ground pin, since it is connected to the via 79 that is connected to a ground plane 84 through the line 75. Also, for example, the LSI part pin pad 72 can be found as a power supply pin, since it is connected to the via 80 that is connected to a power supply plane 83 through the line 76.

When case classification is performed for the bypass capacitor part pin pad 74 in FIG. 18B, the line 78 being the lead-out line of the pin pad 74 is determined as "not corresponding to case 4", as it is not an lead-out line for another bypass capacitor; then determined as "not corresponding to case 3", as it is not an lead-out line for the LSI part; then lastly determined as "not corresponding to case 2" as the via 82 being the lead-out via for the pin pad 74 is not an lead-out via for the LSI part, then ultimately determined as corresponding to "Case 1".

Figure 18C:
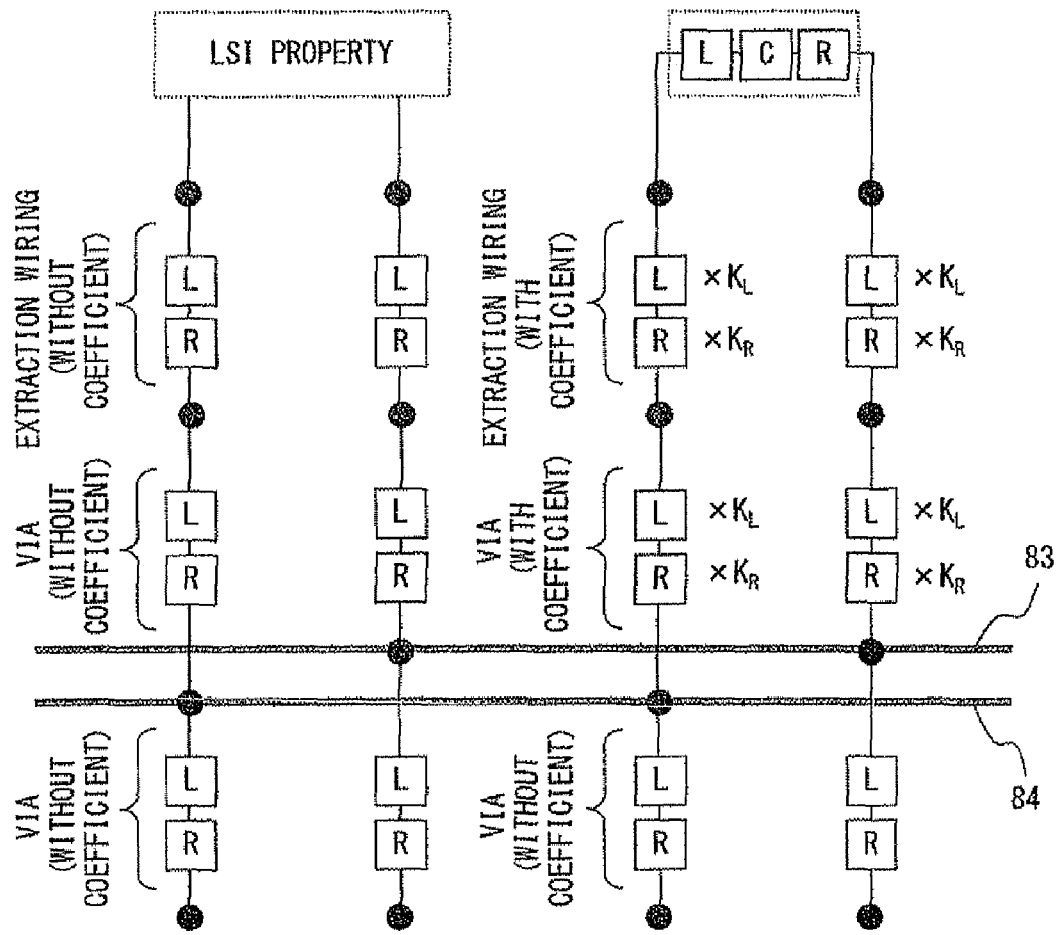
FIG. 18C is a diagram showing a circuit board model corresponding to the cross section shown in FIG. 18B.

FIG. 18C is a diagram showing a circuit board model corresponding to the cross section shown in FIG. 18B.

In FIG. 18C, coefficient parameters (KL and KR) with their default value set as "1" are embedded by multiplication, in the values of the elements (values of L and R) of the line 77 leading from the bypass capacitor part pin pad 73. In addition, coefficient parameters (KL and KR) with their default value set as "1" are embedded by multiplication, in the values of the elements (values of L and R) of the line 78 leading from the bypass capacitor part pin pad 74.

Coefficient parameters (KL and KR) with their default value set as "1" are embedded by multiplication, in the values of the elements (values of L and R) of the via 81 connected to the line 77 leading from the bypass capacitor part pin pad 73 and to the ground plane 84, the elements being in the part of corresponding to the mounting side of the pin pad 73, in the via 81 divided at the ground plane 84.

Coefficient parameters (KL and KR) with their default value set as "1" are embedded by multiplication, in the values of the elements (values of L and R) of the via 82 connected to the line 78 leading from the bypass capacitor part pin pad 74 and to the voltage plane 83, the elements being in the part corresponding to the mounting side of the pin pad 74, in the via 82 divided at the voltage plane 83.

Figure 18D:
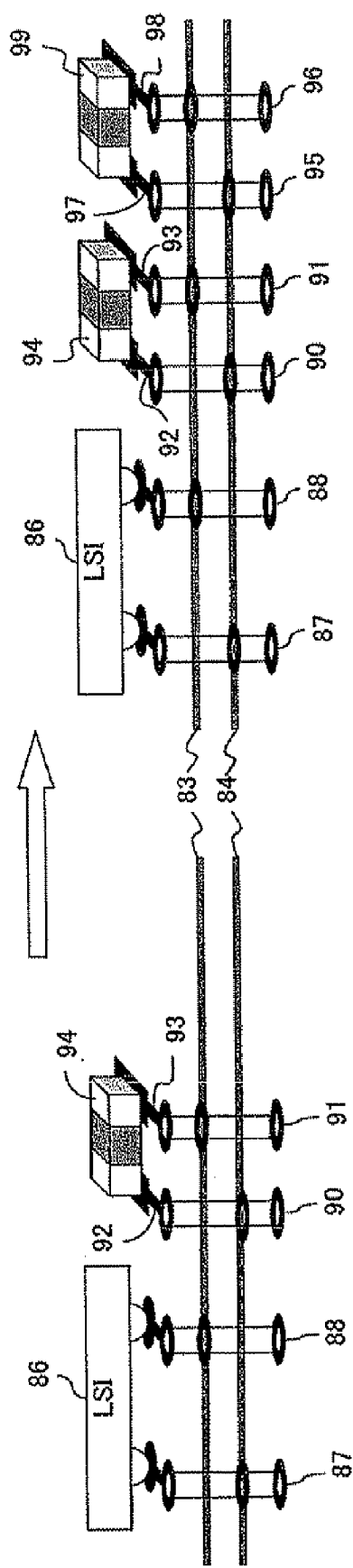
FIG. 18D is a diagram showing a case in which another bypass capacitor is added near a bypass capacitor that is classified as corresponding to case 1.

FIG. 18D is a diagram showing a case in which another bypass capacitor is added near a bypass capacitor that is classified as corresponding to Case 1.

In FIG. 18D, an existing bypass capacitor 94 having (lead-out) lines 92 and 93, and lead-out vias 90 and 91 that are independent of lead-out vias 87 and 88 for an LSI part 86, the vias 87 and 88 being disposed around the LSI part 86, is identified as corresponding to Case 1. The simulation assuming the addition of a bypass capacitor 99 near the bypass capacitor 94 by disposing another vias 95 an 96, lead-out lines 97 and 98, and pin pad for mounting a part (bypass capacitor) is performed, by adding a model comprising the bypass capacitor properties corresponding to the additional bypass capacitor 99, and by adjusting the value of the coefficient parameters embedded in the property values of the elements of the corresponding line part and via part. In the present embodiment, the analysis is performed only for estimating the condition in which another bypass capacitor is added near an existing capacitor. When the addition of the bypass capacitor is determined as available according to the analysis, the bypass capacitor is added by editing the CAD data. In this case, the existing parts and lines including the existing bypass capacitor are moved over (relocated) so as to ensure a space to dispose the additional bypass capacitor.

Figure 18E:
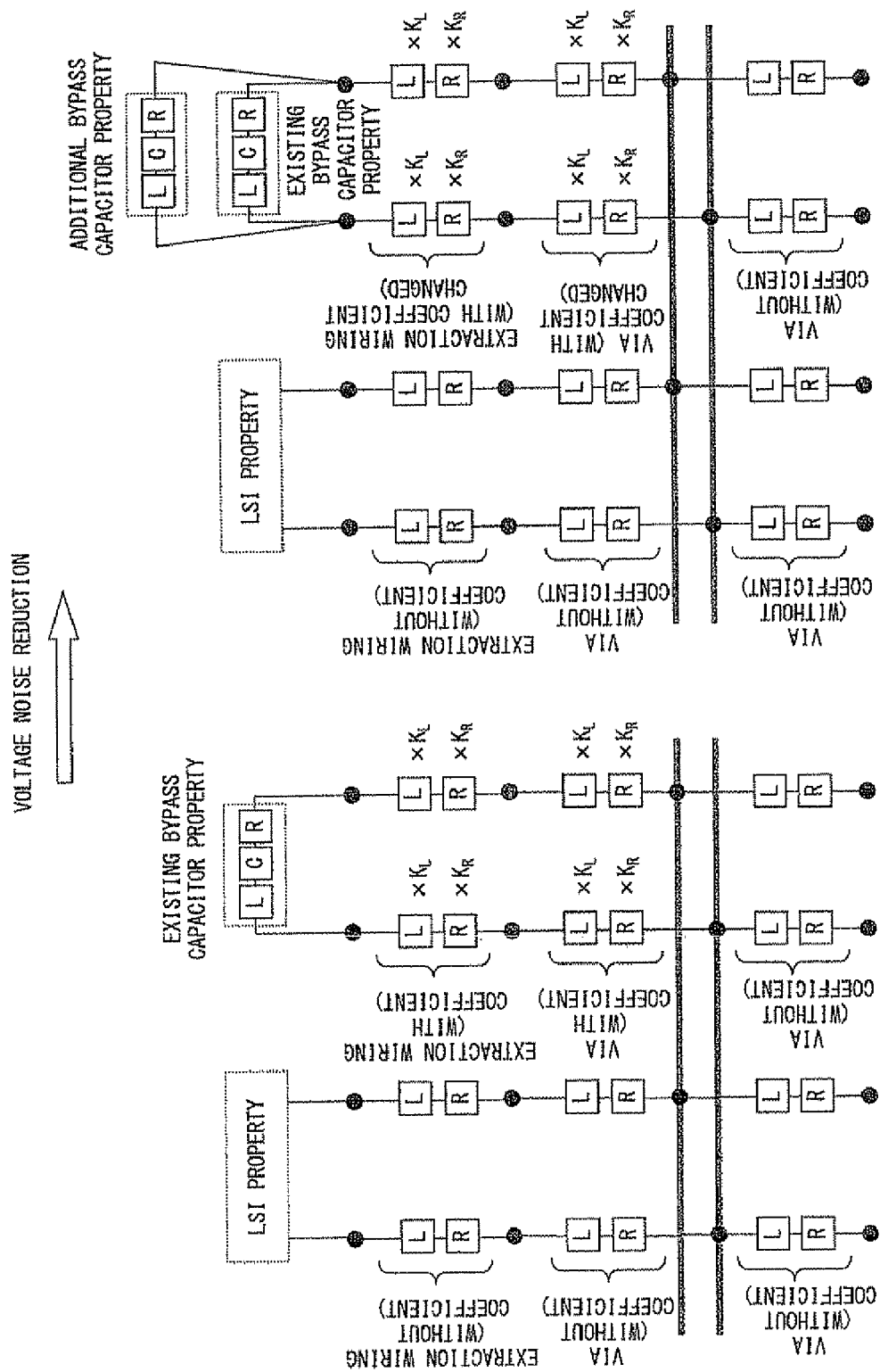

FIG. 18E is a diagram showing a circuit board model corresponding to FIG. 18D.

In FIG. 18E, the bypass capacitor 99, the (lead-out) lines 97 and 98, and the vias 95 and 96 added in FIG. 18D, are in parallel connection with the bypass capacitor 94 having the existing different vias 90 and 91, the (lead-out) lines 92 and 93. Therefore, (in the case in FIG. 18E), a simulation result with high accuracy can be obtained by adjusting the values of coefficient parameters (KL and KR) for the multiplication.

Figure 19A:
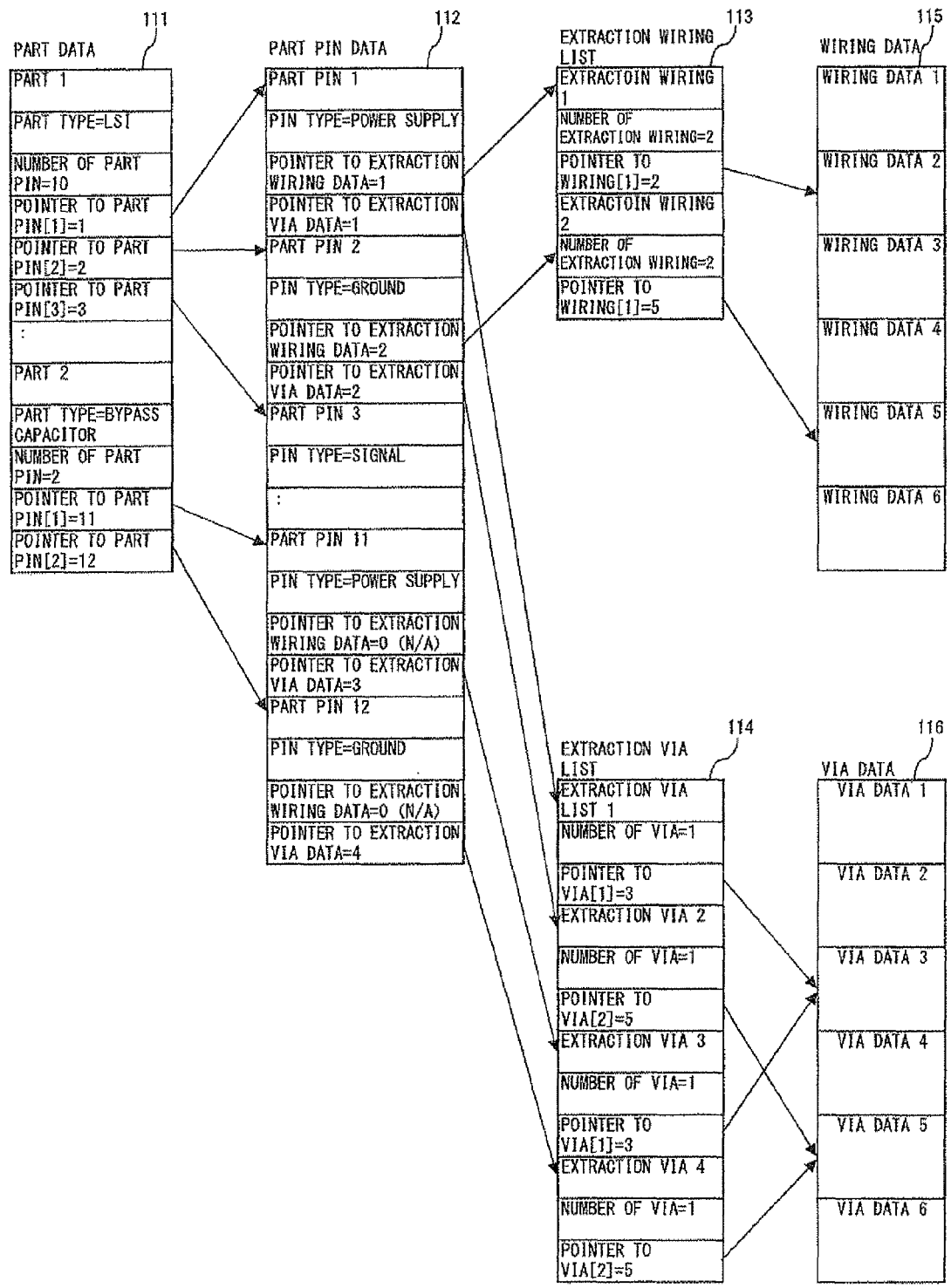
FIG. 19A is a diagram showing, along with CAD data, a list of lead-out lines and a list of lead-out vias including lead-outs lines and lead-out vias that are classified as corresponding to case 2.

FIG. 19A is a diagram showing, along with CAD data, an lead-out line list and an lead-out via list including lead-outs lines and lead-out vias that are classified as case 2.

FIG. 19A shows that "PART 1" in part data 111 is an LSI part that has "PART PIN 1" in part pin data 112 as a power supply pin and "PART PIN 2" as a ground pin.

It is also shown that "LEAD-OUT LINE 1" in lead-out line data 113 is a line leading from the "PART PIN 1", and that the "LEAD-OUT LINE 1" comprises "LINE DATA 2" in line data 115.

It is also shown that "LEAD-OUT VIA 1" in lead-out via list 114 is a via connected to the line leading from the "PART PIN 1" and that the "LEAD-OUT VIA 1" comprises "VIA DATA 3" in via data 116.

It is also shown that the "LEAD-OUT LINE 2" in the lead-out line data 113 is a line leading from the "PART PIN 2", and that the "LEAD-OUT LINE 2" comprises "LINE DATA 5" in the line data 115.

It is also shown that "LEAD-OUT VIA 2" in the lead-out via list 114 is a via connected to the line leading from the "PART PIN 2" and that the "LEAD-OUT VIA 2" comprises "VIA DATA 5" in the via data 116.

In addition, FIG. 19A shows that "PART 2" in part data 111 is a bypass capacitor that has "PART PIN 11" in the part pin data 112 as a power supply pin and "PART PIN 12" as a ground pin.

It is also shown that "LEAD-OUT VIA 3" in the lead-out via list 114 is a via connected directly to "PART PIN 11" and that "LEAD-OUT VIA 3" comprises "VIA DATA 3" in the via data 116.

It is also shown that "LEAD-OUT VIA 4" in the lead-out via list 114 is a via connected directly "PART PIN 12" and that the "LEAD-OUT VIA 4" comprises "VIA DATA 5" in the via data 116.

FIG. 19B is a diagram showing a cross section of a circuit board corresponding to the configuration described above. The LSI part and bypass capacitor mounted on pin pads are omitted in FIG. 19B.

In FIG. 19B, LSI part pin pads 121 and 122 on printed circuit board 120 correspond to the "PART PIN 2" and "PART PIN 1" in the part pin data 112 in FIG. 19A; lines 125 and 126 correspond to the "LINE DATA 5" and "LINE DATA 2" in the line data 115 in FIG. 19A; and vias 129 and 130 correspond to the "VIA DATA 5" and "VIA DATA 3" in the via data 66 in FIG. 19A.

And, in FIG. 19B, bypass capacitor pin pads 133 and 134 disposed on the surface layer of the printed circuit board 120 opposite to the surface layer on which the LSI part pin pads 121 and 122 are disposed correspond to the "PART PIN 12" and "PART PIN 11" in the part pin data 112 shown in FIG. 19A.

In FIG. 19B, for example the LSI part pin pad 121 can be found as a ground pin, since it is connected to the via 129 that is connected to a ground plane 136 through a line 125. Also, for example, the LSI part pin pad 122 can be found as a power supply pin, since it is connected to the via 130 that is connected to a power supply plane 135 through a line 126.

When case classification is performed for a bypass capacitor part pin pad 134 in FIG. 19B, the pin pad 134 is determined as corresponding to "neither Case 4 nor Case 3", as the pointer to the lead-out line data does not have a valid value. The via 130 being the lead-out via for the pin pad 134 is determined as corresponding to "Case 2" since it is also the lead-out via for the LSI part pin pad 122.

Meanwhile, in FIG. 19B, pin pads 123 and 124 are the pin pads of the same LSI part with the pin pads 121 and 122, and have lead-out lines 127 and 128, respectively, and lead-out vias 131 and 132, respectively, to which a bypass capacitors can be connected directly on the surface layer opposite to the surface layer on which the pin pads 123 and 124 are mounted (a bypass capacitor is not connected at this time). When the pin pads 133 and 134 are determined as corresponding to Case 2, the vias 131 and 132 to which a bypass capacitor on the opposite surface can be connected directly, for example, become a candidate position to dispose an additional bypass capacitor.

Figure 19C:
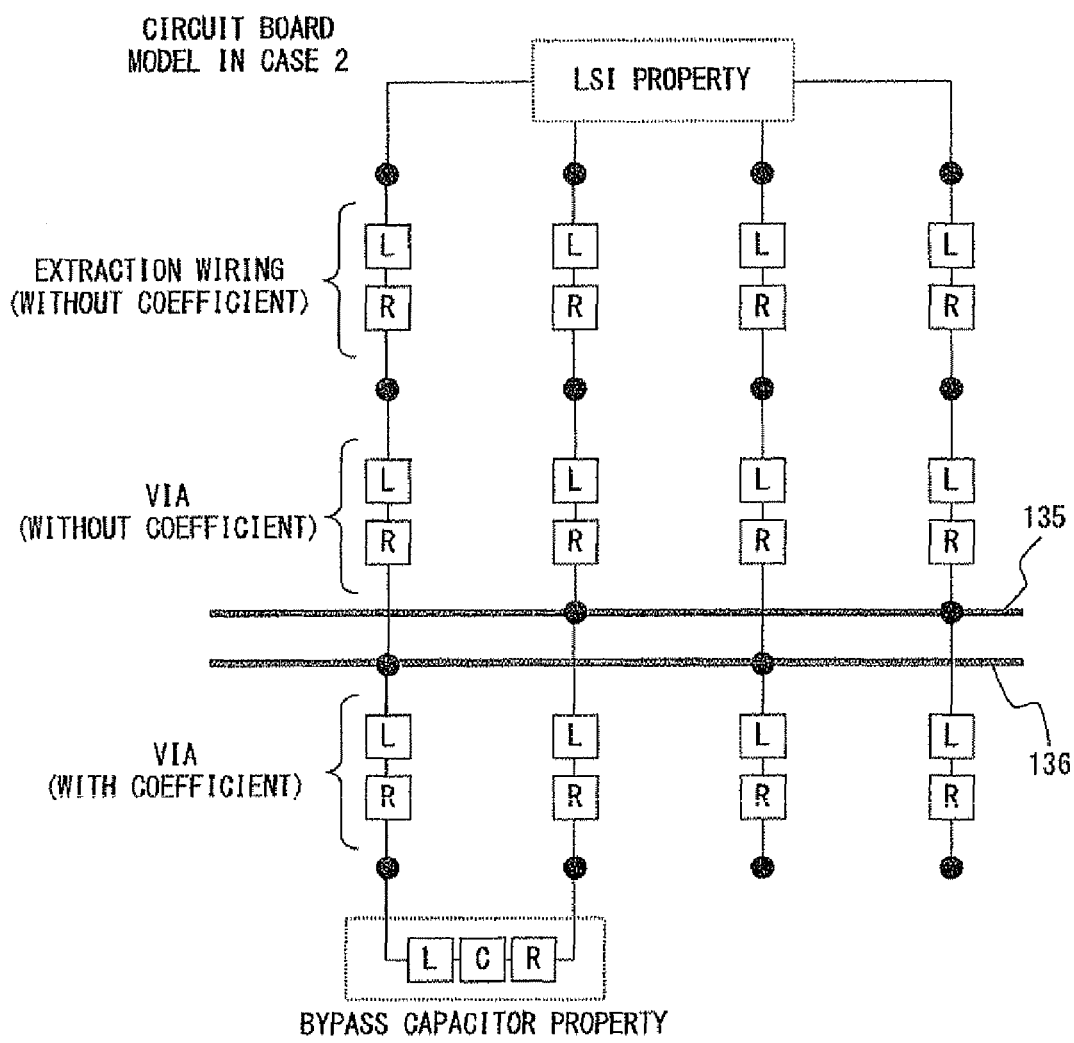
FIG. 19C is a diagram showing a circuit board model corresponding to the cross section shown in FIG. 19B.

FIG. 19C is a diagram showing a circuit board model corresponding to the cross section shown in FIG. 19B.

Figure 19D:
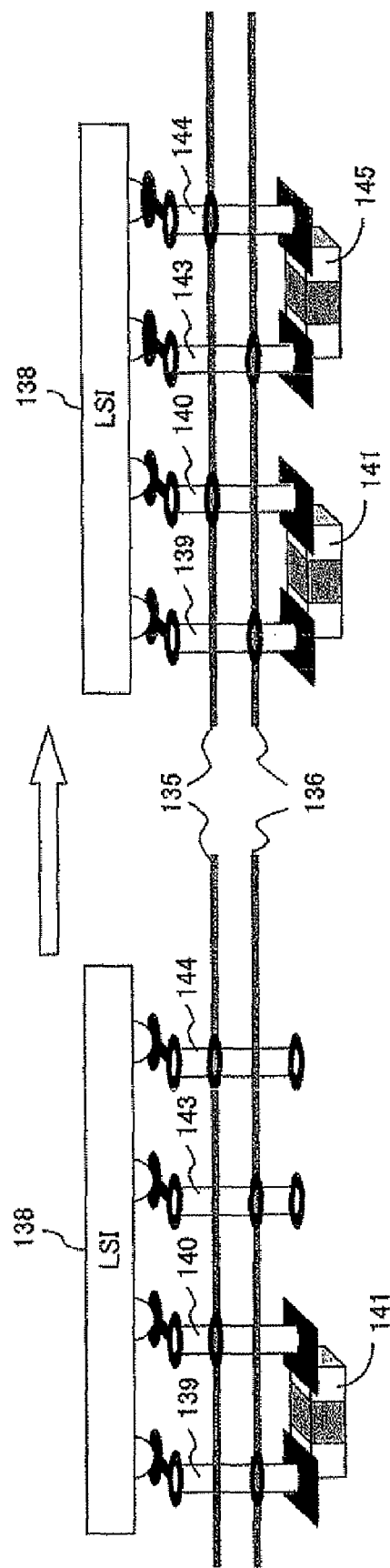
FIG. 19D is a diagram showing a case in which another bypass capacitor is added near a bypass capacitor that is classified as corresponding to case 2.

FIG. 19D is a diagram showing a case in which another bypass capacitor is added near a bypass capacitor that is classified as Case 2.

Figure 19E:
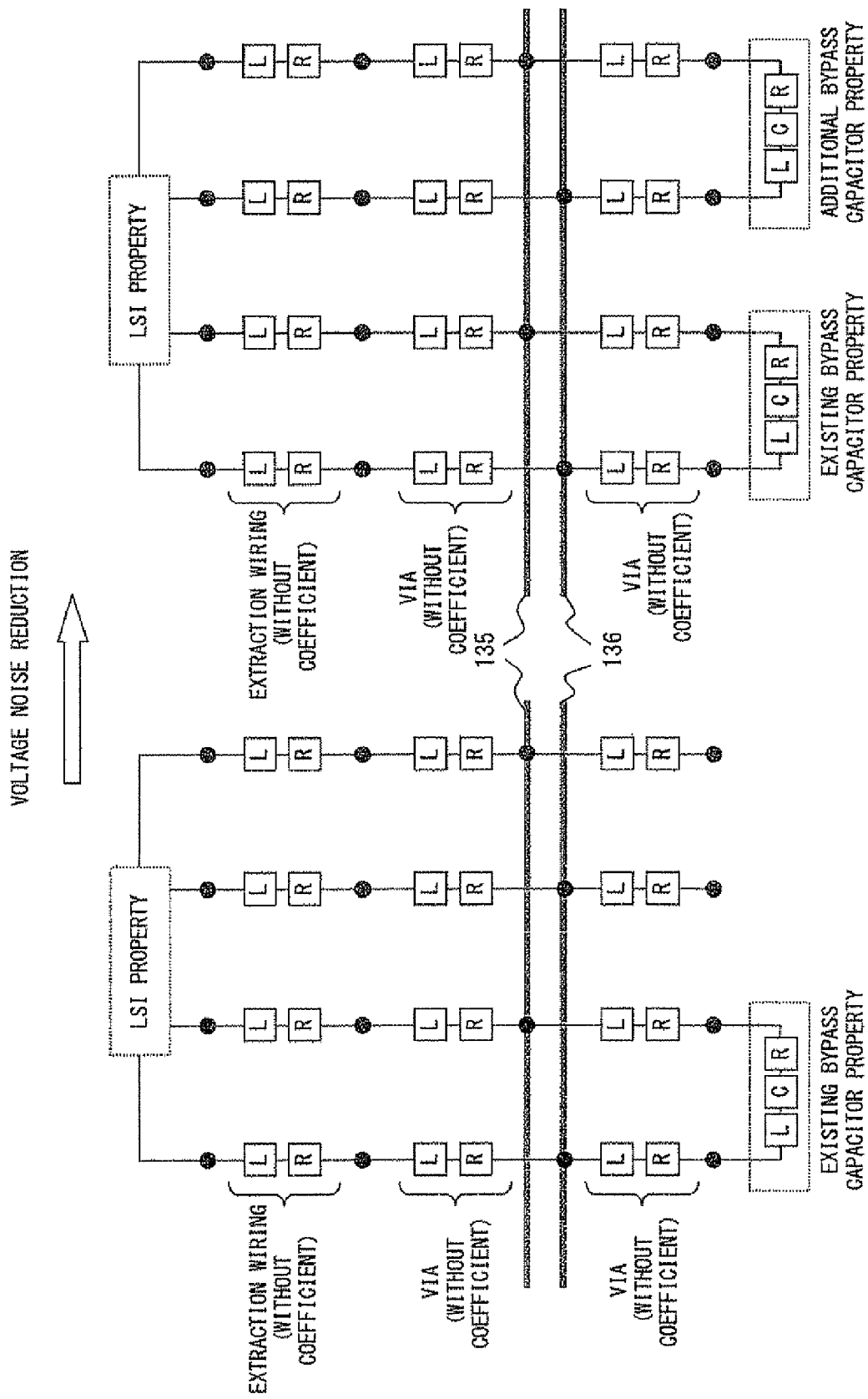
FIG. 19E is a diagram showing a circuit board model corresponding to FIG. 19D.

In FIG. 19D, an existing bypass capacitor 141 connected directly on its back side to vias 139 and 140 leading from the LSI part is identified as corresponding to Case 2. The simulation is performed by adding a model comprising the bypass capacitor properties corresponding to the additional bypass capacitor 145, assuming a case in which vias 143 and 144 leading also from the LSI part 138 to which an additional bypass capacitor can be connected directly have been found by a known search process in the nearby area, and an additional bypass capacitor 145 is added by connecting it directly to the vias 143 and 144, as shown in FIG. 19E.

The detail description of the search process mentioned above is as follows. The search is performed to find a power supply lead-out via for the LSI that is closest to the power supply lead-out via of an existing bypass capacitor, and has the same power supply. When the LSI lead-out via has already been shared as the lead-out via for another bypass capacitor, a search is performed to find the second closest LSI lead-out via that has the same power supply. The process is repeated until an LSI lead-out via that is not shared as an lead-out via for a bypass capacitor, and has the same power supply, is found. When such a LSI lead-out via is found, a search is performed to find a ground via that is not shared as an lead-out via of a bypass capacitor adjacent to the LSI power supply lead-out via (in other words, at the same distance as the distance between the LSI pins). The LSI power supply via and the LSI ground via found by the search form the space to dispose the additional bypass capacitor. The condition "an LSI lead-out via that has the same power supply source" is provided because an LSI having a large number of pins generally has a plurality of power supply pins having different voltages.

Figure 20A:
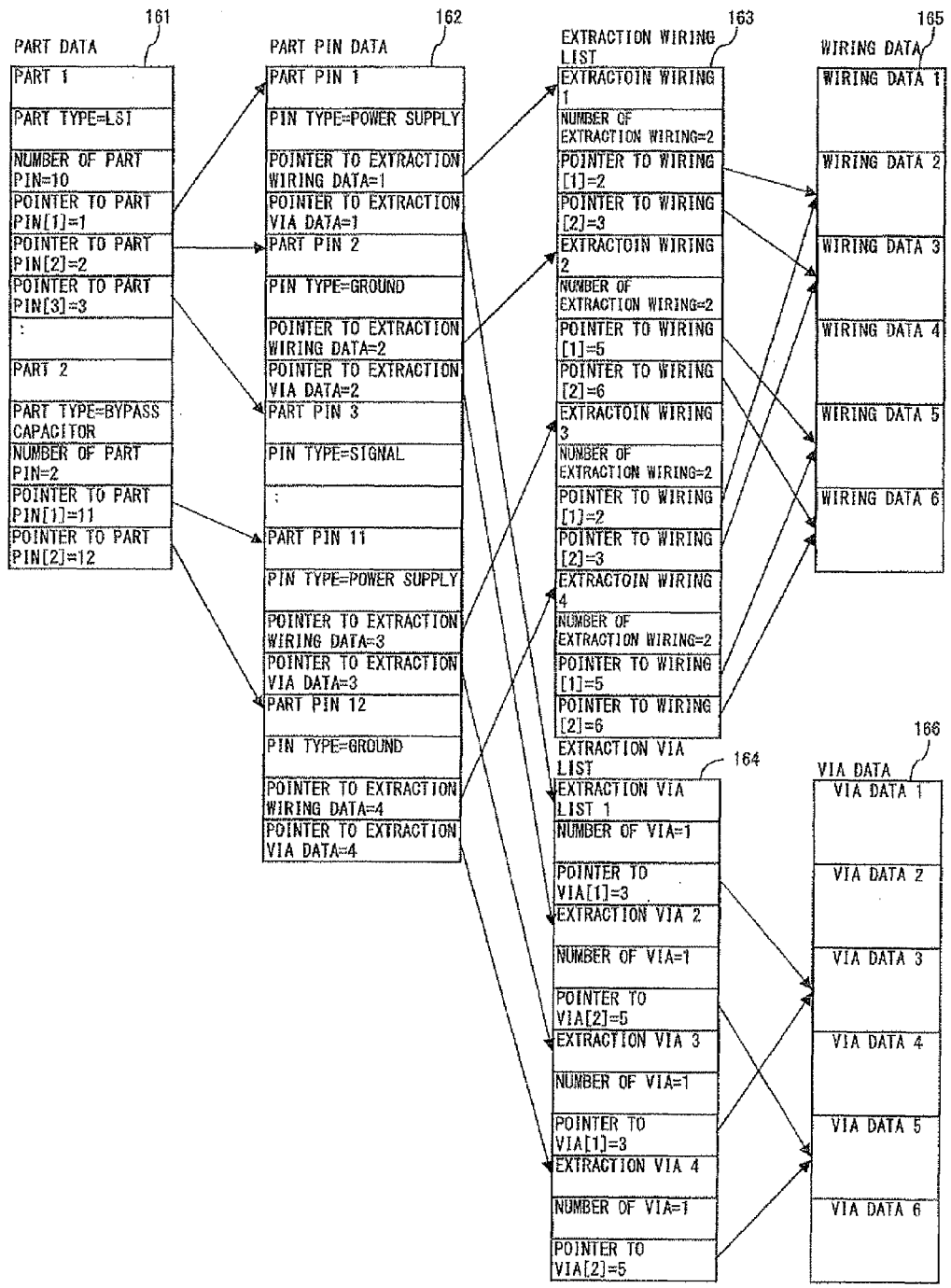
FIG. 20A is a diagram showing, along with CAD data, a list of lead-out lines and a list of lead-out vias including lead-outs lines and lead-out vias that are classified as corresponding to case 3.

FIG. 20A is a diagram showing, along with CAD data, an lead-out line list and an lead-out via list including lead-outs lines and lead-out vias that are classified as case 3.

FIG. 20A shows that "PART 1" in part data 161 is an LSI part that has "PART PIN 1" in part pin data 162 as a power supply pin and "PART PIN 2" as a ground pin.

It is also shown that "LEAD-OUT LINE 1" in lead-out line data 163 is a line leading from the "PART PIN 1", and that the "LEAD-OUT LINE 1" comprises "LINE DATA 2" and "LINE DATA 3" in line data 165.

It is also shown that "LEAD-OUT VIA 1" in lead-out via list 164 is a via connected to the line leading from the "PART PIN 1" and that the "LEAD-OUT VIA 1" comprises "VIA DATA 3" in via data 166.

It is also shown that the "LEAD-OUT LINE 2" in the lead-out line data 163 is a line leading from the "PART PIN 2", and that the "LEAD-OUT LINE 2" comprises "LINE DATA 5" and "LINE DATA 6", in the line data 165.

It is also shown that "LEAD-OUT VIA 2" in the lead-out via list 164 is a via connected to the line leading from the "PART PIN 2" and that the "LEAD-OUT VIA 2" comprises "VIA DATA 5" in the via data 166.

In addition, FIG. 20A shows that "PART 2" in part data 161 is a bypass capacitor that has "PART PIN 11" in the part pin data 162 as a power supply pin and "PART PIN 12" as a ground pin.

It is also shown that "LEAD-OUT LINE 3" in the lead-out line data 163 is a line leading from the "PART PIN 11", and that the "LEAD-OUT LINE 3" comprises "LINE DATA 2" and "LINE DATA 3" in the line data 165.

It is also shown that "LEAD-OUT VIA 3" in the lead-out via list 164 is a via connected to the line leading from the "PART PIN 11" and that the "LEAD-OUT VIA 3" comprises "VIA DATA 3" in the via data 166.

It is also shown that the "LEAD-OUT LINE 4" in the lead-out line data 163 is a line leading from the "PART PIN 12", and that the "LEAD-OUT LINE 4" comprises "LINE DATA 5" and "LINE DATA 6" in the line data 165.

It is also shown that "LEAD-OUT VIA 4" in the lead-out via list 164 is a via connected to the line leading from the "PART PIN 12" and that the "LEAD-OUT VIA 4" comprises "VIA DATA 5" in the via data 166.

Figure 20B:
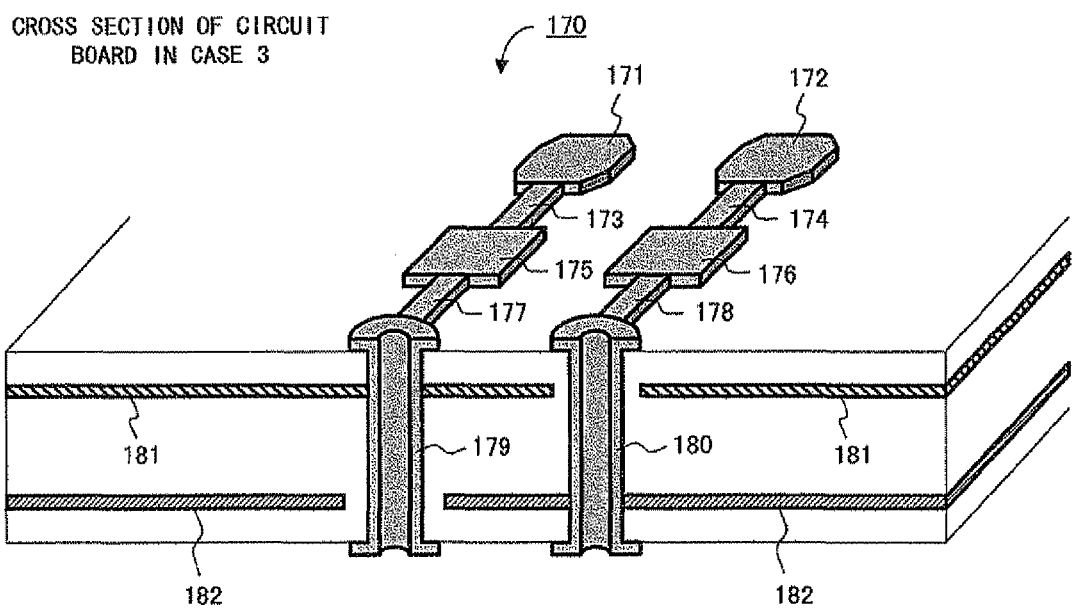
FIG. 20B is a diagram showing a cross section of a circuit board corresponding to the data shown in 20A.

FIG. 20B is a diagram showing a cross section of a circuit board corresponding to the configuration described above The LSI part and bypass capacitor mounted on pin pads are omitted in FIG. 20B.

In FIG. 20B, LSI part pin pads 171 and 172 on a printed circuit board 170 correspond to the "PART PIN 11" and "PART PIN 2" in the part pin data 162 in FIG. 20A.

The pair of lines 173 and 177 corresponds to the pair of "LINE DATA 2" and "LINE DATA 3" in the line data 165 in FIG. 20A, and the pair of lines 174 and 178 corresponds to the pair of "LINE DATA 5" and "LINE DATA 6" in the line data 165.

Bypass capacitor part pin pads 175 and 176 correspond to the "PART PIN 11" and "PART PIN 12" in the part pin data 162 shown in FIG. 20A, and vias 179 and 180 correspond to the correspond to the "VIA DATA 3" and "VIA DATA 5" in the via data 166 in FIG. 20A.

In FIG. 20B, for example the LSI part pin pad 171 can be found as a power supply pin, since it is connected to the via 179 that is connected to a power supply plane 181 through the line 173, the bypass capacitor part pin pad 175 and the line 177. Also, for example, the LSI part pin pad 172 can be found as a ground pin, since it is connected to the via 180 that is connected to a ground plane 182 through the line 174, the bypass capacitor part pin pad 176 and the line 178.

When case classification is performed for a bypass capacitor part pin pad 175 in FIG. 20B, the lines 173 and 177 being the lead-out lines for the pin pad 175 are determined as "not corresponding to case 4", as they are not lead-out lines for another bypass capacitor; then determined as "Case 3", as they are lead-out lines for the LSI part pin pad 171.

Figure 20C:
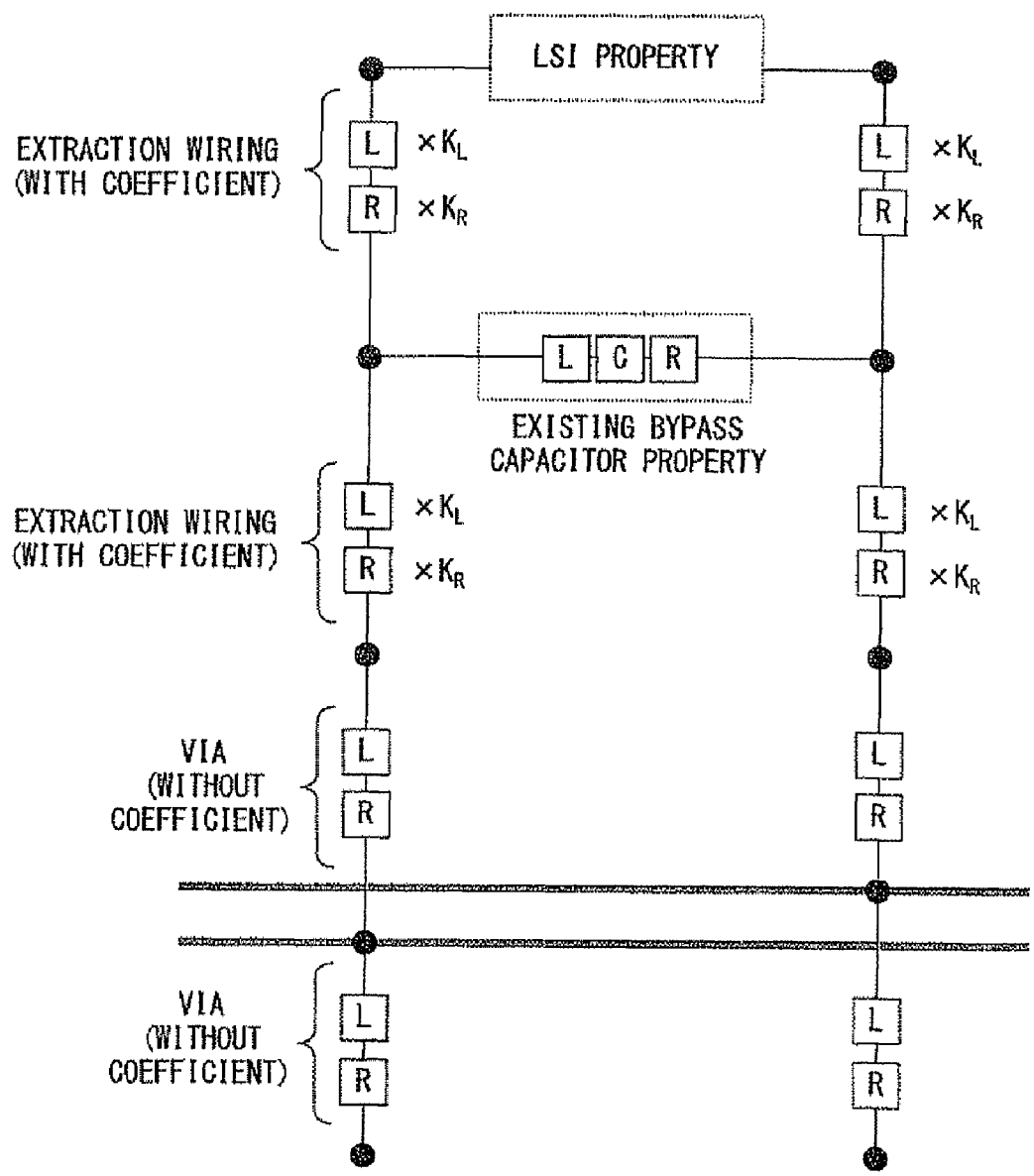
FIG. 20C is a diagram showing a circuit board model corresponding to the cross section shown in FIG. 20B.

FIG. 20C is a diagram showing a circuit board model corresponding to the cross section shown in FIG. 20B.

In FIG. 20C, coefficient parameters (KL and KR) with their default value set as "1" are embedded by multiplication, in the values of the elements (values of L and R) of each of the lines 173 and 177 leading from the bypass capacitor part pin pad 173. In addition, coefficient parameters (KL and KR) with their default value set as "1" are embedded by multiplication, in the values of the elements (values of L and R) of each of the lines 174 and 178 leading from the bypass capacitor part pin pad 176.

Figure 20D:
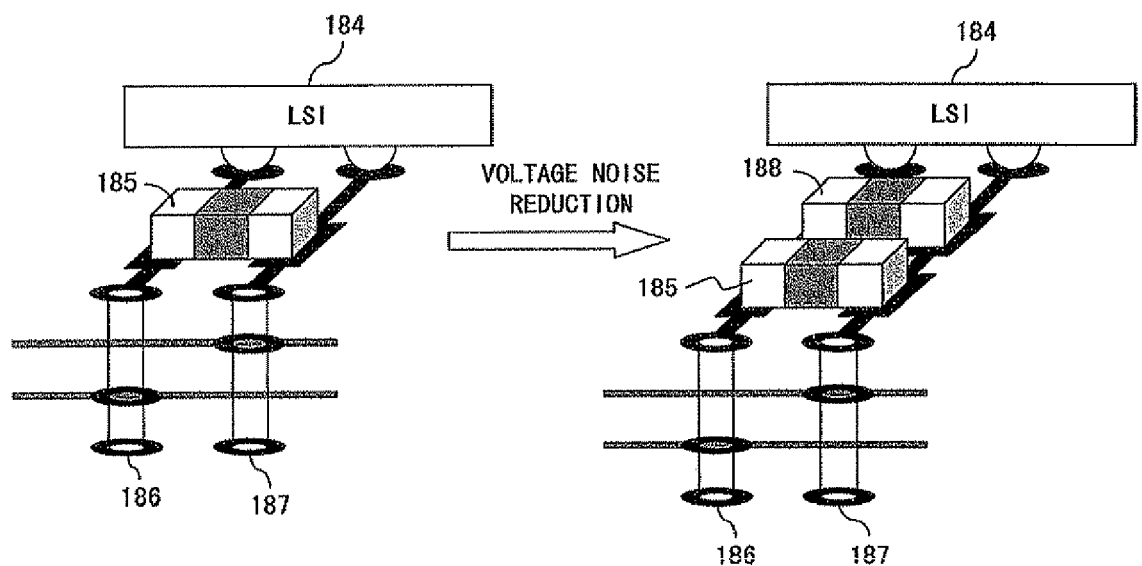
FIG. 20D is a diagram showing a case in which another bypass capacitor is added near a bypass capacitor that is classified as corresponding to case 3.

FIG. 20D is a diagram showing a case in which another bypass capacitor is added near a bypass capacitor that is classified as Case 3.

In FIG. 20D, a bypass capacitor 185 disposed between the pins of an LSI part 184 and vias 186 and 187 is identified as corresponding to Case 3. The simulation assuming the addition of a bypass capacitor 188 parallel to the bypass capacitor 185 is performed, by adding a model comprising the bypass capacitor properties corresponding to the additional bypass capacitor 188, and by adjusting the value of the coefficient parameters embedded in the property values of the elements of the corresponding line part.

Figure 20E:
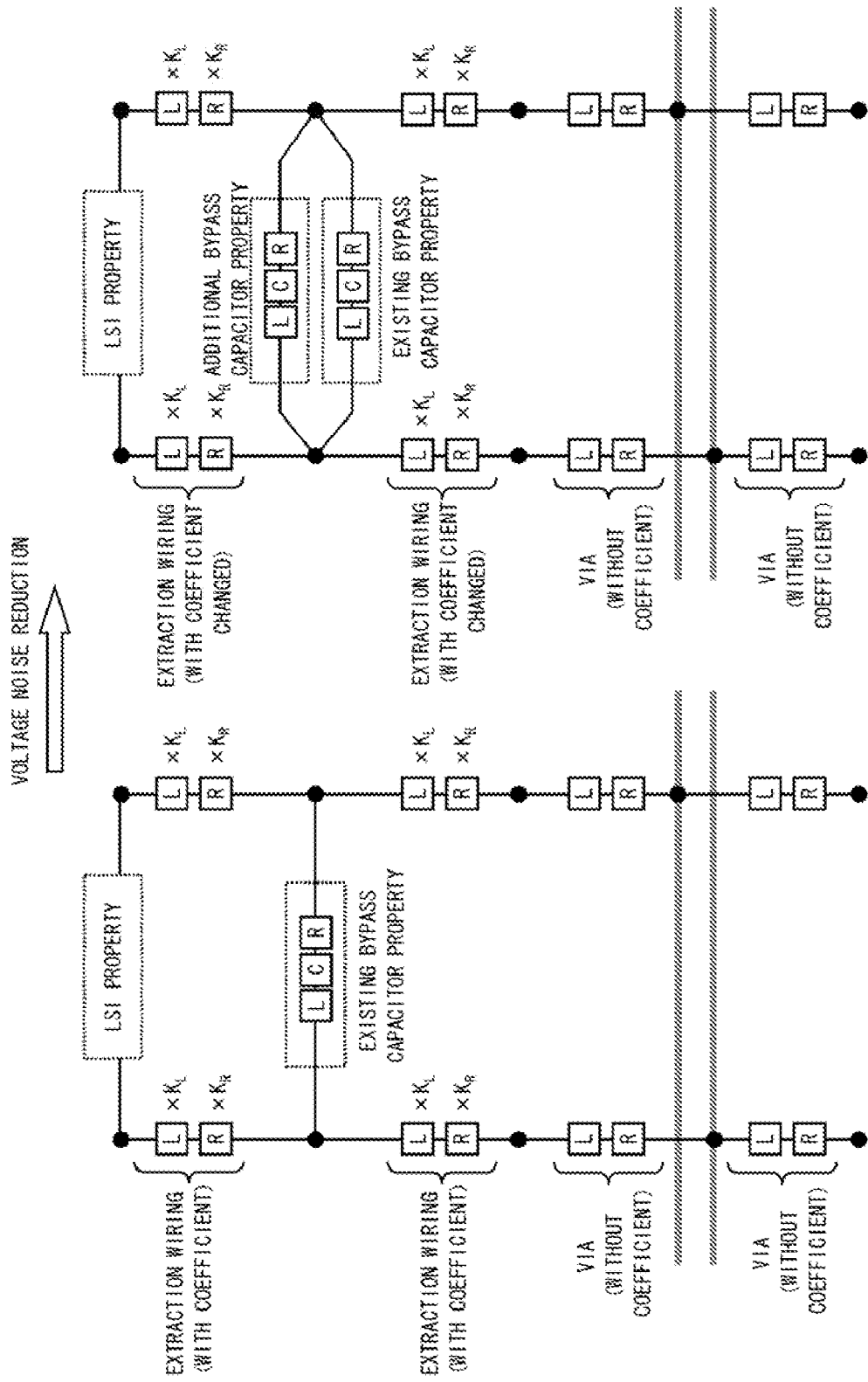
FIG. 20E is a diagram showing a circuit board model corresponding to FIG. 20D.

FIG. 20E is a diagram showing a circuit board model corresponding to FIG. 20D.

In FIG. 20E, the bypass capacitor 188 added in FIG. 20 is in parallel connection with the existing bypass capacitor 185. Therefore, (in the case in FIG. 20E), a simulation result with high accuracy can be obtained by adjusting the values of coefficient parameters (KL and KR) for the multiplication.

FIG. 21A is a diagram showing, along with CAD data, an lead-out line list and an lead-out line via list including the lead-outs lines and lead-out vias that are classified as corresponding to case 4.

FIG. 21A shows that "PART 1" in part data 201 is an LSI part that has "PART PIN 1" in part pin data 202 as a power supply pin and "PART PIN 2" as a ground pin.

It is also shown that "LEAD-OUT LINE 1" in lead-out line data 203 is a line leading from the "PART PIN 1", and that the "LEAD-OUT LINE 1" comprises "LINE DATA 2" and "LINE DATA 3" in line data 205.

It is also shown that "LEAD-OUT VIA 1" in lead-out via list 204 is a via connected to the line leading from the "PART PIN 1" and that the "LEAD-OUT VIA 1" comprises "VIA DATA 3" in via data 206.

It is also shown that the "LEAD-OUT LINE 2" in the lead-out line data 203 is a line leading from the "PART PIN 2", and that the "LEAD-OUT LINE 2" comprises "LINE DATA 5" and "LINE DATA 6" in the line data 205.

It is also shown that "LEAD-OUT VIA 2" in the lead-out via list 204 is a via connected to the line leading from the "PART PIN 2" and that the "LEAD-OUT VIA 2" comprises "VIA DATA 5" in the via data 206.

In addition, FIG. 21A shows that "PART 2" in part data 201 is a bypass capacitor that has "PART PIN 3" in the part pin data 202 as a power supply pin and "PART PIN 4" as a ground pin.

It is also shown that "LEAD-OUT LINE 3" in the lead-out line data 203 is a line leading from the "PART PIN 3", and that the "LEAD-OUT LINE 3" comprises "LINE DATA 2" and "LINE DATA 3" in the line data 205.

It is also shown that "LEAD-OUT VIA 3" in the lead-out via list 204 is a via connected to the line leading from the "PART PIN 3" and that the "LEAD-OUT VIA 3" comprises "VIA DATA 3" in the via data 206.

It is also shown that the "LEAD-OUT LINE 4" in the lead-out line data 203 is a line leading from the "PART PIN 4", and that the "LEAD-OUT LINE 4" comprises "LINE DATA 5" and "LINE DATA 6" in the line data 205.

It is also shown that "LEAD-OUT VIA 4" in the lead-out via list 204 is a via connected to the line leading from the "PART PIN 4" and that the "LEAD-OUT VIA 4" comprises "VIA DATA 5" in the via data 206.

Figure 21B:
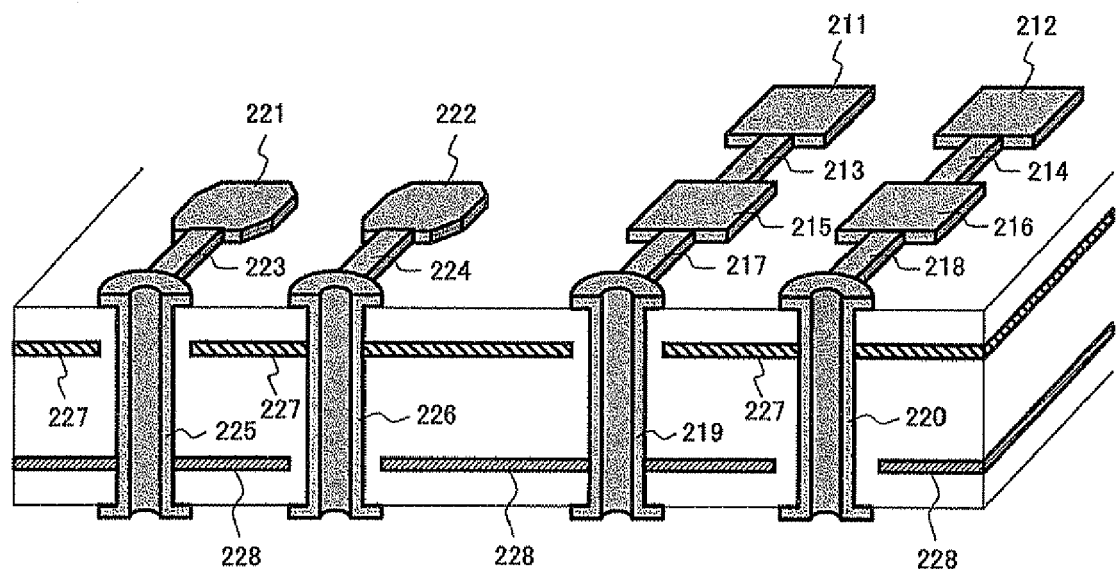
FIG. 21B is a diagram showing a cross section of a circuit board corresponding to the data shown in 21A.

FIG. 21B is a diagram showing a cross section of a circuit board corresponding to the configuration described above. The LSI part and bypass capacitor mounted on pin pads are omitted in FIG. 21B.

In FIG. 21B, the pair of bypass capacitor part pin pads 211 and 215 on printed circuit board 210 correspond to the pair of "PART PIN 2" and "PART PIN 4" in the part pin data 202 in FIG. 21A and the pair of bypass capacitor part pin pads 212 and 216 corresponds to the pair of "PART PIN 1" and "PART PIN 3" in the part pin data 202 in FIG. 21A. The pair of lines 213 and 217 corresponds to "LINE DATA 5" and "LINE DATA 6" in the line data 205 in FIG. 21A, and the pair of lines 214 and 218 corresponds to the pair of "LINE DATA 2" and "LINE DATA 3" in the line data 205 in FIG. 21A. Vias 219 and 220 correspond to "VIA DATA 5" and "VIA DATA 3" in the via data 206 in FIG. 21A.

In FIG. 21B, for example the bypass capacitor part pin pad 211 can be found as a ground pin, since it is connected to the via 219 that is connected to a ground plane 228 through the line 213, the bypass capacitor part pin pad 215 and the line 217. Also, for example, the bypass capacitor part pin pad 212 can be found as a power supply pin, since it is connected to the via 220 that is connected to a power supply plane 227 through the line 214, the bypass capacitor part pin pad 216 and the line 218.

When case classification is performed for a bypass capacitor part pin pad 211 in FIG. 21B, the lines 213 and 217 being the lead-out lines for the pin pad 211 are determined as corresponding to "Case 4" together with the pin pad 215, as they are lead-out lines for the pin pad 215 for another bypass capacitor.

While FIG. 21A does not contain corresponding elements, LSI part pin pads 221 and 222 in FIG. 21B are the pin pads for the LSI parts being the noise source. Lines 223 and 224 leading from the LSI part pin pads 221 and 222 and vias 225 and 226 connected to the leading lines are independent of the lines 213, 214, 217 and 218 leading from the bypass capacitor part pin pads 211, 212, 215 and 21G, and from the vias 219 and 220 connected to the leading lines.

Figure 21C:
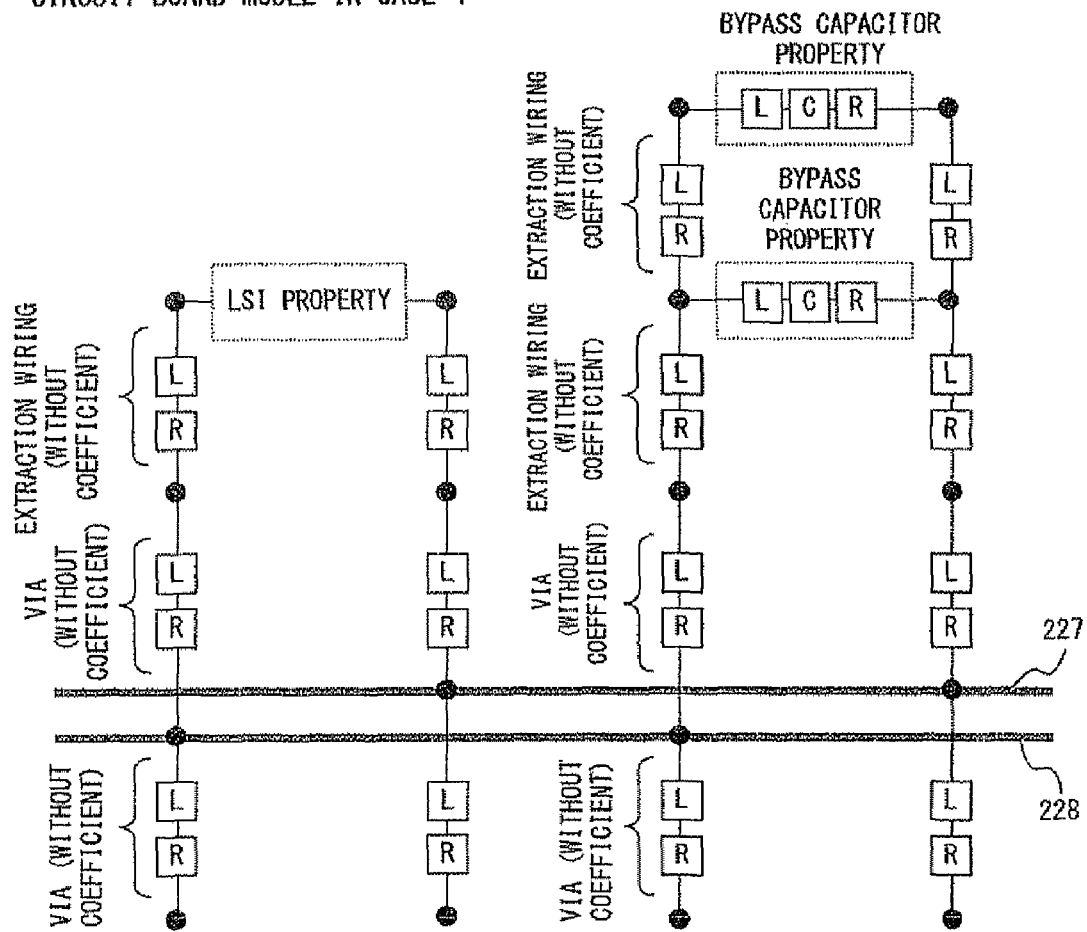
FIG. 21C is a diagram showing a circuit board model corresponding to the cross section shown in FIG. 21B.

FIG. 21C is a diagram showing a circuit board model corresponding to the cross section shown in FIG. 21C.

In FIG. 21C, the values of the elements (values of L and R) of each of the lines 213 and 217 leading from the bypass capacitor part pin pads 211 and 215 are set in the circuit board model without embedding a coefficient parameter. In addition, the values of the elements (values of L and R) of each of the lines 214 and 218 leading from the bypass capacitor part pin pads 212 and 216 are set in the circuit board model without embedding a coefficient parameter.

As mentioned earlier, Case 4 is excluded from the methods for adding a bypass capacitor according to the present embodiment. Therefore, the case in which an another bypass capacitor is added near a bypass capacitor determined as corresponding to Case 4 is not to be described here.

FIG. 22 is a diagram showing a result of analysis obtained with a circuit simulation for which a bypass capacitor is added, involving change to design data.

Figure 23:
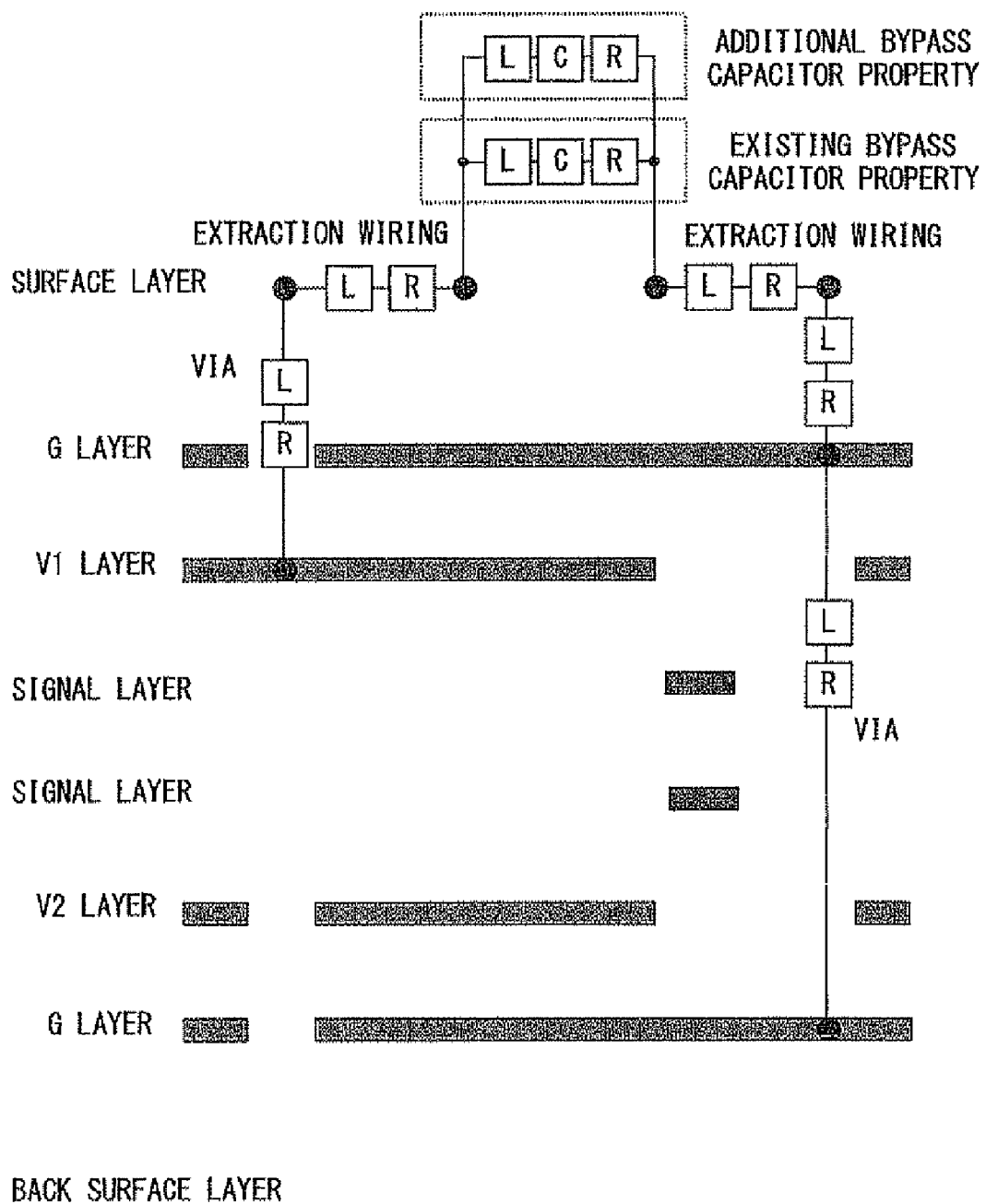
FIG. 23 is a diagram showing an example of a circuit board model that is created with the addition a bypass capacitor but without embedding coefficient parameters, resulting in the values of L and R of a corresponding line part in the circuit board model being the values set before the bypass capacitor is added.

FIG. 23 is a diagram showing an example of a circuit board model that is created with the addition a bypass capacitor but, in accordance with a conventional manner, without embedding coefficient parameters, resulting in the values of L and R of a corresponding line part in the circuit board model being the values set before the bypass capacitor is added.

FIG. 24 is a diagram showing an analysis result obtained with a circuit simulation in which a bypass capacitor is added, the circuit simulation being performed on the basis of the configuration shown in FIG. 23.

FIG. 25 is a diagram showing an analysis result obtained with a circuit simulation in which a bypass capacitor is added and the values of coefficient parameters embedded in a corresponding line part are adjusted in accordance with the addition of the bypass capacitor, by using the method according to the embodiment.

In all of the graphs shown in FIGS. 22, 24 and 25, the solid line represents the analysis results before the noise reduction is performed, which draws the same curve in the three graphs.

In the graphs shown in FIGS. 22, 24 and 25, the broken line represents the analysis results with the noise reduction performed according to the respective methods.

The broken line in the graph shown in FIG. 22 that seems to represent the improvement result with the highest accuracy shows that the impedance is suppressed well in the desired band being positioned, for example, in the center of the graph. By contrast, the broken line in the graph in FIG. 24 for the case in which the line part has values of L and R before the addition of the bypass capacitor shows little suppression of the impedance value in the desired band. In addition, the shape of the broken line is different from that of the broken line in the graph in FIG. 22. While the simulation with the addition of a bypass capacitor could be performed in a short time, the accuracy of the analysis result is low, as if representing the work having been done in a short time.

On the other hand, the broken line in the graph in FIG. 25 for the case in which the values of L and R of the line part are adjusted by changing the coefficient parameters to the appropriate values has almost the same shape as the broken line in the graph in FIG. 22, indicating that even if the simulation with the addition of the bypass capacitor was done in a short time, the analysis result can be obtained with high accuracy.

Figure 26:
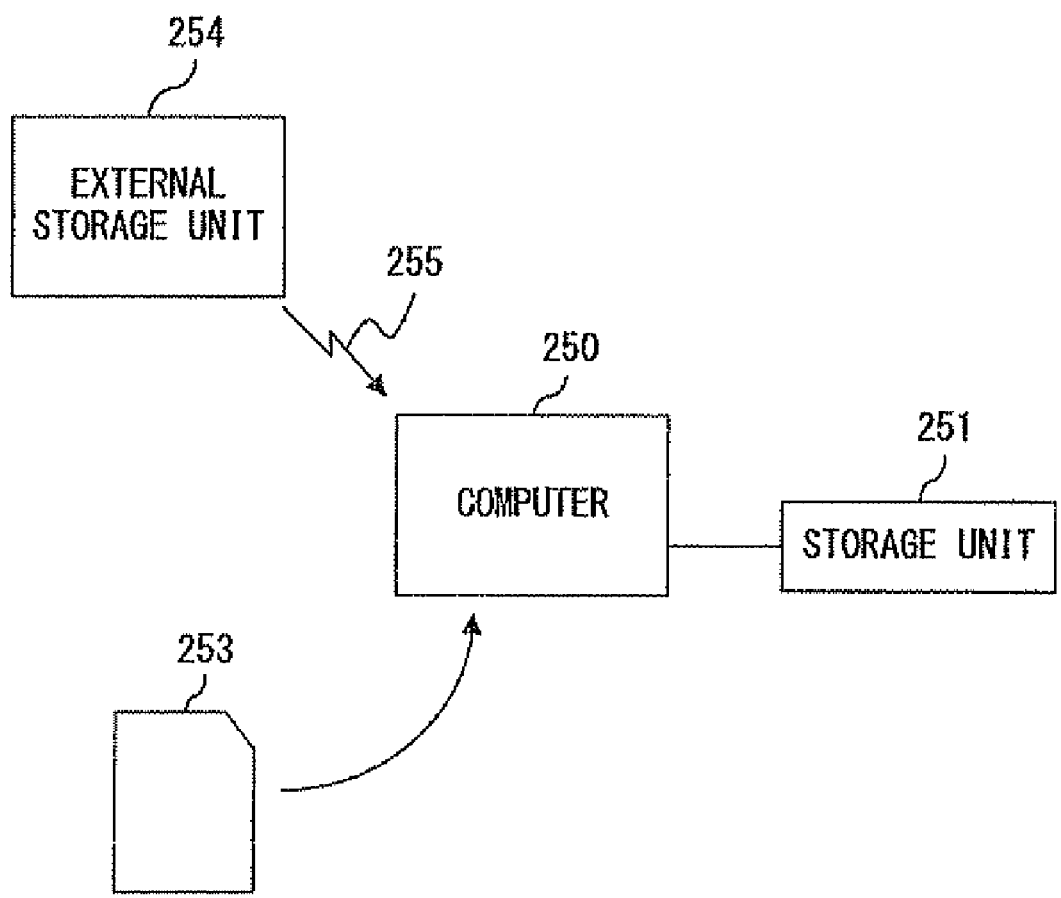
FIG. 26 is a diagram showing an example of a recording medium.

FIG. 26 is a diagram showing an example of a recording medium.

The program and data for the processes in the present embodiment can be executed either by loading them from a storage unit 251 of a computer 250 onto a memory of the computer 250, or by loading them from an external storage unit 254 onto a memory of the computer 250 through a network 255.

What is claimed is:

1. A non-transitory recording medium recording an analysis model creation program for making a computer execute processes for creating, from CAD data of a circuit board, an analysis model to be used for a circuit simulation, the processes comprising:
when creating the analysis model, judging a connecting order in which a bypass capacitor, a via, and a power supply pin of an integrated circuit or a ground pin of the integrated circuit are connected at a line which includes the via and which is used to connect the bypass capacitor to the power supply pin or the ground pin; and
adding a coefficient parameter to a model of the line including the via according to a result of the judging the connecting order.

2. The non-transitory recording medium according to claim 1, the processes further comprising:
when calling up the analysis model in order to analyze a condition in which an additional bypass capacitor is disposed for noise reduction, changing the coefficient parameter added to the model of the line; and
adding or changing, a related part in a part model, in accordance with properties of the additional bypass capacitor to be disposed.

3. The non-transitory recording medium according to claim 1, the processes further comprising:
classifying lead-out methods used for the bypass capacitor; and
adding a different coefficient parameter to the model of the line, depending on a difference in the lead-out methods.

4. An analysis model creation method according to which a computer executes processes for creating, from CAD data of a circuit board, an analysis model to be used for a circuit simulation, the method comprising:
when creating the analysis model, judging, by using the computer, a connecting order in which a bypass capacitor, a via, and a power supply pin of an integrated circuit or a ground pin of the integrated circuit are connected at a line which includes the via and which is used to connect the bypass capacitor to the power supply pin or the ground pin; and
adding, by using the computer, a coefficient parameter to a model of the line including the via according to a result of the judging the connecting order.

5. The analysis model creation method according to claim 4, further comprising:
when calling up the analysis model in order to analyze a condition in which an additional bypass capacitor is disposed for noise reduction, changing, by using the computer, the coefficient parameter added to the model of the line; and
adding or changing, by using the computer, a related part in a part model in accordance with properties of the additional bypass capacitor to be disposed.

6. The analysis model creation method according to claim 4, further comprising:
classifying, by using the computer, lead-out methods used for the bypass capacitor; and
adding, by using the computer, a different coefficient parameter to the model of the line, depending on a difference in the lead-out methods.

* * * * *